(12) United States Patent
Surendranath et al.

(10) Patent No.: US 11,005,108 B2
(45) Date of Patent: May 11, 2021

(54) MOLECULARLY TUNABLE HETEROGENEOUS CATALYSTS BY EDGE FUNCTIONALIZATION OF GRAPHITIC CARBONS

(71) Applicant: Massachusetts Institute of Technology, Cambridge, MA (US)

(72) Inventors: Yogesh Surendranath, Cambridge, MA (US); Tomohiro Fukushima, Cambridge, MA (US); Matthew E. O'Reilly, Brighton, MA (US); Seokjoon Oh, Boston, MA (US); Alexander T. Murray, Cambridge, MA (US); Corey Jarin Kaminsky, Cambridge, MA (US); Sterling Ben Chu, Cambridge, MA (US); Megan N. Jackson, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 161 days.

(21) Appl. No.: 15/236,963

(22) Filed: Aug. 15, 2016

(65) Prior Publication Data

US 2017/0047592 A1 Feb. 16, 2017

Related U.S. Application Data

(60) Provisional application No. 62/205,357, filed on Aug. 14, 2015.

(51) Int. Cl.
*C07F 15/00* (2006.01)
*H01M 4/90* (2006.01)
*C07F 13/00* (2006.01)
*H01M 8/083* (2016.01)

(52) U.S. Cl.
CPC ......... *H01M 4/9008* (2013.01); *C07F 13/005* (2013.01); *C07F 15/006* (2013.01); *C07F 15/0033* (2013.01); *C07F 15/0046* (2013.01); *C07F 15/0053* (2013.01); *C07F 15/0086* (2013.01); *H01M 8/083* (2013.01)

(58) Field of Classification Search
None
See application file for complete search history.

(56) References Cited

U.S. PATENT DOCUMENTS

2007/0069203 A1 3/2007 Lee et al.
2012/0028362 A1 2/2012 Gorden et al.

FOREIGN PATENT DOCUMENTS

WO WO-2010/059943 A2 5/2010

OTHER PUBLICATIONS

Thorogood et al. (Chem. Mater., 19, 4964-4974 (Year: 2007).*
Schreurs et al. (Recl. Tray. Chinn. Pays-Bas, 103, 251-259 (Year: 1984).*
Zheng et al. J. Phys. Chem., C 2012, 116, 15839-15846 (Year: 2012).*
Zheng et al. J. Phys. Chem., C 2012, 116, 15839-15846, supporting Information (Year: 2012).*
Arce et al. (ECS Transactions, 64(1), 2014, 37-42 (Year: 2014).*
Choi, et al., "Photophysical and redox properties of dinuclear Ru(II) complexes prepared from the photosensitizing unit [Ru(bpy)2(dppz-NH2)]2+ 9dppz-NH2:7-amino-diprido[3,2-a:2',3'-c]phenazine)," Bull Kor Chem Soc, 35(2): 663-665 (2014).
International Search Report and Written Opinion for International Application No. PCT/US2016/047018 dated Oct. 14, 2016.
Jia, et al., "Tetrathiafulvalene-fused prohyrins via quinoxaline linkers: symmetric and asymmetric donor-acceptor systems," Chem Phys Chem, 13: 3370-3382 (2012).
Kim, et al., "Iron- and Nitrogen-functionalized graphene nanosheet and nanoshell composites as a highly active electrocatalyst for oxygen reduction reaction," J Phys Chem, 117: 26501-26508 (2013).
Lakshmi, et al., "Synthesis and properties of covalently linked thiaporphyrineferrocene conjugates," J Organomet Chem, 696: 925-931 (2011).
Qian, et al., "Surface fucntionalization of graphene quantum dots with small organic molecules from photoluminescence modulation to bioimaging applications: an experimental and theoretical investigation," RSC Advances, 3: 14571-14579 (2013).
Wu, et al., "Heat-treated nonprecious catalyst using Fe and Nitrogen-rich 2,3,7,8-Tetra (pyridin-2-yl)pyrazinol[2,3-g]quinoxaline coordinated complex for oxygen reduction reaction in PEM Fuel Cells," J Phys Chem, 115: 18856-18862 (2011).
Crossley et al., "Synthesis of porphyrin-2, 3, 12, 13-and-2, 3, 7, 8-tetraones: building blocks for the synthesis of extended porphyrin arrays," Journal of the Chemical Society, Chemical Communications 23:2379-2380 (1995).
Fukushima et al., "Graphite-conjugated pyrazines as molecularly tunable heterogeneous electrocatalysts," Journal of the American Chemical Society, 137(34):10926-10929 (2015).
Fukushima et al., "Graphite-conjugated pyrazines as molecularly tunable heterogeneous electrocatalysts," Journal of the American Chemical Society, Supporting Information, 137(34):S1-S23 (2015).
Jackson et al., "Strong electronic coupling of molecular sites to graphitic electrodes via pyrazine conjugation," Journal of the American Chemical Society, 140(3):1004-1010 (2018).

(Continued)

*Primary Examiner* — Yun Qian
(74) *Attorney, Agent, or Firm* — Foley Hoag LLP; Dana M. Gordon; Lawrence P. Tardibono

(57) ABSTRACT

Disclosed are surface immobilized (electro)catalysts that may be prepared by a condensation reaction that generates an aromatic unit that is robust to acid and base and elevated temperatures. Among their many desirable characteristics, the catalysts are far less prone to the bimolecular deactivation pathways commonly observed for homogeneous catalysts, and may be used in solvents with a range of polarities and dielectric strengths. The catalysts are suitable for a wide array of thermal catalytic reactions (polymerization, oxidation, hydrogenation, cross-coupling etc.) and as anodes and/or cathodes in fuel cells, electrolyzers, and in batteries and supercapacitors.

14 Claims, 44 Drawing Sheets

(56) References Cited

OTHER PUBLICATIONS

Jackson et al., "Strong electronic coupling of molecular sites to graphitic electrodes via pyrazine conjugation," Journal of the American Chemical Society, Supporting Information, 140(3):S1-S29 (2018).

Karweik et al., "Nitrogen charge distributions in free-base porphyrins, metalloporphyrins, and their reduced analogs observed by X-ray photoelectron spectroscopy," Inorganic Chemistry, 15(10):2336-2342 (1976).

Oh et al., "Graphite-conjugated Rhenium catalysts for carbon dioxide reduction," Journal of the American Chemical Society, 138(6):1820-1823 (2016).

Oh et al., "Graphite-conjugated Rhenium catalysts for carbon dioxide reduction," Journal of the American Chemical Society, Supporting Information, 138(6):S1-S18 (2016).

Thordarson et al., "The synthesis and studies towards the self-replication of bis (capped porphyrins)," Organic & biomolecular chemistry, 1(7):1216-1225 (2003).

\* cited by examiner

MOLECULARLY TUNABLE HETEROGENEOUS CATALYSTS BY EDGE FUNCTIONALIZATION OF GRAPHITIC CARBONS

RELATED APPLICATIONS

This application claims the benefit of priority to U.S. Provisional Patent Application Ser. No. 62/205,357, filed Aug. 14, 2015.

GOVERNMENT SUPPORT

This invention was made with Government support under Grant Number DE-SC0014176, awarded by the Department of Energy. The Government has certain rights in the invention.

BACKGROUND OF THE INVENTION

The interconversion of electrical and chemical energy requires the coupling of electron transfer with substrate bond rearrangement. This can be achieved at surface-exposed active sites of heterogeneous electrocatalysts or via redox mediation facilitated by a homogeneous molecular electrocatalyst. Molecular electrocatalysts yield readily to synthetic alteration of their redox properties, permitting systematic tuning of catalyst activity and selectivity. Similar control is difficult to achieve with heterogeneous electrocatalysts because they typically exhibit a distribution of active site geometries and local electronic structures, which are recalcitrant to molecular-level synthetic modification. However, heterogeneous electrocatalysts typically exhibit greater durability and are more readily integrated into functional energy conversion devices such as fuel cells and electrolyzers. In principle, the attractive features of heterogeneous and molecular catalysts could be combined if robust methods are developed for constructing tunable molecular active sites on the surfaces of conductive solids.

Typically, molecular electrocatalysts are heterogenized by introducing an inert tether between the active site and the electrode surface. However, there exists a paucity of surface connection chemistries that are both robust and well-defined. For example, thiol-based self-assembled monolayers provide for a high degree of surface uniformity but exhibit a limited range of electrochemical stability. In contrast, harsher ligation methods involving electrogenerated radicals forge robust covalent linkages with carbon surfaces but are prone to form ill-defined polymeric multilayers and are incompatible with sensitive molecular functionality. Additionally, these methods inherently impose a tunneling barrier for electron transfer, limiting the rate of electron flux to the active site.

Graphene is a single, tightly packed layer of carbon atoms that are bonded together in a hexagonal honeycomb lattice. It is an allotrope of carbon in the structure of a plane of $sp^2$ bonded atoms with a molecule bond length of 1.42 Å. Each atom has four bonds, one τ bond with each of its three neighbors and one π bond that is oriented out of plane. The π bonds hybridize together to form π- and π*-bands. These bands are responsible for most of graphene's notable electronic properties, via the half-filled band that permits free-moving electrons.

Layers of graphene stacked on top of each other form graphite, with an interplanar spacing of 3.35 Å. At one atom thick, graphene is the thinnest compound known to man. It is the lightest material known (with 1 square meter weighing about 0.77 milligrams), the strongest compound discovered (between 100-300 times stronger than steel and with a tensile stiffness of 150,000,000 psi), the best conductor of heat at room temperature ($4.84\pm0.44\times10^3$ to $5.30\pm0.48\times10^3$ $W\cdot m^{-1}\cdot K^{-1}$), and also the best conductor of electricity known (electron mobility greater than 15,000 $cm^2\cdot V^{-1}\cdot s^{-1}$).

Atoms at the edges of a graphene sheet have special chemical reactivity. Graphene has the highest ratio of edge atoms of any allotrope, and defects within a sheet increase its chemical reactivity.

Many uses for graphene have been proposed or are under development, in areas including electronics, biological engineering, filtration, lightweight/strong composite materials, photovoltaics, and energy storage.

SUMMARY OF THE INVENTION

The invention provides a broad class of (electro)catalysts characterized by the following: a) a condensation reaction generates an aromatic unit that is robust to acid and base and elevated temperatures; b) surface immobilization prevents bimolecular deactivation pathways commonly observed for homogeneous catalysts; c) immobilization permits previously insoluble catalysts to be operated in a solvent with a range of polarity and dielectric strength; d) the localized, discrete states of the molecular unit in isolation are conjugated to the delocalized, continuum of states in the graphite, permitting lower energy catalytic pathways; e) phenazine units generated on the surface are electrochemically addressable, allowing for facile electrocatalysis; and f) transition metal centers can be introduced to designer surface immobilized ligands to access highly reactive low-coordinate active sites. In net, the invention provides for access to inexpensive, non-toxic heterogeneous catalysts with molecularly well-defined, tunable active sites that can be used for a wide array of thermal catalytic reactions (polymerization, oxidation, hydrogenation, cross-coupling etc.) and as anodes and/or cathodes in fuel cells, electrolyzers, and batteries. Given the key role of graphitic carbon in supercapacitors, the invention is useful in that technology space as well.

An aspect of the invention is a composition, comprising graphene, and a plurality of moieties represented by Formula I:

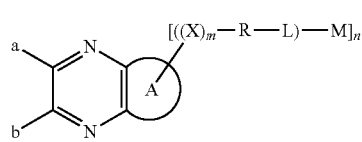

wherein, independently for each occurrence:
a and b represent covalent bonds to the graphene;
A represents a fused ring, wherein said fused ring is a mono-, bi-, tri-, or polycyclic aryl or heteroaryl moiety;
n is 0-4; and
for each occurrence of [((X)$_m$—R-L).M]:
each X, when present, is selected from the group consisting of substituted or unsubstituted alkenyl, substituted or unsubstituted alkynyl, substituted or unsubstituted aryl, substituted or unsubstituted heteroaryl, substituted or unsubstituted arylalkenyl, substituted or unsubstituted heteroarylalkenyl, substituted or unsubstituted arylalkynyl, and substituted or unsubstituted heteroarylalkynyl; provided that when R, R-L, or L is also present, X is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each R, when present, is selected from the group consisting of halo, alkyl, substituted or unsubstituted alkenyl, substituted or unsubstituted alkynyl, substituted or unsubstituted aryl, substituted or unsubstituted heteroaryl, substituted or unsubstituted arylalkenyl, substituted or unsubstituted heteroarylalkenyl, substituted or unsubstituted arylalkynyl, substituted or unsubstituted heteroarylalkynyl, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfony, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfinyl, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluororalkylsulfinyloxy, alkenylsulfinyloxy, alkynylsulfinyloxy, alkoxysulfinyloxy, haloalkoxysulfinyloxy, fluororalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, and silyloxy; provided that when L is also present, R is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each L is absent or, when present, a ligand capable of binding a metal atom or a metal ion;

each M is absent or, when present, a metal atom or a metal ion; and m is 0-6;

provided that if n is 0, then A is not benzo; and if n is 1, then A[((X)$_m$—R-L).M] is not beta-nitrobenzo.

In certain embodiments, the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

An aspect of the invention is an electrochemical half-cell, comprising a composition of the invention.

An aspect of the invention is a fuel cell, comprising a first electrochemical half-cell comprising a composition of the invention; a second electrochemical half-cell; and an electrolyte in contact with the first electrochemical half-cell and the second electrochemical half-cell.

In certain embodiments, the electrolyte is an aqueous alkaline solution.

An aspect of the invention is a catalytic reactor, comprising a composition of the invention.

An aspect of the invention is a method of making a composition of the invention, comprising
combining graphene, a $C_1$-$C_6$ alcohol, and a compound represented by Formula II:

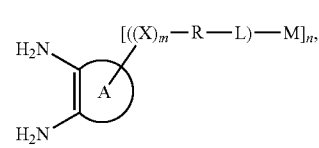

thereby forming a reaction mixture; and
heating the reaction mixture at about 60-120° C., thereby forming the composition, wherein, independently for each occurrence:

A represents a mono-, bi-, tri-, or polycyclic aryl or heteroaryl moiety;

n is 0-4; and for each occurrence of [((X)$_m$—R-L).M]:

each X, when present, is selected from the group consisting of substituted or unsubstituted alkenyl, substituted or unsubstituted alkynyl, substituted or unsubstituted aryl, substituted or unsubstituted heteroaryl, substituted or unsubstituted arylalkenyl, substituted or unsubstituted heteroarylalkenyl, substituted or unsubstituted arylalkynyl, and substituted or unsubstituted heteroarylalkynyl; provided that when R, R-L, or L is also present, X is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each R, when present, is selected from the group consisting of halo, alkyl, substituted or unsubstituted alkenyl, substituted or unsubstituted alkynyl, substituted or unsubstituted aryl, substituted or unsubstituted heteroaryl, substituted or unsubstituted arylalkenyl, substituted or unsubstituted heteroarylalkenyl, substituted or unsubstituted arylalkynyl, substituted or unsubstituted heteroarylalkynyl, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfony, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfinyl, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluoroalkylsulfinyloxy, alkenylsulfinyloxy, alkynylsulfinyloxy, alkoxysulfinyloxy, haloalkoxysulfinyloxy, fluoroalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, and silyloxy; provided that when L is also present, R is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each L is absent or, when present, a ligand capable of binding a metal atom or a metal ion;

each M is absent or, when present, a metal atom or a metal ion; and m is 0-6;

provided that if n is 0, then A is not benzo; and if n is 1, then $A[((X)_m—R-L).M]$ is not beta-nitrobenzo.

In both sets of CVs, the current increases upon successive CV cycles, indicating reactivation of the electrode. The increased durations of the galvanostatic polarization traces following CV cycling also suggest that the electrode reactivates.

Figure 35:
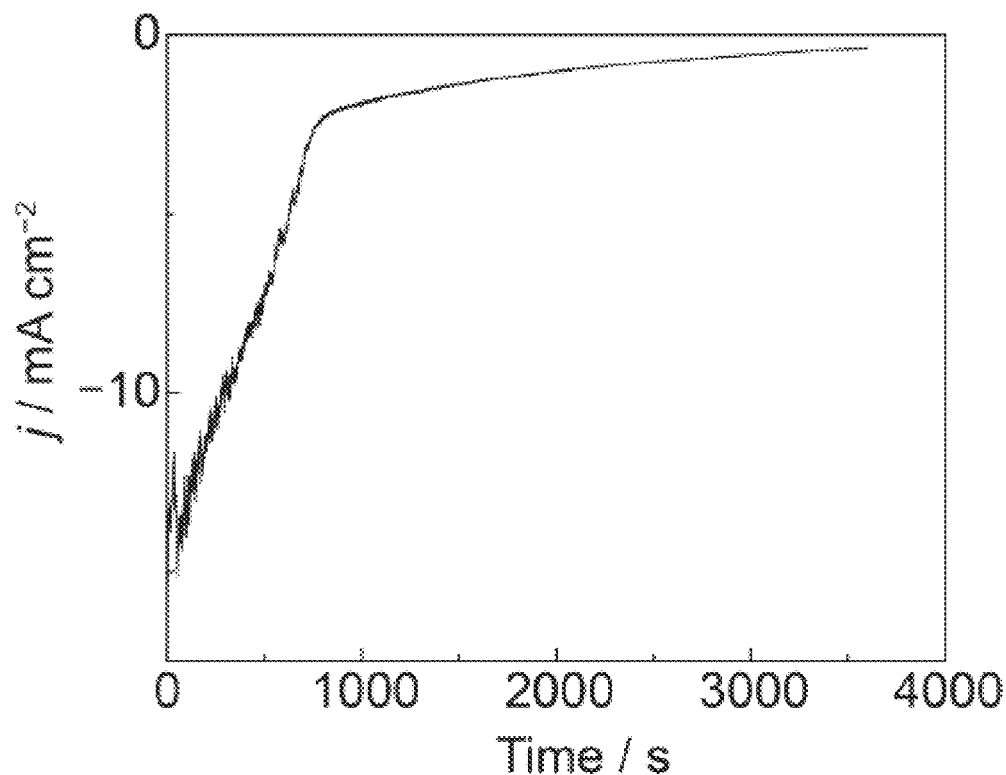

FIG. 35 is a graph depicting the potentiostatic polarization trace at −2.16 V for a stationary 9 recorded in $CO_2$-saturated 0.1 M $TBAPF_6$ acetonitrile electrolyte.

Figure 36:
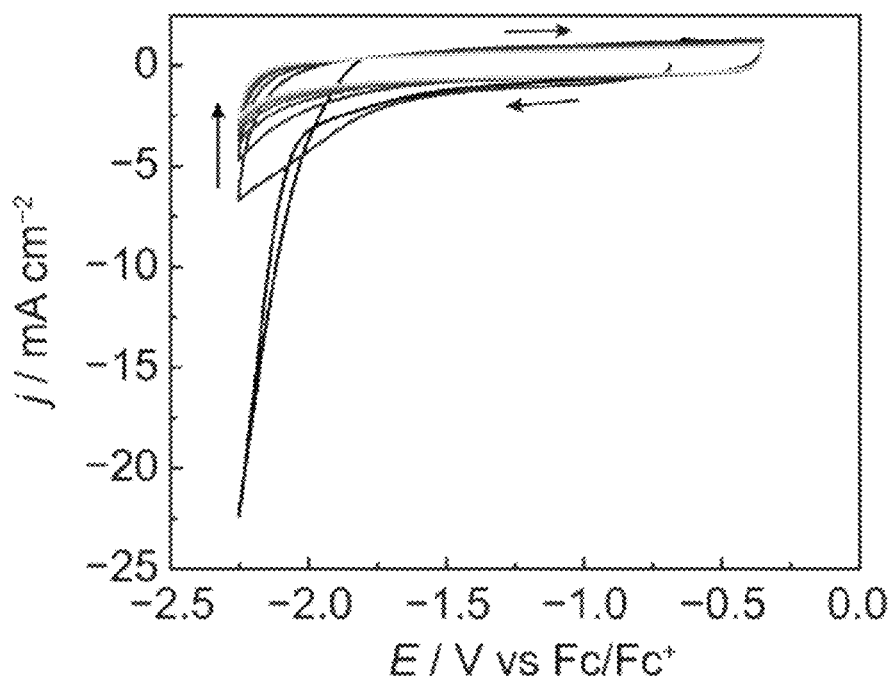

FIG. 36 is a graph depicting cyclic voltammograms (100 mV/s scan rate, no rotation) of 9 in $CO_2$-saturated acetonitrile before (black) and after (gray) addition of 2,2,2-trifluoroethanol (TFE). The first six CV scans after addition of TFE are shown.

Figure 37:
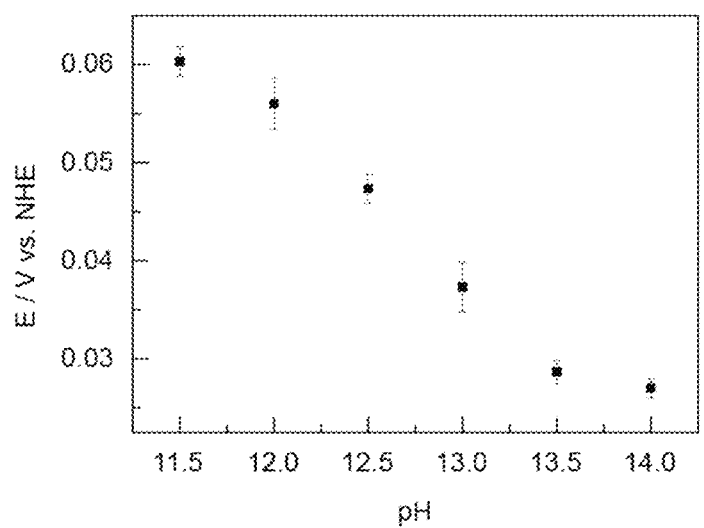

FIG. 37 is a graph depicting the pH dependence of 3.

Figure 38:
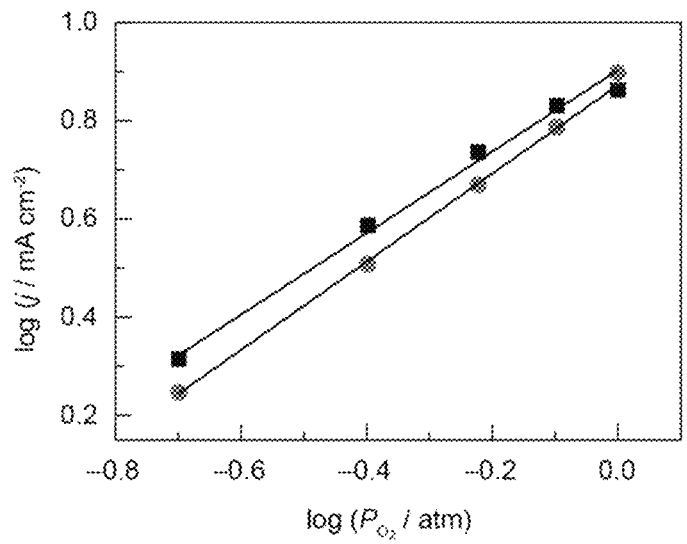

FIG. 38 is a graph depicting first order dependence in $O_2$ in 0.1 M NaOH at pH 10.5 and pH 13.

Figure 39A:
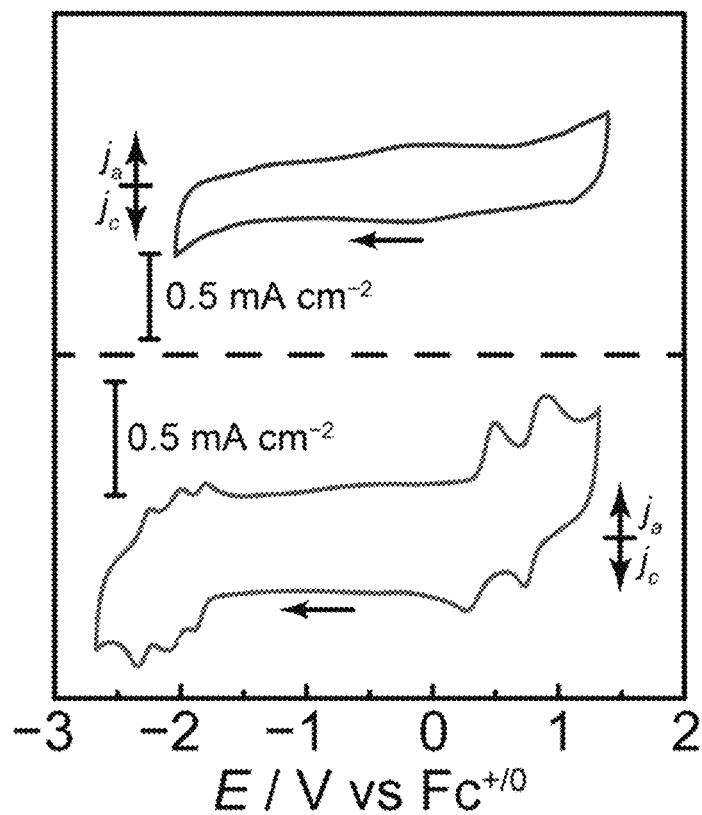

FIG. 39A is a graph depicting representative cyclic voltammograms (5 mV/s scan rate) of 11 (top trace) and 12 (bottom trace) recorded in 0.1 M $TBAPF_6$ acetonitrile electrolyte.

Figure 39B:
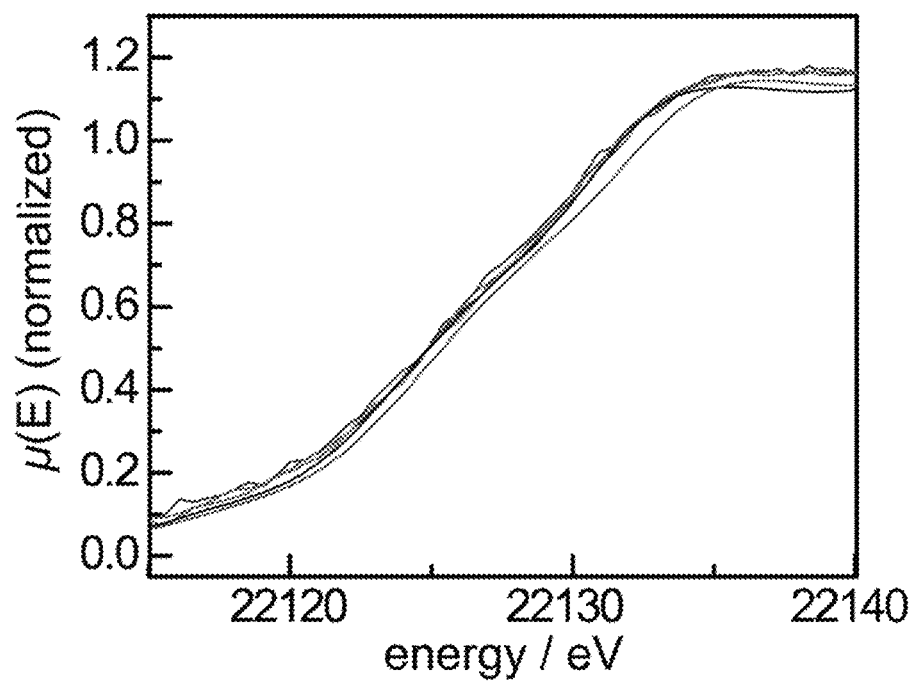

FIG. 39B is a graph depicting representative traces of 12 in situ Ru K-edge XANES recorded in 0.1 M TBAPF₆ acetonitrile electrolyte.

Figure 40:
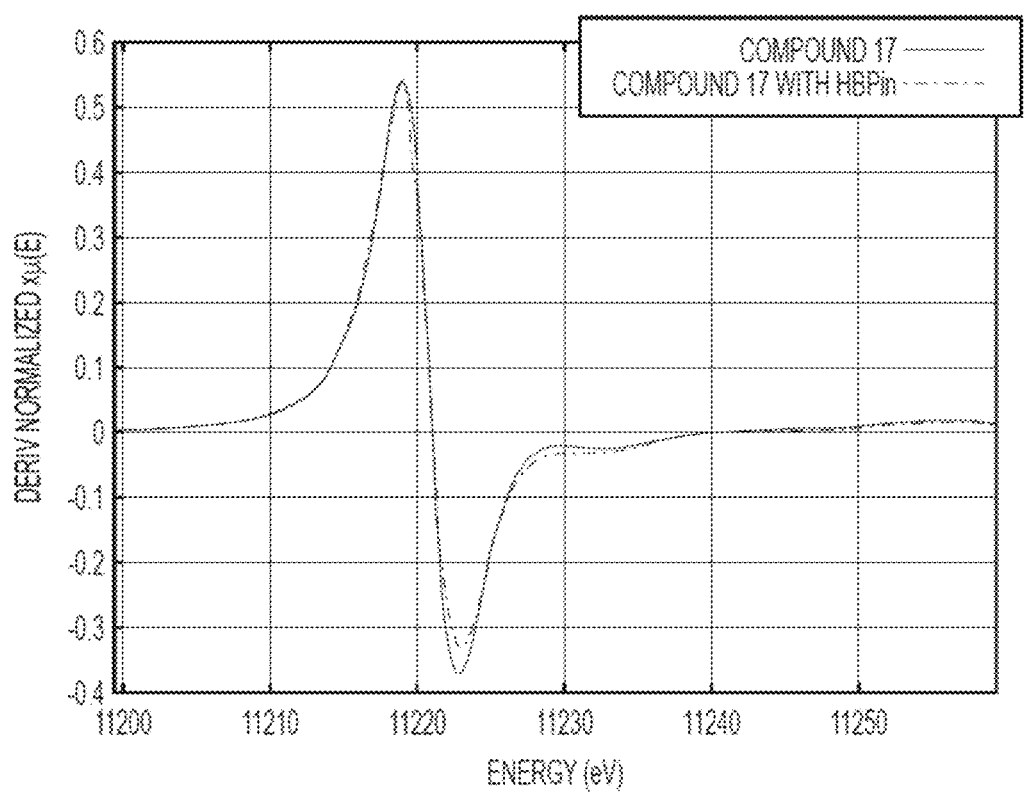

FIG. 40 is a graph depicting the effects of HBPin and tBuNC treatments on the oxidation state of 17 using the derivative of the normalized Ir XANES edge.

Figure 41:
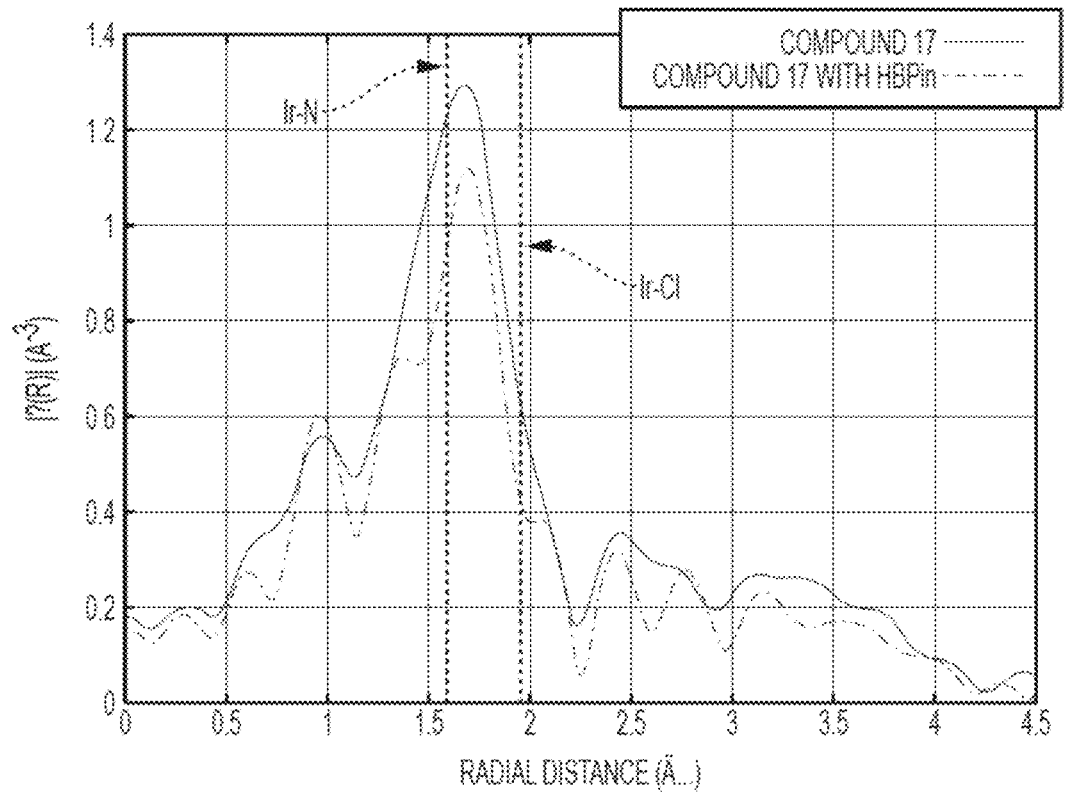

FIG. 41 is a graph depicting the effects of HBPin and tBuNC treatments on the coordination of 17 using EXAFS.

Figure 42:
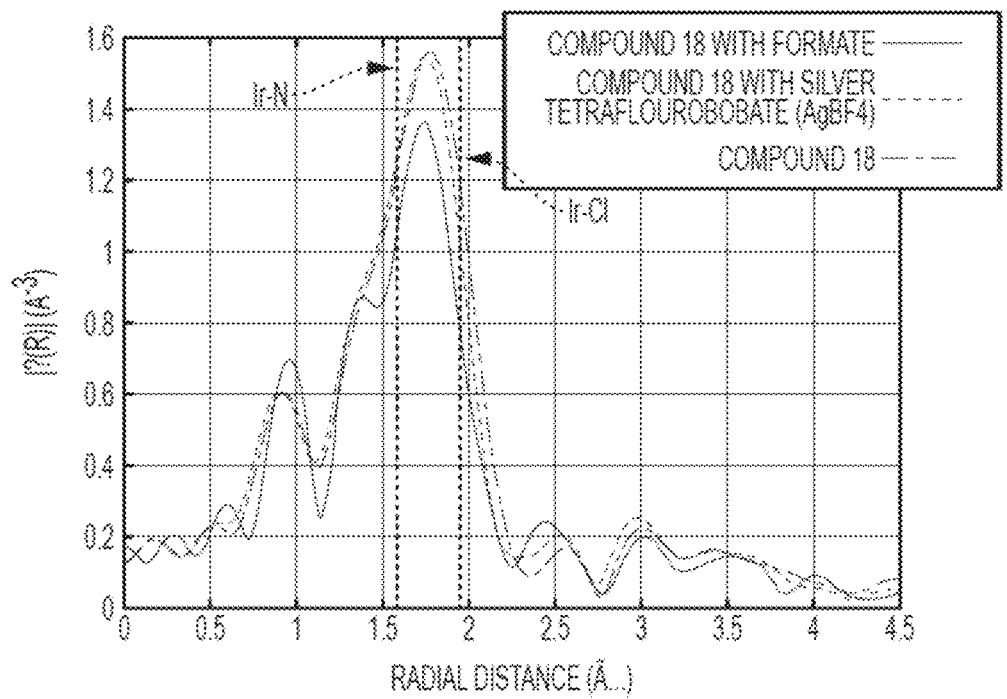

FIG. 42 is a graph depicting the effects of sodium formate and silver tetrafluoroborate treatments on the coordination of 18 using EXAFS.

Figure 43:
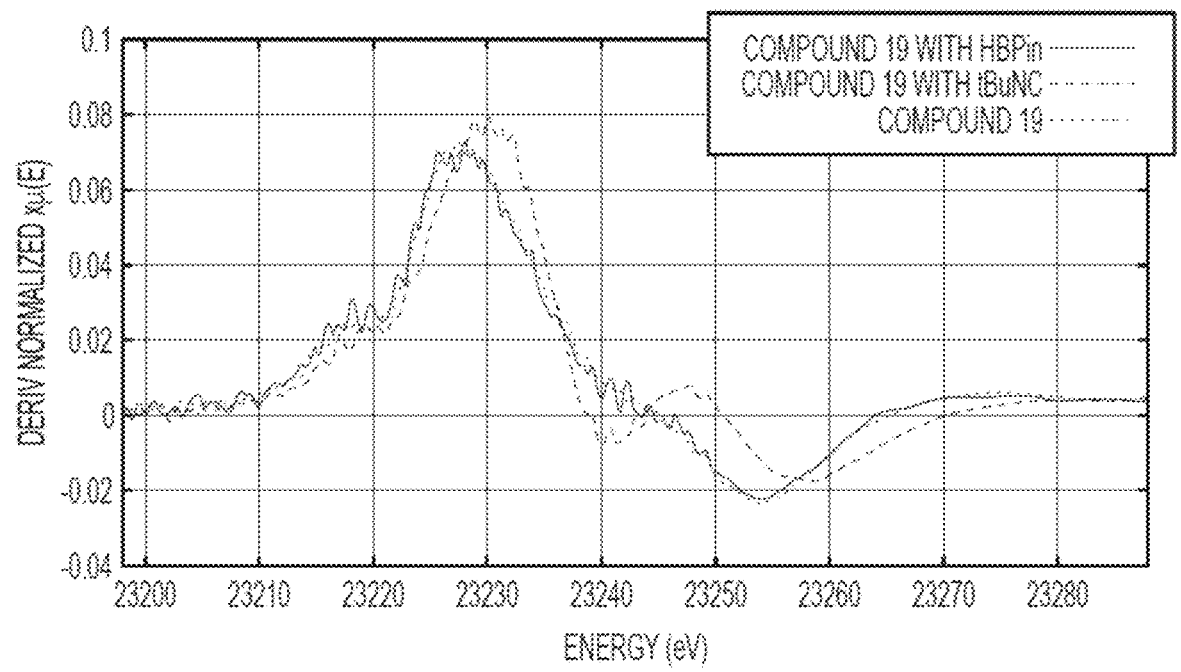

FIG. 43 is a graph depicting the effects of HBPin and tBuNC treatments on the oxidation state of 19, using the derivative of the normalized Rh XANES edge.

Figure 44:
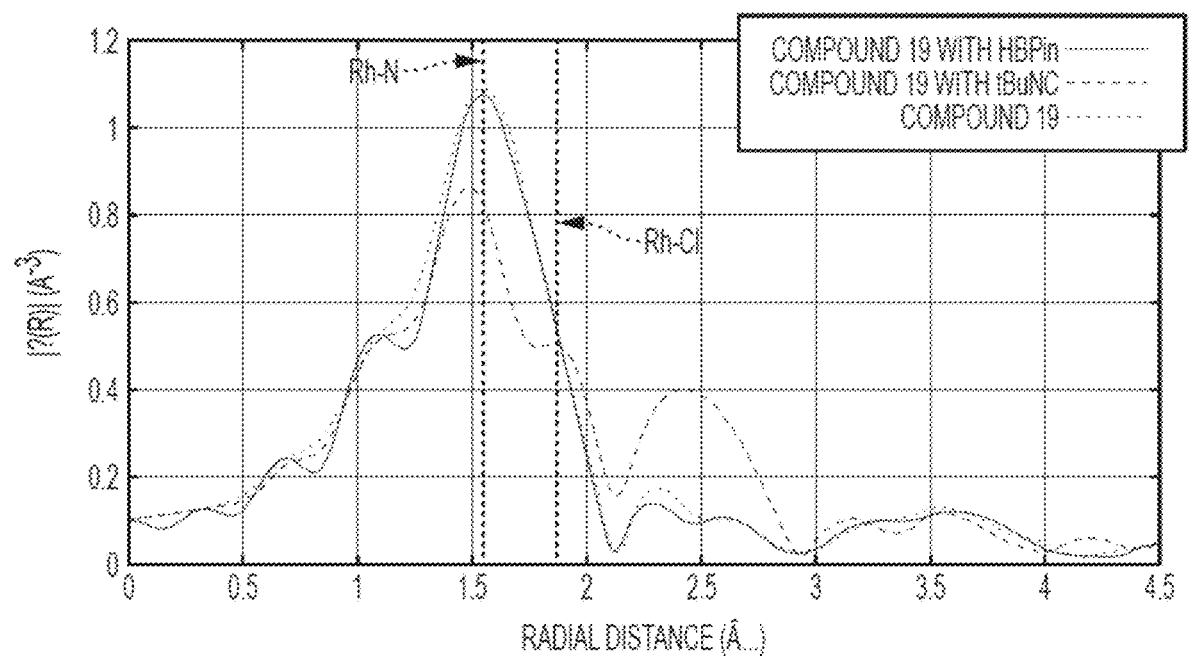

FIG. 44 is a graph depicting the effects of HBPin and tBuNC treatments on the coordination of 19 using EXAFS.

Figure 45:
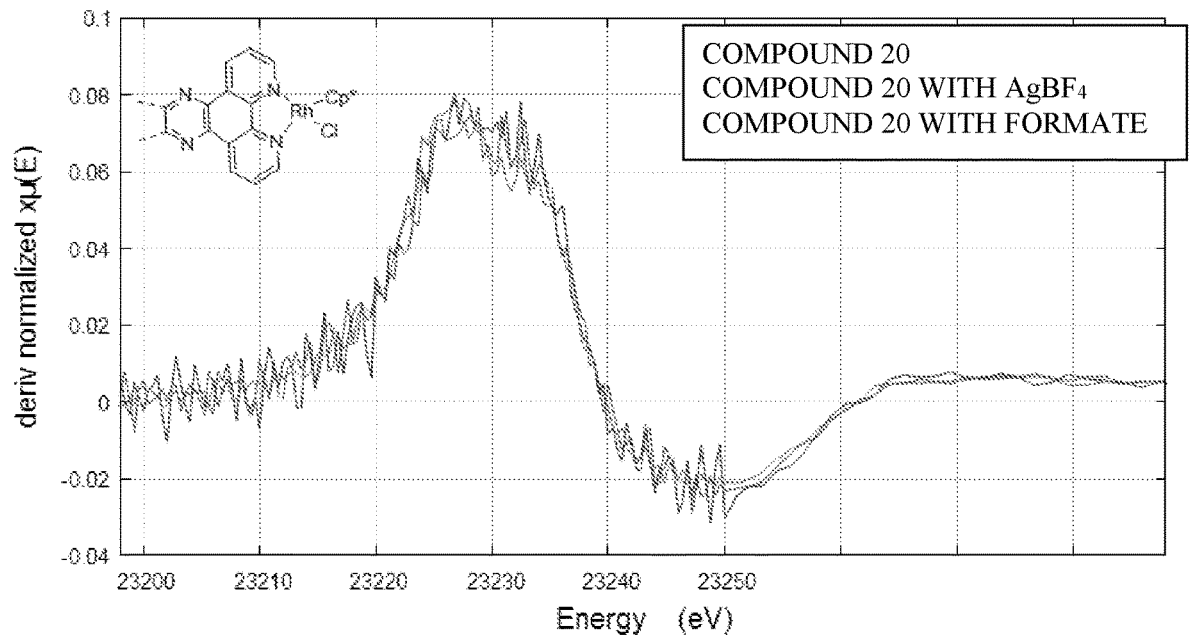

FIG. 45 is a graph depicting the effects of silver tetrafluoroborate and sodium formate treatments on the oxidation state of 20, using the derivative of the normalized Rh XANES edge.

Figure 46:
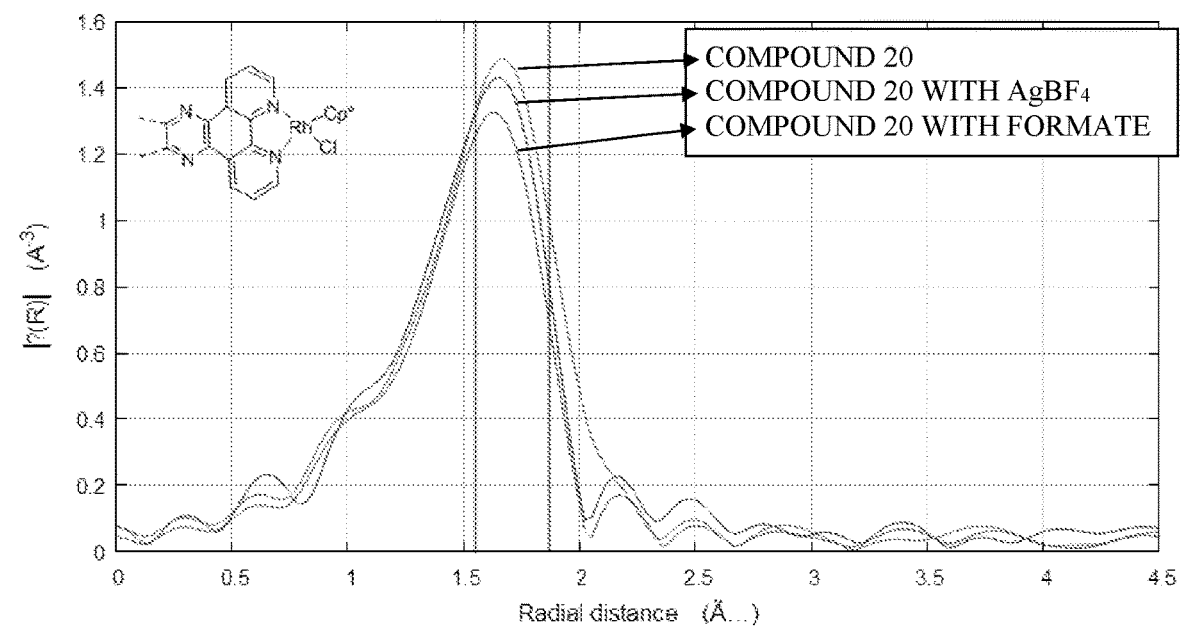

FIG. 46 is a graph depicting the effects of silver tetrafluoroborate and sodium formate treatments on the coordination of 20 using EXAFS.

Figure 47:
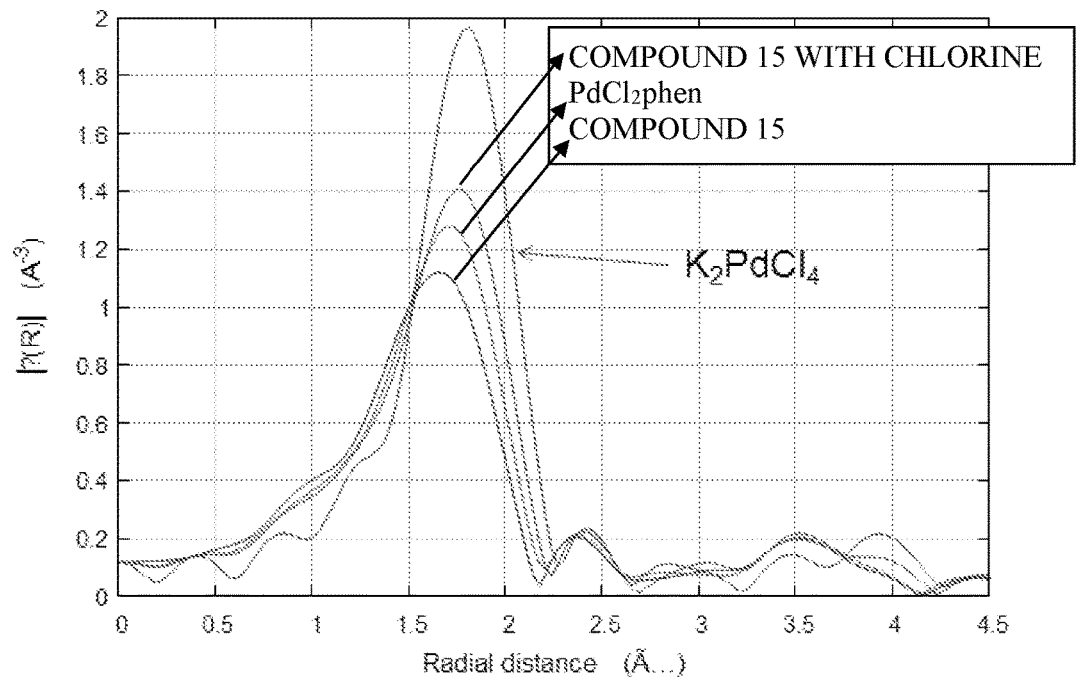

FIG. 47 is a graph depicting the effects of chlorine on the coordination of 15 using EXAFS.

Figure 48:
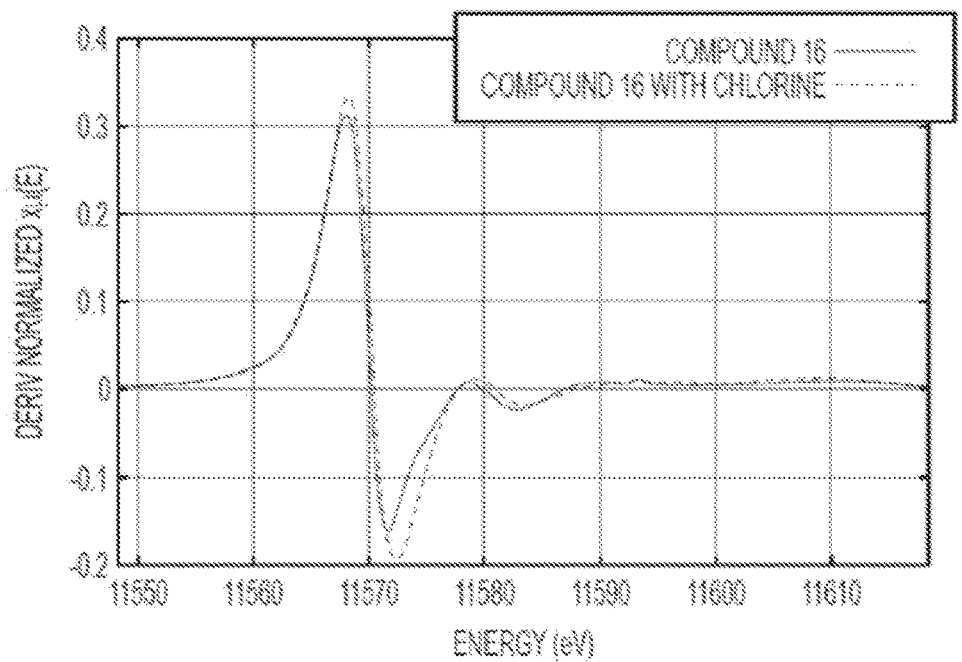

FIG. 48 is a graph depicting the effects of chlorine on the oxidation state of 16, using the derivative of the normalized Pt XANES edge.

Figure 49:
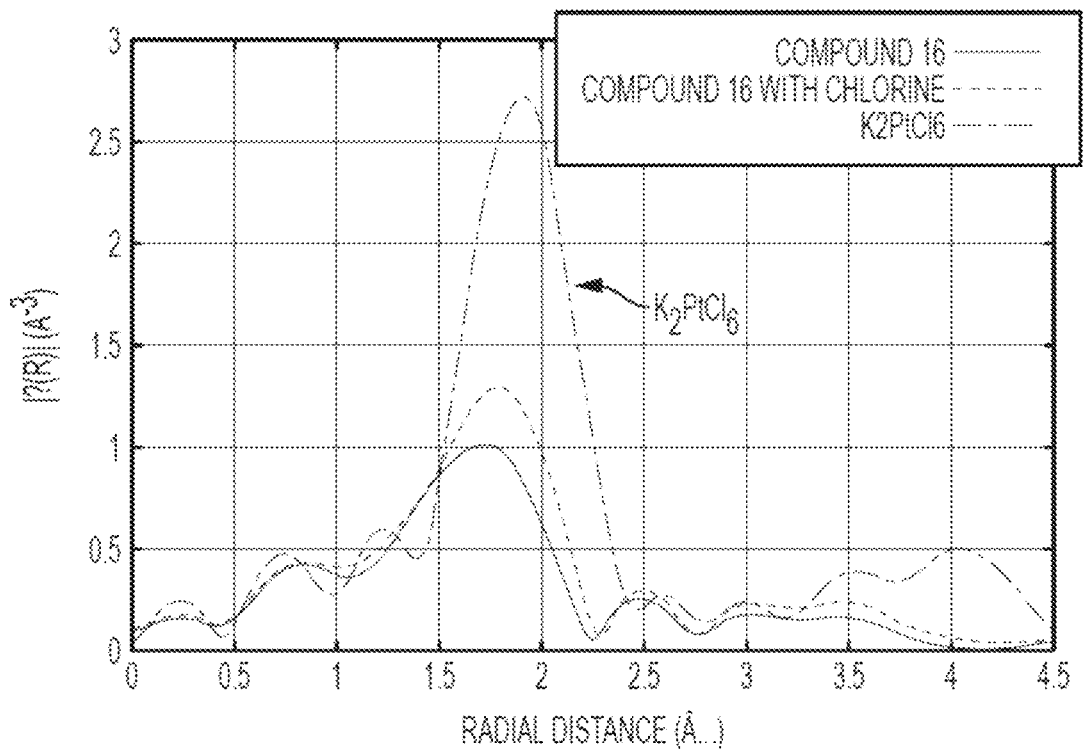

FIG. 49 is a graph depicting the effects of chlorine on the coordination of 16 using EXAFS.

Figure 50:
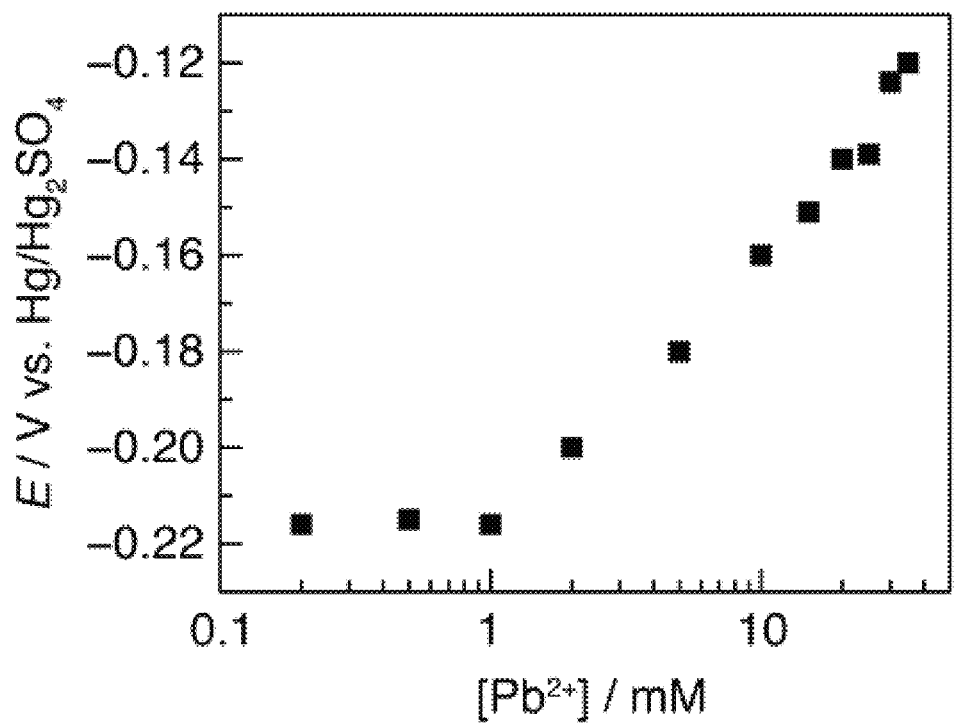

FIG. 50 is a graph depicting potential shifts of 24 with addition of $Pb^{2+}$ in pH 4 $Et_4NCl$.

Figure 51:
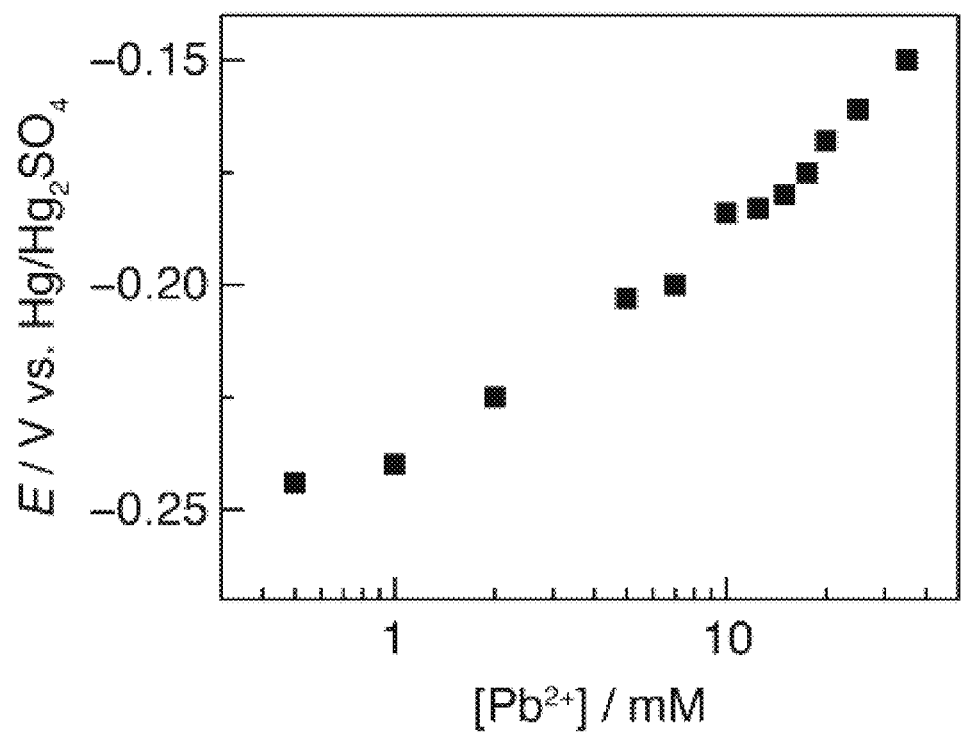

FIG. 51 is a graph depicting potential shifts of 24 with addition of $Pb^{2+}$ in pH 4 $Et_4NOAc$.

Figure 52:
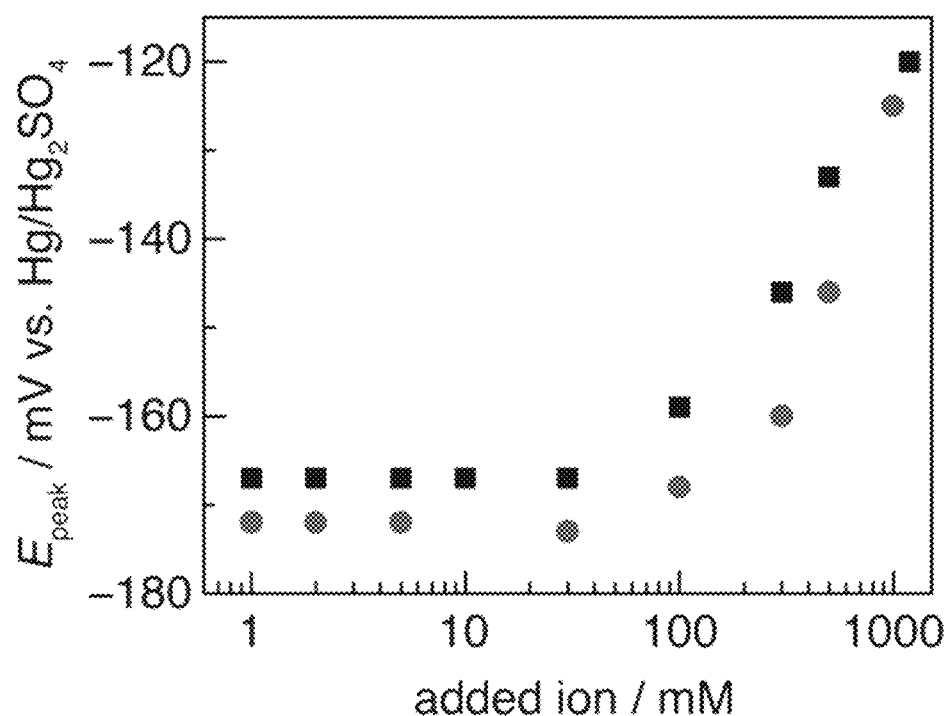

FIG. 52 is a graph depicting potential shifts of 24 with the addition of $Na^+$ ions (squares) and $K^+$ ions (circles) in pH 4 $Et_4NCl$.

Figure 53:
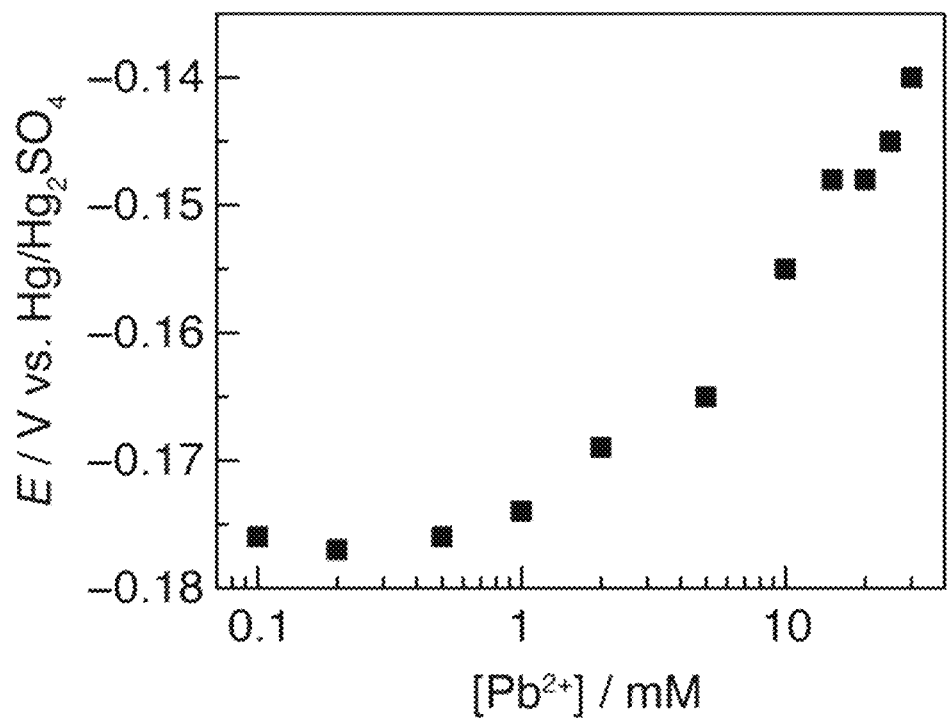

FIG. 53 is a graph depicting potential shifts of 23 with addition of $Pb^{2+}$ in pH 4 $Et_4NCl$.

Figure 54:
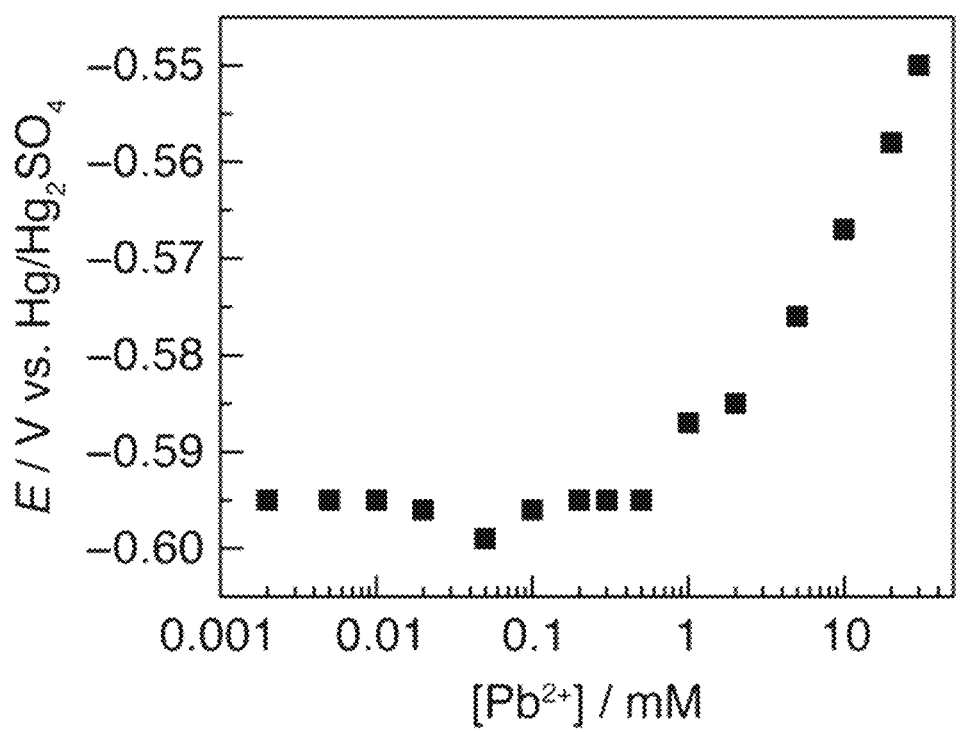

FIG. 54 is a graph depicting potential shifts of molecular phenazine 7 with addition of $Pb^{2+}$ in 0.1 M $Et_4NCl$, pH 2.

Figure 55:
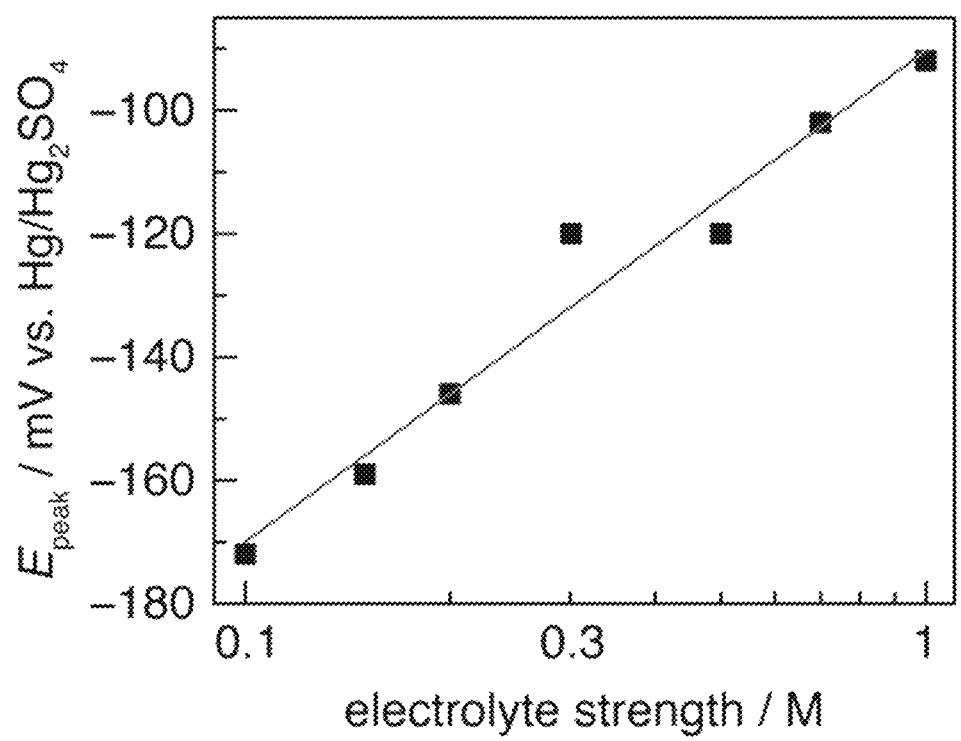

FIG. 55 is a graph depicting potential shifts of 24 with increasing electrolyte strength in $Et_4NCl$ at pH 2.

Figure 56A:
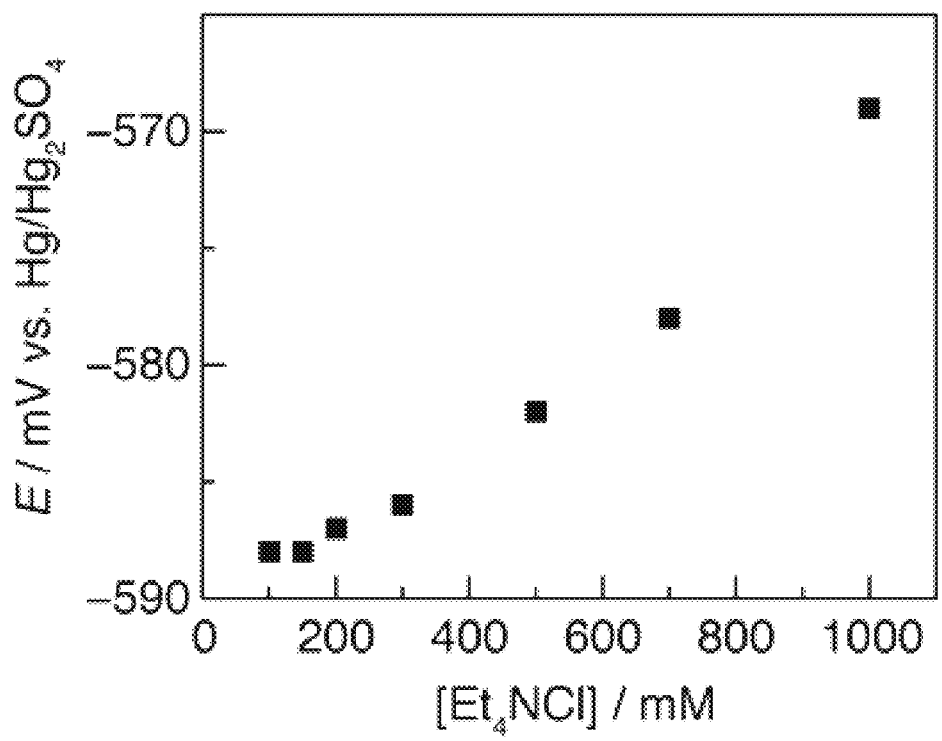

FIG. 56A is a graph depicting potential shifts of phenazine 7 with increasing electrolyte strength in $Et_4NCl$ at pH 2.

Figure 56B:
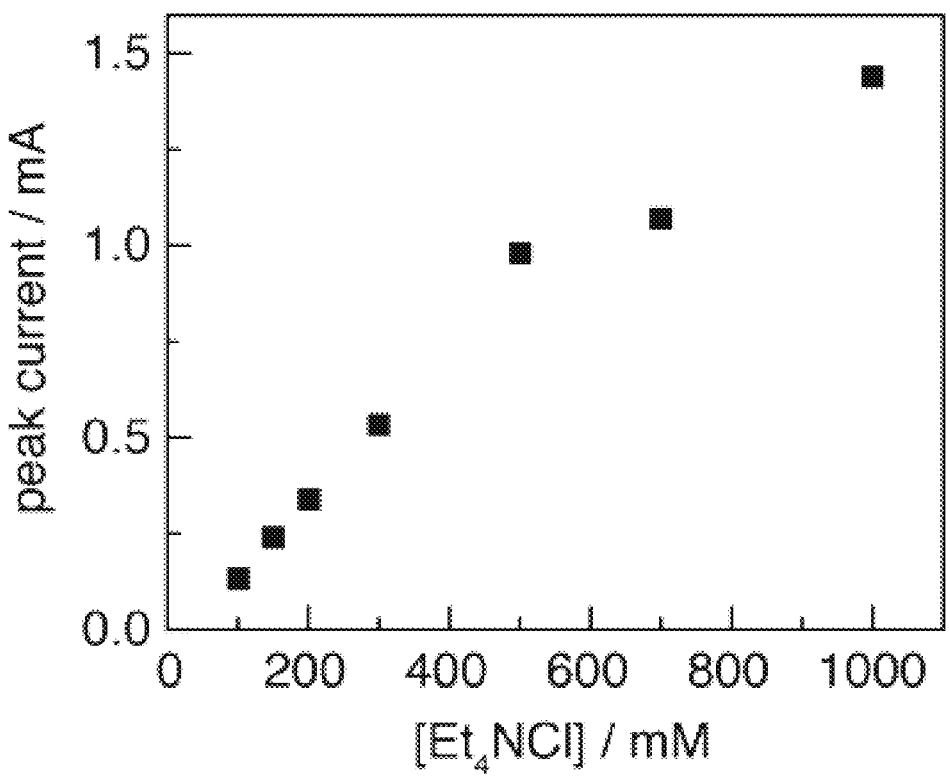

FIG. 56B is a graph depicting peak current of phenazine 7 with increasing electrolyte strength in $Et_4NCl$ at pH 2.

Figure 57A:
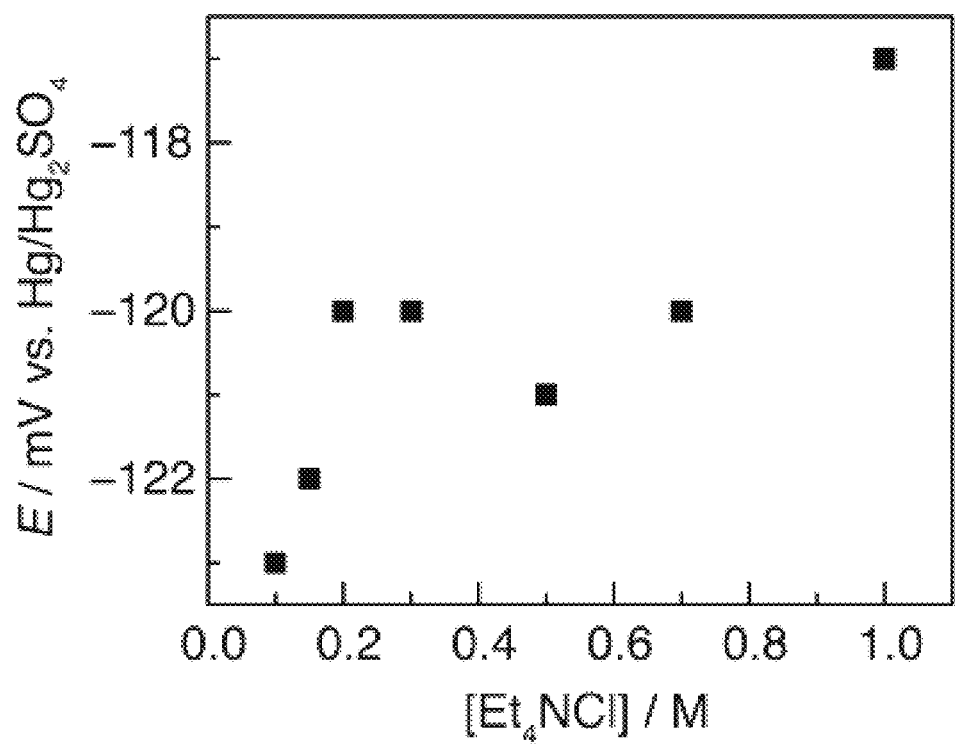

FIG. 57A is a graph depicting potential shifts of 6 with increasing electrolyte strength in $Et_4NCl$ at pH 2.

Figure 57B:
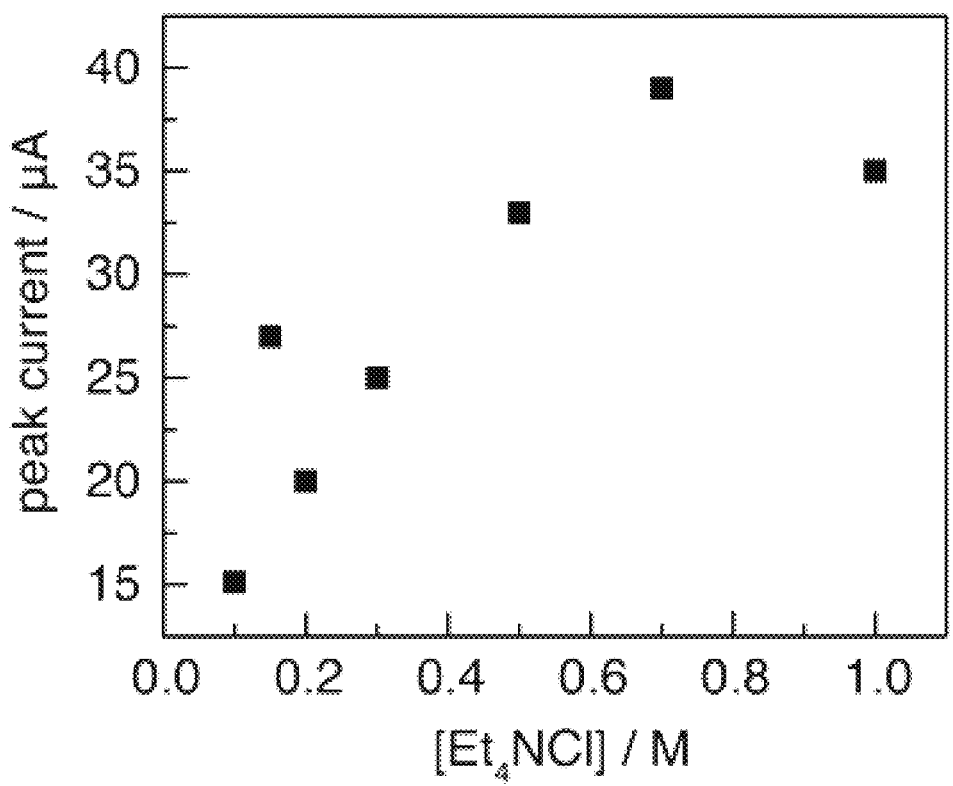

FIG. 57B is a graph depicting peak current of 6 with increasing electrolyte strength in $Et_4NCl$ at pH 2.

Figure 58A:
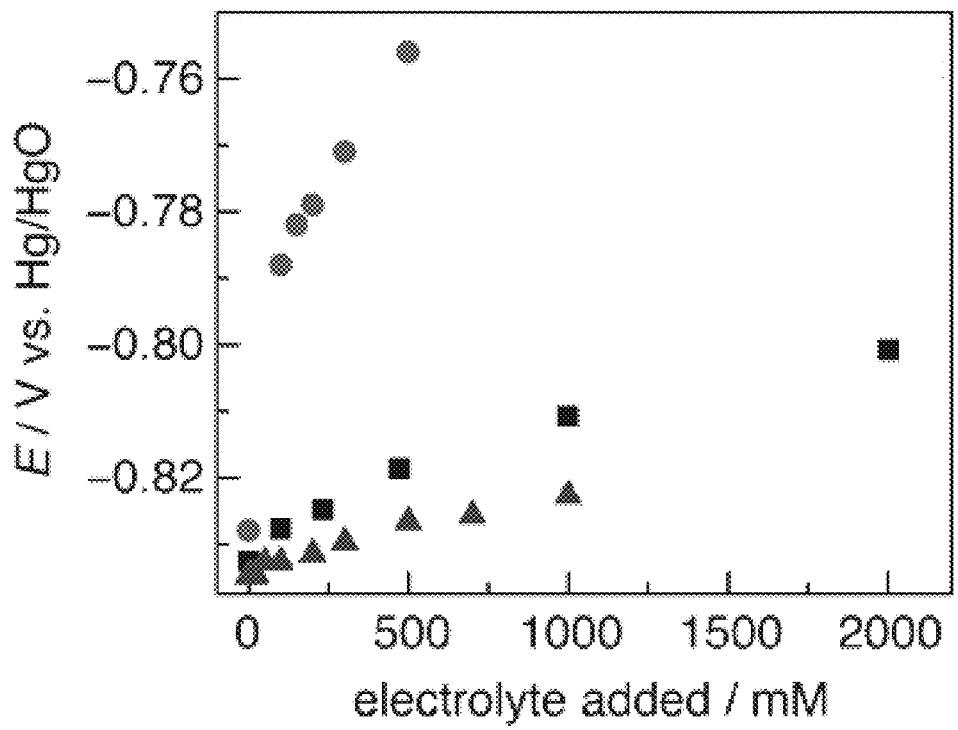

FIG. 58A is a graph depicting potential shifts of oxidized 24 with increasing electrolyte strength using $Et_4NCl$ (circles), NaCl (squares), and $Na_2SO_4$ (triangles).

Figure 58B:
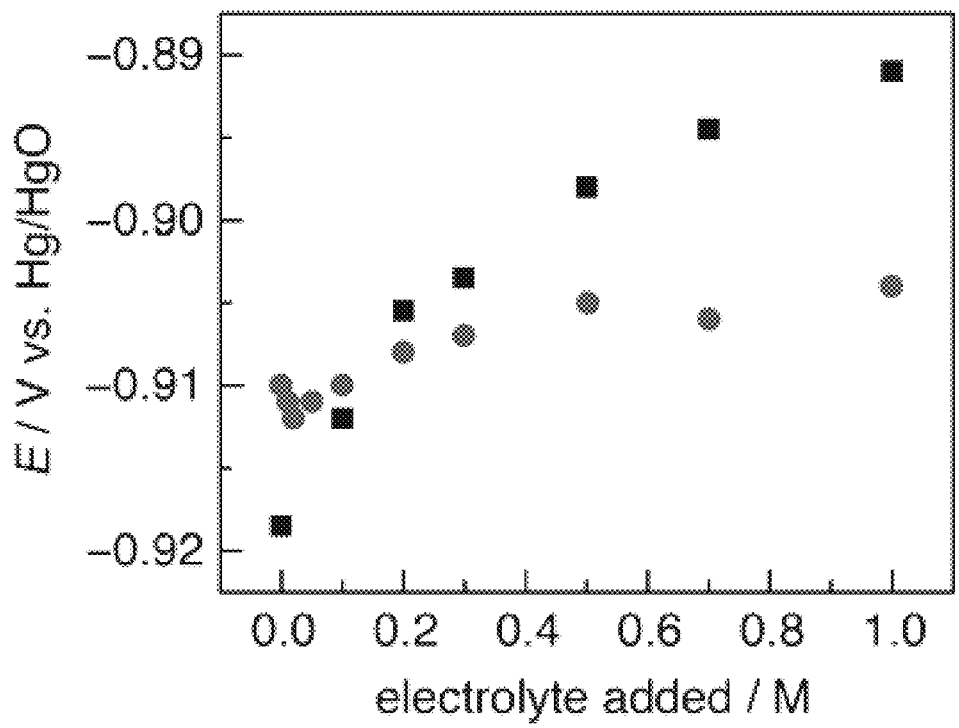

FIG. 58B is a graph depicting potential shifts of quinoxaline with increasing electrolyte strength using $Et_4NCl$ (squares) and $Na_2SO_4$ (circles).

Figure 59A:
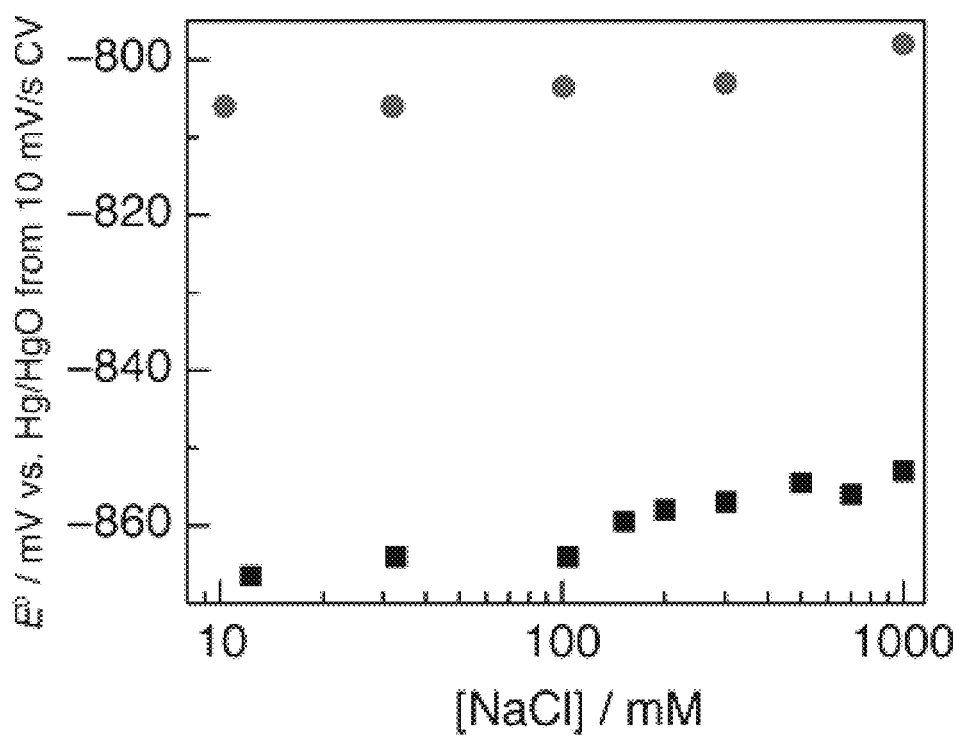

FIG. 59A is a graph depicting potential shifts from 10 mV/s CV with increasing electrolyte strength using NaCl.

Figure 59B:
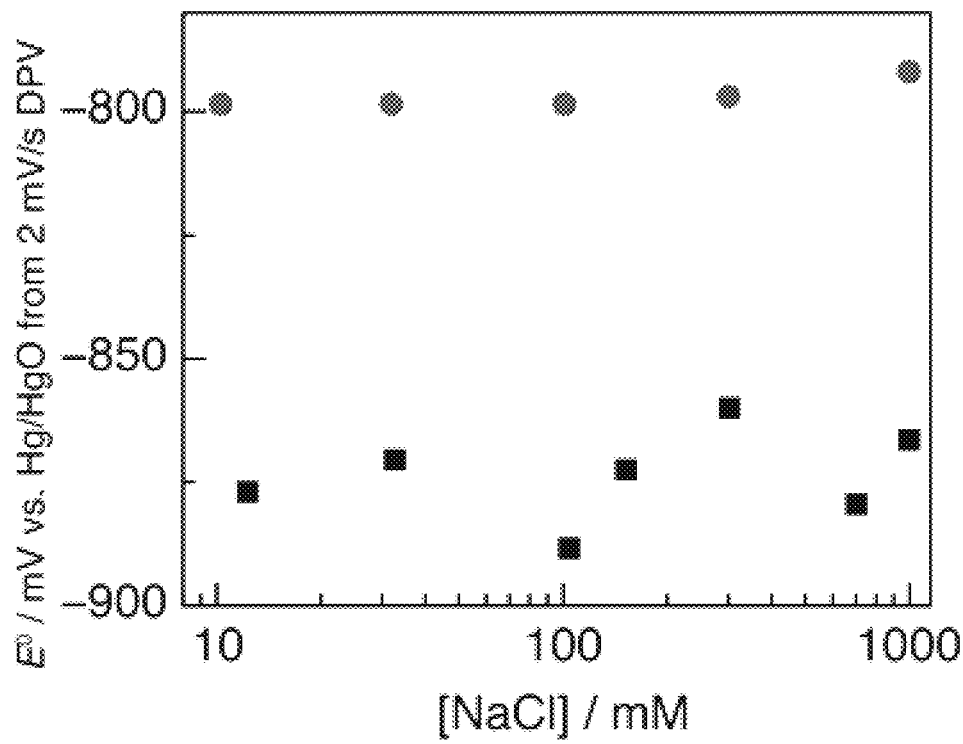

FIG. 59B is a graph depicting potential shifts from 2 mV/s DPV with increasing electrolyte strength using NaCl.

DETAILED DESCRIPTION OF THE INVENTION

Herein, we introduce an orthogonal strategy for constructing molecularly well-defined surface active sites that exploits the native surface chemistry of graphitic carbon, obviating the need for an exogenous linker. We show that condensation of ortho-phenylenediamines with ortho-quinone moieties present on the edge planes of graphitic carbons generates graphite-conjugated pyrazine (GCP) moieties that are active for oxygen reduction catalysis in alkaline aqueous electrolytes. GCPs constitute a new class of well-defined heterogeneous catalysts in which the active site reactivity can be systematically tuned at the molecular level by modifying the diamine precursor (Scheme 1). GCPs are also referred to as graphite-conjugated catalysts (GCCs).

Scheme 1.

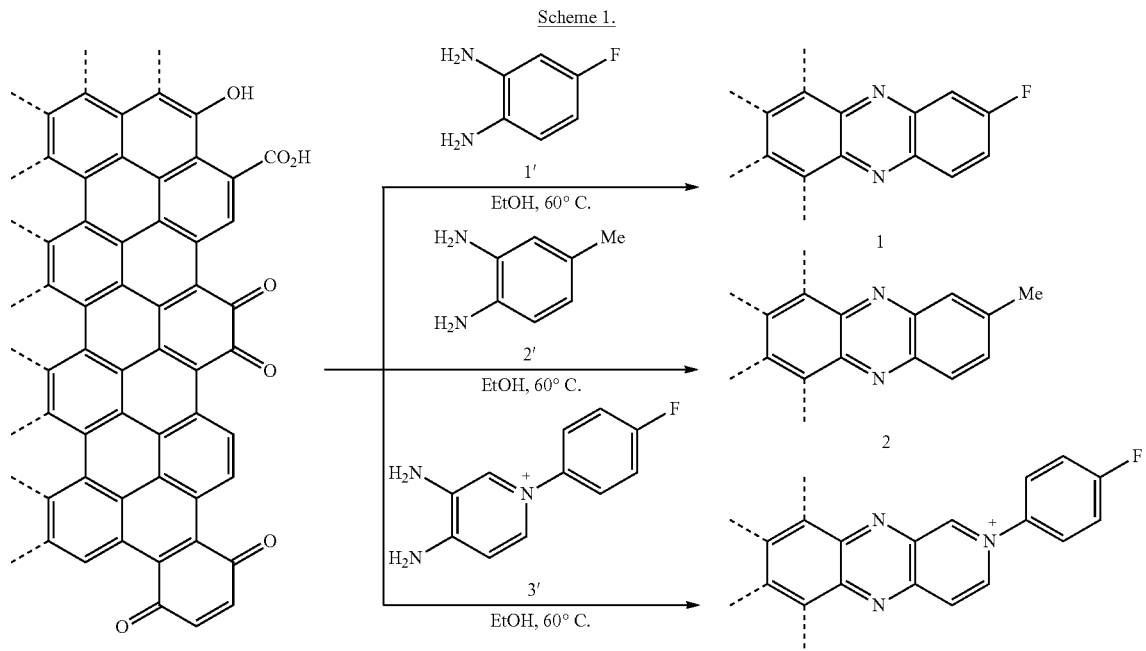

Condensation of ortho-phenylenediamine derivatives with ortho-quinone edge sites of graphene sheets to generate graphite-conjugated pyrazines (GCPs).

A simple surface functionalization strategy for conjugating transition-metal active sites to carbon surfaces exploits the native surface chemistry of graphite. This surface functionalization strategy can be used to produce GCCs and to generate well-defined, highly active, transition-metal-based surface electrocatalysts.

Definitions

For convenience, certain terms employed in the specification, examples, and appended claims are collected here. All definitions, as defined and used herein, supersede dictionary definitions, definitions in documents incorporated by reference, and/or ordinary meanings of the defined terms.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The definition of each expression, e.g., alkyl, m, n, and the like, when it occurs more than once in any structure, is intended to be independent of its definition elsewhere in the same structure.

For purposes of this invention, the chemical elements are identified in accordance with the Periodic Table of the Elements, CAS version, Handbook of Chemistry and Physics, 67th Ed., 1986-87, inside cover.

It will be understood that "substituted" or "substitution" or "substituted with" includes the implicit proviso that such substitution is in accordance with permitted valence of the substituted atom and the substituent, and that the substitution results in a stable compound, e.g., a compound which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein below. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms.

The term "lower" as used herein, when appended to any of the groups listed below, indicates that the group contains less than seven carbons (i.e., six carbons or less). For example "lower alkyl" refers to an alkyl group containing 1-6 carbons, and "lower alkenyl" refers to an alkyenyl group containing 2-6 carbons.

The term "unsaturated" as used herein pertains to compounds and/or groups which have at least one carbon-carbon double bond or carbon-carbon triple bond.

The term "aliphatic" as used herein pertains to compounds and/or groups which are linear or branched, but not cyclic (also known as "acyclic" or "open-chain" groups).

The term "cyclic" as used herein pertains to compounds and/or groups which have one ring, or two or more rings (e.g., spiro, fused, bridged). "Monocyclic" refers to compounds and/or groups with one ring; "bicyclic" refers to compounds/and or groups with two rings; polycyclic refers to compounds and/or groups with two or more rings. Cyclic compounds and/or groups can be fully aromatic, partly aromatic, or fully non-aromatic.

The term "aromatic" as used herein refers to a planar or polycyclic structure characterized by a cyclically conjugated molecular moiety containing 4n+2 electrons, wherein n is the absolute value of an integer. Aromatic molecules containing fused, or joined, rings also are referred to as bicyclic or polycyclic aromatic rings.

The term "heteroaromatic" as used herein refers to a planar or polycyclic structure characterized by a cyclically conjugated molecular moiety containing 4n+2 electrons, wherein n is the absolute value of an integer, and at least one ring heteroatom. Heteroaromatic molecules containing fused, or joined, rings also are referred to as bicyclic or polycyclic heteroaromatic rings.

The term "hydrocarbon" as used herein refers to an organic compound consisting entirely of hydrogen and carbon.

The term "heteroatom" as used herein refers to an atom of any element other than carbon or hydrogen. Illustrative heteroatoms include boron, nitrogen, oxygen, silicon, phosphorus, sulfur, and selenium.

The term "alkyl" as used herein means an aliphatic or cyclic hydrocarbon radical containing from 1 to 20, 1 to 15, or 1 to 10 carbon atoms. In certain embodiments, the term "alkyl" means an aliphatic or cyclic hydrocarbon radical containing from 1 to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 2-methylcyclopentyl, 1-(1-ethylcyclopropyl)ethyl, and 1-cyclohexylethyl.

The term "cycloalkyl" as used herein is a subset of alkyl which refers to a cyclic hydrocarbon radical containing from 3 to 15, 3 to 10, or 3 to 7 ring carbon atoms. Representative examples of cycloalkyl include, but are not limited to, cyclopropyl and cyclobutyl.

The term "alkenyl" as used herein means a straight- or branched-chain hydrocarbon radical containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl.

The term "cycloalkenyl" as used herein means a cyclic hydrocarbon radical containing from 3 to 15, 3 to 10, or 3 to 7 ring carbon atoms and containing at least one carbon-carbon double bond formed by the removal of two hydrogens. Representative examples of cycloalkenyl include, but are not limited to, 1-cyclopropenyl, 1-cyclobutenyl, 1-cyclopentenyl, and 1-cyclohexenyl.

The term "alkynyl" as used herein means a straight- or branched-chain hydrocarbon radical containing from 2 to 10 carbon atoms and containing at least one carbon-carbon triple bond. Representative examples of alkynyl include, but are not limited, to acetylenyl, 1-propynyl, 2-propynyl, 3-butynyl, 2-pentynyl, and 1-butynyl.

The term "cycloalkynyl" as used herein means a cyclic hydrocarbon radical containing from 3 to 15, 3 to 10, or 3 to 7 ring carbon atoms and containing at least one carbon-carbon triple bond formed by the removal of two hydrogens. Representative examples of cycloalkynyl include, but are not limited to, 1-cyclopropynyl, 1-cyclobutynyl, 1-cyclopentynyl, and 1-cyclohexynyl.

The term "alkylene" as used herein means a diradical obtained by removing two hydrogen atoms of an alkyl group, as defined above.

The term "carbocyclyl" as used herein means a monocyclic, bicyclic, or polycyclic (e.g., bicyclic, tricyclic, etc.) hydrocarbon radical containing from 3 to 12 carbon atoms that is completely saturated or has one or more unsaturated bonds, and for the avoidance of doubt, the degree of unsaturation does not result in an aromatic ring system (e.g., phenyl). Examples of carbocyclyl groups include 1-cyclopropyl, 1-cyclobutyl, 2-cyclopentyl, 1-cyclopentenyl, 3-cyclohexyl, 1-cyclohexenyl and 2-cyclopentenylmethyl.

The term "heterocyclyl" as used herein refers to a radical of a non-aromatic ring system, including, but not limited to, monocyclic, bicyclic, and polycyclic rings, which can be completely saturated or which can contain one or more units of unsaturation, and for the avoidance of doubt, the degree of unsaturation does not result in an aromatic ring system, and have 3 to 12 atoms including at least one heteroatom, such as nitrogen, oxygen, or sulfur. For purposes of exemplification, which should not be construed as limiting the scope of this invention, the following are examples of heterocyclic rings: aziridinyl, azirinyl, oxiranyl, thiiranyl, thiirenyl, dioxiranyl, diazirinyl, azetyl, oxetanyl, oxetyl, thietanyl, thietyl, diazetidinyl, dioxetanyl, dioxetenyl, dithietanyl, dithietyl, furyl, dioxalanyl, pyrrolyl, oxazolyl, thiazolyl, imidazolyl, oxadiazolyl, thiadiazolyl, triazolyl, triazinyl, isothiazolyl, isoxazolyl, thiophenyl, pyrazolyl, tetrazolyl, pyridyl, pyridazinyl, pyrimidinyl, pyrazinyl, triazinyl, tetrazinyl, quinolinyl, isoquinolinyl, quinoxalinyl, quinazolinyl, pyridopyrazinyl, benzoxazolyl, benzothiophenyl, benzimidazolyl, benzothiazolyl, benzoxadiazolyl, benzthiadiazolyl, indolyl, benztriazolyl, naphthyridinyl, azepines, azetidinyl, morpholinyl, oxopiperidinyl, oxopyrrolidinyl, piperazinyl, piperidinyl, pyrrolidinyl, quinicludinyl, thiomorpholinyl, tetrahydropyranyl and tetrahydrofuranyl. The heterocyclyl groups of the invention optionally may be substituted with 0, 1, 2, 3, 4, or 5 substituents independently selected from the group consisting of alkyl, alkenyl, alkynyl, halo, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkyenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfonyl, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfinyl, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluororalkylsulfinyloxy, alkenylsulfinyloxy, alkynylsulfinyloxy, alkoxy sulfinyloxy, haloalkoxysulfinyloxy, fluororalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, silyloxy, and any of said substituents bound to the heterocyclyl group through an alkylene moiety (e.g., methylene).

The term "aryl" as used herein means a phenyl, naphthyl, phenanthrenyl, or anthracenyl group. The aryl groups of the present invention optionally may be substituted with 1, 2, 3, 4, or 5 substituents independently selected from the group consisting of alkyl, alkenyl, alkynyl, halo, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkyenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfonyl, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfiny, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluororalkylsulfinyloxy, alkenylsulfinyloxy, alkynylsulfinyloxy, alkoxysulfinyloxy, haloalkoxysulfinyloxy, fluororalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, silyloxy, and any of said substituents bound to the heterocyclyl group through an alkylene moiety (e.g., methylene).

The term "arylene" as used herein means a diradical obtained by removing two hydrogen atoms of an aryl ring, as defined above.

The term "arylalkyl" or "aralkyl" as used herein means an aryl group, as defined herein, appended to the parent molecular moiety through an alkyl group, as defined herein. Representative examples of aralkyl include, but are not limited to, benzyl, 2-phenylethyl, 3-phenylpropyl, and 2-naphth-2-ylethyl.

The term "biaryl" as used herein means an aryl-substituted aryl, an aryl-substituted heteroaryl, a heteroaryl-substituted aryl, or a heteroaryl-substituted heteroaryl, wherein aryl and heteroaryl are as defined herein. Representative examples include 4-(phenyl)phenyl and 4-(4-methoxyphenyl)pyridinyl.

The term "heteroaryl" as used herein includes radicals of aromatic ring systems, including, but not limited to, monocyclic, bicyclic, and polycyclic rings, which have 3 to 12 atoms including at least one ring heteroatom, such as nitrogen, oxygen, or sulfur. For purposes of exemplification, which should not be construed as limiting the scope of this invention, examples of heteroaryl include: aminobenzimidazole, benzimidazole, azaindolyl, benzo(b)thienyl, benzimidazolyl, benzofuranyl, benzoxazolyl, benzothiazolyl, benzothiadiazolyl, benzotriazolyl, benzoxadiazolyl, furanyl, imidazolyl, imidazopyridinyl, indolyl, indolinyl, indazolyl, isoindolinyl, isoxazolyl, isothiazolyl, isoquinolinyl, oxadiazolyl, oxazolyl, purinyl, pyranyl, pyrazinyl, pyrazolyl, pyridinyl, pyrimidinyl, pyrrolyl, pyrrolo[2,3-d]pyrimidinyl, pyrazolo[3,4-d]pyrimidinyl, quinolinyl, quinazolinyl, triazolyl, thiazolyl, thiophenyl, tetrahydroindolyl, tetrazolyl, thiadiazolyl, thienyl, thiomorpholinyl, triazolyl, and tropanyl. The heteroaryl groups of the invention optionally may be substituted with 0, 1, 2, 3, 4, or 5 substituents independently selected from the group consisting of alkyl, alkenyl, alkynyl, halo, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkyenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfonyl, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfiny, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluororalkylsulfinyloxy, alkenylsulfinyloxy, alkynylsulfinyloxy, alkoxysulfinyloxy, haloalkoxysulfinyloxy, fluororalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, silyloxy, and any of said substituents bound to the heteroaryl group through an alkylene moiety (e.g., methylene).

The term "heteroarylene" as used herein pertains to a diradical obtained by removing two hydrogen atoms of a heteroaryl ring, as defined above.

The term "heteroarylalkyl" or "heteroaralkyl" as used herein means a heteroaryl, as defined herein, appended to the parent molecular moiety through an alkyl group, as defined herein. Representative examples of heteroarylalkyl include, but are not limited to, pyridin-3-ylmethyl and 2-(thien-2-yl) ethyl.

The term "fused ring" as used herein means a polycyclic ring system wherein the two or more rings are ortho-fused, where each ring contains a total of four, five, six, or seven atoms (i.e., carbons and heteroatoms) including the two fusion atoms, and each ring can be completely saturated, can contain one or more units of unsaturation, or can be completely unsaturated (e.g., in some cases, aromatic). For example, the term "fused bicyclyl" as used herein means the radical of a bicyclic ring system wherein the two rings are ortho-fused, where each ring contains a total of four, five, six, or seven atoms (i.e., carbons and heteroatoms) including the two fusion atoms, and each ring can be completely saturated, can contain one or more units of unsaturation, or can be completely unsaturated (e.g., in some cases, aromatic).

The term "halo" or "halogen" as used herein means —Cl, —Br, —I, or —F.

The term "haloalkyl" as used herein means an alkyl group, as defined herein, wherein at least one hydrogen is replaced with a halogen, as defined herein. Representative examples of haloalkyl include, but are not limited to, chloromethyl, 2-fluoroethyl, trifluoromethyl, pentafluoroethyl, and 2-chloro-3-fluoropentyl.

The term "fluoroalkyl" as used herein means an alkyl group, as defined herein, wherein some or all of the hydrogens are replaced with fluorines.

The term "haloalkylene" as used herein pertains to diradical obtained by removing two hydrogen atoms of an haloalkyl group, as defined above.

The term "hydroxyl" as used herein means an —OH group.

The term "alkoxy" as used herein means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy. The terms "alkenyloxy", "alkynyloxy", "carbocyclyloxy", and "heterocyclyloxy" are likewise defined.

The term "haloalkoxy" as used herein means an alkoxy group, as defined herein, wherein at least one hydrogen is replaced with a halogen, as defined herein. Representative examples of haloalkoxy include, but are not limited to, chloromethoxy, 2-fluoroethoxy, trifluoromethoxy, and pentafluoroethoxy. The term "fluoroalkyloxy" is likewise defined.

The term "aryloxy" as used herein means an aryl group, as defined herein, appended to the parent molecular moiety through an oxygen.

The term "heteroaryloxy" as used herein means a heteroaryl group, as defined herein, appended to the parent molecular moiety through an oxygen.

The term "arylalkoxy" or "arylalkyloxy" as used herein means an arylalkyl group, as defined herein, appended to the parent molecular moiety through an oxygen. The term "heteroarylalkoxy" is likewise defined. Representative examples of aryloxy and heteroarylalkoxy include, but are not limited to, 2-chlorophenylmethoxy, 3-trifluoromethylphenylethoxy, and 2,3-dimethylpyridinylmethoxy.

The term "sulfhydryl" or "thio" as used herein means a —SH group.

The term "alkylthio" as used herein means an alkyl group, as defined herein, appended to the parent molecular moiety through a sulfur. Representative examples of alkylthio include, but are not limited, methylthio, ethylthio, tert-butylthio, and hexylthio. The terms "haloalkylthio", "fluoroalkylthio", "alkenylthio", "alkynylthio", "carbocyclylthio", and "heterocyclylthio" are likewise defined.

The term "arylthio" as used herein means an aryl group, as defined herein, appended to the parent molecular moiety through a sulfur. The term "heteroarylthio" is likewise defined.

The term "arylalkylthio" or "aralkylthio" as used herein means an arylalkyl group, as defined herein, appended to the parent molecular moiety through an sulfur. The term "heteroarylalkylthio" is likewise defined.

The term "sulfonyl" as used herein refers to an —S(=O)$_2$— group.

The term "sulfonic acid" as used herein refers to —S(=O)$_2$OH.

The term "alkylsulfonyl" as used herein means an alkyl group, as defined herein, appended to the parent molecular moiety through a sulfonyl group, as defined herein. Representative examples of alkylsulfonyl include, but are not limited to, methylsulfonyl and ethylsulfonyl. The terms "haloalkylsulfonyl", "fluoroalkylsulfonyl", "alkenylsulfonyl", "alkynylsulfonyl", "carbocyclylsulfonyl", "heterocyclylsulfonyl", "arylsulfonyl", "aralkylsulfonyl", "heteroarylsulfonyl" and "heteroaralkylsulfonyl" are likewise defined.

The term "alkoxysulfonyl" as used herein means an alkoxy group, as defined herein, appended to the parent molecular moiety through a sulfonyl group, as defined herein. Representative examples of alkoxysulfonyl include, but are not limited to, methoxysulfonyl, ethoxysulfonyl and propoxysulfonyl. The terms "haloalkoxysulfonyl", "fluoroalkoxysulfonyl", "alkenyloxysulfonyl", "alkynyloxysulfonyl", "carbocycloxysulfonyl", "heterocyclyloxysulfonyl", "aryloxysulfonyl", "aralkyloxysulfonyl", "heteroaryloxysulfonyl" and "heteroaralkyloxysulfonyl" are likewise defined.

The terms "triflyl", "tosyl", "mesyl", and "nonaflyl" as used herein refer to trifluoromethanesulfonyl, p-toluenesulfonyl, methanesulfonyl, and nonafluorobutanesulfonyl groups, respectively. The terms "triflate", "tosylate", "mesylate", and "nonaflate" as used herein refer to trifluoromethanesulfonate ester, p-toluenesulfonate ester, methanesulfonate ester, and nonafluorobutanesulfonate ester functional groups and molecules that contain said groups, respectively.

The term "aminosulfonyl" as used herein means an amino group, as defined herein, appended to the parent molecular moiety through a sulfonyl group.

The term "sulfinyl" as used herein refers to an —S(=O)— group. The term "sulfinic acid" as used herein refers to —S(=O)OH.

The term "oxy" refers to a —O— group.

The term "carbonyl" as used herein means a —C(=O)— group.

The term "thiocarbonyl" as used herein means a —C(=S)— group.

The term "formyl" as used herein means a —C(=O)H group.

The term "acyl" as used herein refers to any group or radical of the form —C(=O)R, where R is an organic group. An example of the acyl group is the acetyl group (—C(=O)CH$_3$).

The term "alkylcarbonyl" as used herein means an alkyl group, as defined herein, appended to the parent molecular moiety through a carbonyl group, as defined herein. Representative examples of alkylcarbonyl include, but are not limited to, acetyl, 1-oxopropyl, 2,2-dimethyl-1-oxopropyl, 1-oxobutyl, and 1-oxopentyl. The terms "haloalkylcarbonyl", "fluoroalkylcarbonyl", "alkenylcarbonyl", "alkynylcarbonyl", "carbocyclylcarbonyl", "heterocyclylcarbonyl", "arylcarbonyl", "aralkylcarbonyl", "heteroarylcarbonyl", and "heteroaralkylcarbonyl" are likewise defined.

The term "carboxyl" as used herein means a —CO$_2$H group.

An "isostere of a carboxyl group" as used herein refers to a group which is isosteric to a carboxyl group. Examples of isosters of a carboxyl group include tetrazolyl, oxazolidinonyl, 3-isoxazolyl, hydroxyisoxazolyl, sulfonic acid, sulfinic acid, acylsulphonamide, phosphonic acid, phosphinic acid, hydantoin, pyrrolidionyl, boronic acid, hydroxamic acid, acylcyanamide and oxadiazolonyl.

The term "alkoxycarbonyl" as used herein means an alkoxy group, as defined herein, appended to the parent molecular moiety through a carbonyl group, as defined herein. Representative examples of alkoxycarbonyl include, but are not limited to, methoxycarbonyl, ethoxycarbonyl, and tert-butoxycarbonyl. The terms "haloalkoxycarbonyl", "fluoroalkoxycarbonyl", "alkenyloxycarbonyl", "alkynyloxycarbonyl", "carbocyclyloxycarbonyl", "heterocyclyloxycarbonyl", "aryloxycarbonyl", "aralkyloxycarbonyl", "heteroaryloxycarbonyl", and "heteroaralkyloxycarbonyl" are likewise defined.

The term "alkylcarbonyloxy" as used herein means an alkylcarbonyl group, as defined herein, appended to the parent molecular moiety through an oxygen atom. Representative examples of alkylcarbonyloxy include, but are not limited to, acetyloxy, ethylcarbonyloxy, and tert-butylcarbonyloxy. The terms "haloalkylcarbonyloxy", "fluoroalkylcarbonyloxy", "alkenylcarbonyloxy", "alkynylcarbonyloxy", "carbocyclylcarbonyloxy", "heterocyclylcarbonyloxy", "arylcarbonyloxy", "aralkylcarbonyloxy", "heteroarylcarbonyloxy", and "heteroaralkylcarbonyloxy" are likewise defined.

The term "alkylsulfonyloxy" as used herein means an alkylsulfonyl group, as defined herein, appended to the parent molecular moiety through an oxygen atom. The terms "haloalkylsulfonyloxy", "fluororalkylsulfonyloxy", "alkenylsulfonyloxy", "alkynylsulfonyloxy", "carbocyclylsulfonyloxy", "heterocyclylsulfonyloxy", "arylsulfonyloxy", "aralkylsulfonyloxy", "heteroarylsulfonyloxy", "heteroaralkylsulfonyloxy", "haloalkoxysulfonyloxy", "fluororalkoxysulfonyloxy", "alkenyloxysulfonyloxy", "alkynyloxysulfonyloxy", "carbocyclyloxysulfonyloxy", "heterocyclyloxysulfonyloxy", "aryloxysulfonyloxy", "aralkyloxysulfonyloxy", "heteroaryloxysulfonyloxy" and "heteroaralkyloxysulfonyloxy" are likewise defined.

The term "amino" or "amine" as used herein refers to —$NH_2$ and substituted derivatives thereof wherein one or both of the hydrogens are independently replaced with substituents selected from the group consisting of alkyl, haloalkyl, fluoroalkyl, alkenyl, alkynyl, carbocyclyl, heterocyclyl, aryl, aralkyl, heteroaryl, heteroaralkyl, alkylcarbonyl, haloalkylcarbonyl, fluoroalkylcarbonyl, alkenylcarbonyl, alkynylcarbonyl, carbocyclylcarbonyl, heterocyclylcarbonyl, arylcarbonyl, aralkylcarbonyl, heteroarylcarbonyl, heteroaralkylcarbonyl, sulfonyl, and sulfinyl groups defined above; or when both hydrogens together are replaced with an alkylene group (to form a ring which contains the nitrogen). Representative examples include, but are not limited to methylamino, acetylamino, and dimethylamino.

The term "amido" as used herein means an amino group, as defined herein, appended to the parent molecular moiety through a carbonyl.

The term "cyano" as used herein means a —C≡N group.
The term "nitro" as used herein means a —$NO_2$ group.
The term "azido" as used herein means a —$N_3$ group.

The term "phosphinyl" or "phosphine" as used herein includes —$PH_3$ and substituted derivatives thereof wherein one, two, or three of the hydrogens are independently replaced with substituents selected from the group consisting of alkyl, haloalkyl, fluoroalkyl, alkenyl, alkynyl, carbocyclyl, heterocyclyl, aryl, aralkyl, heteroaryl, heteroaralkyl, alkoxy, haloalkoxy, fluoroalkyloxy, alkenyloxy, alkynyloxy, carbocyclyloxy, heterocyclyloxy, aryloxy, aralkyloxy, heteroaryloxy, heteroaralkyloxy, and amino.

The term "phosphoryl" as used herein refers to —P(=O)(OH)$_2$ and substituted derivatives thereof wherein one or both of the hydroxyls are independently replaced with substituents selected from the group consisting of alkyl, haloalkyl, fluoroalkyl, alkenyl, alkynyl, carbocyclyl, heterocyclyl, aryl, aralkyl, heteroaryl, heteroaralkyl, alkoxy, haloalkoxy, fluoroalkyloxy, alkenyloxy, alkynyloxy, carbocyclyloxy, heterocyclyloxy, aryloxy, aralkyloxy, heteroaryloxy, heteroaralkyloxy, and amino.

The term "silyl" as used herein includes $H_3Si$— and substituted derivatives thereof wherein one, two, or three of the hydrogens are independently replaced with substituents selected from alkyl, haloalkyl, fluoroalkyl, alkenyl, alkynyl, carbocyclyl, heterocyclyl, aryl, aralkyl, heteroaryl, and heteroaralkyl. Representative examples include trimethylsilyl (TMS), tert-butyldiphenylsilyl (TBDPS), tert-butyldimethylsilyl (TBS/TBDMS), triisopropylsilyl (TIPS), and [2-(trimethylsilyl)ethoxy]methyl (SEM).

The term "silyloxy" as used herein means a silyl group, as defined herein, is appended to the parent molecule through an oxygen atom.

The abbreviations Me, Et, Ph, Tf, Nf, Ts, and Ms represent methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the Journal of Organic Chemistry; this list is typically presented in a table entitled Standard List of Abbreviations.

Compositions of the Invention

In one aspect, the compositions comprise graphene, and a plurality of conjugated molecules. In some embodiments, the conjugated molecules promote multi-electron catalysis.

In other embodiments, the conjugated molecule provides rigid linkage chemistry.

In some embodiments, the conjugated molecule provides redox non-innocence. For example, when a metal-ligand complex is formed by the conjugated molecule.

In another embodiment, the conjugated molecule provides electric field-modulated catalysis.

In another embodiment, the conjugated molecule provides redox co-catalysis.

An aspect of the invention is a composition, comprising graphene, and a plurality of moieties represented by Formula I:

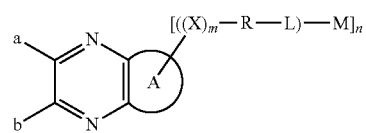

wherein, independently for each occurrence:
a and b represent covalent bonds to the graphene;
A represents a fused ring, wherein said fused ring is a mono-, bi-, tri-, or polycyclic aryl or heteroaryl moiety;
n is 0-4; and
for each occurrence of [((X)$_m$—R-L).M]:
  each X, when present, is selected from the group consisting of substituted or unsubstituted alkenyl, substituted or unsubstituted alkynyl, substituted or unsubstituted aryl, substituted or unsubstituted heteroaryl, substituted or unsubstituted arylalkenyl, substituted or unsubstituted heteroarylalkenyl, substituted or unsubstituted arylalkynyl, and substituted or unsubstituted heteroarylalkynyl; provided that when R, R-L, or L is also present, X is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;
  each R, when present, is selected from the group consisting of halo, alkyl, substituted or unsubstituted alkenyl, substituted or unsubstituted alkynyl, substituted or unsubstituted aryl, substituted or unsubstituted heteroaryl, substituted or unsubstituted arylalkenyl, substituted or unsubstituted heteroarylalkenyl, substituted or unsubstituted arylalkynyl, substituted or unsubstituted heteroarylalkynyl, haloalkyl, fluoroalkyl, hydroxy, alkoxy, alkyenyloxy, alkynyloxy, carbocycly-loxy, heterocyclyloxy, haloalkoxy, fluoroalkyloxy, sulfhydryl, alkylthio, haloalkylthio, fluoroalkylthio, alkenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfony, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfinyl, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluororalkylsulfinyloxy, alkenylsulfinyloxy, alkynylsulfinyloxy, alkoxysulfinyloxy, haloalkoxysulfinyloxy, fluororalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, and silyloxy; provided that when L is also present, R is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each L is absent or, when present, a ligand capable of binding a metal atom or a metal ion;

each M is absent or, when present, a metal atom or a metal ion; and m is 0-6;

provided that if n is 0, then A is not benzo; and if n is 1, then A[((X)$_m$—R-L).M] is not beta-nitrobenzo.

In certain embodiments, A is a mono-, bi-, tri-, or polycyclic aryl moiety.

In certain embodiments, A is benzo.

In certain embodiments, A is selected from the group consisting of naphtho, anthraceno, and phenanthreno.

In certain embodiments, A is a mono-, bi-, tri-, or polycyclic heteroaryl moiety.

In certain embodiments, A is a monocyclic heteroaryl moiety.

In certain embodiments, A is a 5-membered heteroaryl moiety.

In certain embodiments, A is selected from the group consisting of pyrrolo, furo, thiopheno, imidazo, oxazo, thiazo, and pyrazolo.

In certain embodiments, A is a 6-membered heteroaryl moiety.

In certain embodiments, A is selected from the group consisting of pyrido, pyrazino, and pyrimido.

In certain embodiments, A is selected from the group consisting of 1,8-diazaphenanthreno, 5,6-benzoquinolino, benzo(b)thieno, benzofuro, benzoimidazo, benzoimidazopyrido, benzoindazolo, benzoindolo, benzoisothiazolo, benzoisoxazo, benzopyrazino, benzopyrazolo, benzopyrido, benzopyrimido, benzopyrrolo, benzotetrazo, benzothiadiazo, benzothiazo, benzotriazo, benzoxadiazo, benzoxazo, furo, imidazo, imidazopyrido, indazolo, indolo, isoquinolino, isothiazolo, isoxazo, oxadiazo, oxazo, pyrazino, pyrazolo[3,4-d]pyrimido, pyrido, pyrimido, pyrrolo, pyrrolo[2,3-d]pyrimido, quinazolino, quinolino, tetrazo, thiadiazo, thiazo, thieno, and triazo.

In some embodiments, A is selected from the group consisting of benzo, pyrido, pyrazino, pyrimido, and diazaphenanthreno.

A "ligand capable of binding a metal atom or a metal ion" as used herein refers to a bi-, tri-, or tetradentate compound which coordinates with a metal. In certain embodiments, the ligand capable of binding a metal atom or metal ion is a tetradentate ligand which coordinates a transition metal in a substantially square planar or square pyramidal geometry. These square geometries refer to tetradentate ligands in which Lewis basic atoms of the ligands lie substantially in the same plane, with the metal also in that plane (square planar), or above or below that plane (square pyramidal). Examples of tri- and tetradentate compounds which coordinate with a metal are disclosed in U.S. Pat. No. 5,665,890 to Jacobsen et al., the entire content of which is incorporated herein by reference.

In general, any transition metal (e.g., having d electrons) may be used to coordinate with the ligand, e.g., a metal selected from one of Groups 3-12 of the periodic table or from the lanthanide series. However, in certain embodiments, the metal will be selected from the group of late transition metals, e.g., preferably from Groups 5-12, in order to provide metal centers which are coordinatively unsaturated and not in their highest oxidation state. For example, suitable metals include Cr, Mn, V, Fe, Co, Ni, Mo, Ru, W, and Re.

In certain embodiments, L is a salen.

A "salen" as used herein refers to a commonly used class of tetradentate chelating ligands used in coordination chemistry and catalysis. The simplest form of salen is N,N'-bis(salicylidene)ethylenediamine. Salens are readily prepared from condensation of a salicylaldehyde with a diamine, and many salens and metal-salen coordination complexes are commercially available. A square planar metal-salen complex can be represented as:

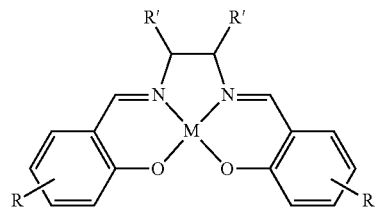

where M represents a metal atom or metal ion; each occurrence of R and R' independently represents H or an organic group, e.g., a lower alkyl, cycloalkyl, aryl, or heteroaryl; and optionally the two R' groups taken together with the carbons to which they are attached may form a ring. Examples of salens are disclosed in U.S. Pat. No. 5,665,890 to Jacobsen et al., the entire content of which is incorporated herein by reference.

In an embodiment, the moiety represented by Formula I comprises a salen and has a structural formula selected from the group consisting of:

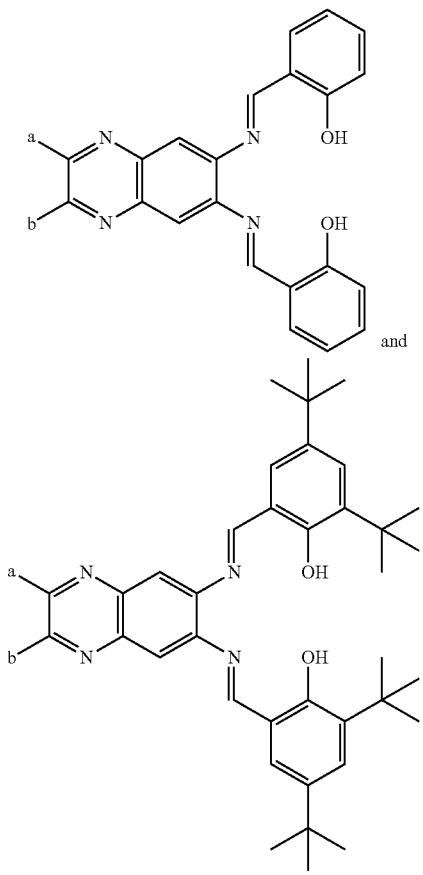

For any given occurrence of [((X)$_m$—R-L).M], any one or more of X, R, L, and M can be present or absent.

In certain embodiments, X, R, L, and M are all present.

In certain embodiments, X, R, and L are present; and M is absent.

In certain embodiments, X and R are present; and L and M are absent.

In certain embodiments, X is present; and R, L, and M are absent.

In certain embodiments, X, R, and M are present; and L is absent.

In certain embodiments, X, L, and M are present; and R is absent.

In certain embodiments, X and M are present; and R and L are absent.

In certain embodiments, R, L, and M are present; and X is absent.

In certain embodiments, R and L are present; and X and M are absent.

In certain embodiments, R is present; and X, L, and M are absent.

In certain embodiments, R and M are present; and X and L are absent.

In certain embodiments, L and M are present; and X and R are absent.

In certain embodiments, L is present; and X, R, and M are absent.

In certain embodiments, M is present; and X, R, and L are absent.

In certain embodiments, n is 1.
In certain embodiments, n is 1; and m is 0.
In certain embodiments, n is 1; and m is 1.
In certain embodiments, n is 1; and m is 2.
In certain embodiments, n is 1; and m is 3.
In certain embodiments, n is 1; and m is 4.
In certain embodiments, n is 1; and m is 5.
In certain embodiments, n is 1; and m is 6.
In certain embodiments, n is 1; and R, L, and M are present.
In certain embodiments, n is 1; R and L are present; and M is absent.
In certain embodiments, n is 1; R is present; and both L and M are absent.
In certain embodiments, n is 1; L and M are present; and R is absent.
In certain embodiments, n is 1; L is present; and both R and M are absent.
In certain embodiments, n is 2.
In certain embodiments, n is 2; and m is 0.
In certain embodiments, n is 2; and m is 1.
In certain embodiments, n is 2; and m is 2.
In certain embodiments, n is 2; and m is 3.
In certain embodiments, n is 2; and m is 4.
In certain embodiments, n is 2; and m is 5.
In certain embodiments, n is 2; and m is 6.
In certain embodiments, n is 2; and R, L, and M are present in each occurrence of [((X)$_m$—R-L).M].
In certain embodiments, n is 2; R and L are present; and M is absent in each occurrence of [((X)$_m$—R-L).M].
In certain embodiments, n is 2; R is present; and both L and M are absent in each occurrence of [((X)$_m$—R-L).M].
In certain embodiments, n is 2; L and M are present; and R is absent in each occurrence of [((X)$_m$—R-L).M].
In certain embodiments, n is 2; L is present; and both R and M are absent in each occurrence of [((X)$_m$—R-L).M].
In certain embodiments, n is 2, and each occurrence of [((X)$_m$—R-L).M] need not be identical. For example, R, L, and M are present in one occurrence of [((X)$_m$—R-L).M]; and in another occurrence of [((X)$_m$—R-L).M], R and L are present; and M is absent.
In certain embodiments, n is 3.
In certain embodiments, n is 3; and m is 0.
In certain embodiments, n is 3; and m is 1.
In certain embodiments, n is 3; and m is 2.
In certain embodiments, n is 3; and m is 3.
In certain embodiments, n is 3; and m is 4.
In certain embodiments, n is 3; and m is 5.
In certain embodiments, n is 3; and m is 6.
In certain embodiments, n is 3; and R, L, and M are present in each occurrence of [((X)$_m$—R-L).M].
In certain embodiments, n is 3; R and L are present; and M is absent in each occurrence of [((X)$_m$—R-L).M].
In certain embodiments, n is 3; R is present; and both L and M are absent in each occurrence of [((X)$_m$—R-L).M].
In certain embodiments, n is 3; L and M are present; and R is absent in each occurrence of [((X)$_m$—R-L).M].
In certain embodiments, n is 3; L is present; and both R and M are absent in each occurrence of [((X)$_m$—R-L).M].
In certain embodiments, n is 3, and each occurrence of [((X)$_m$—R-L).M] need not be identical. For example, R, L, and M are present in one occurrence of [((X)$_m$—R-L).M]; and in another occurrence of [((X)$_m$—R-L).M], R and L are present; and M is absent.
In certain embodiments, n is 4.
In certain embodiments, n is 4; and m is 0.
In certain embodiments, n is 4; and m is 1.
In certain embodiments, n is 4; and m is 2.
In certain embodiments, n is 4; and m is 3.

In certain embodiments, n is 4; and m is 4.
In certain embodiments, n is 4; and m is 5.
In certain embodiments, n is 4; and m is 6.
In certain embodiments, n is 4; and R, L, and M are present in each occurrence of [((X)$_m$—R-L).M].
In certain embodiments, n is 4; R and L are present; and M is absent in each occurrence of [((X)$_m$—R-L).M].
In certain embodiments, n is 4; R is present; and both L and M are absent in each occurrence of [((X)$_m$—R-L).M].
In certain embodiments, n is 4; L and M are present; and R is absent in each occurrence of [((X)$_m$—R-L).M].
In certain embodiments, n is 4; L is present; and both R and M are absent in each occurrence of [((X)$_m$—R-L).M].
In certain embodiments, n is 4, and each occurrence of [((X)$_m$—R-L).M] need not be identical. For example, R, L, and M are present in one occurrence of [((X)$_m$—R-L).M]; and in another occurrence of [((X)$_m$—R-L).M], R and L are present; and M is absent.
In certain embodiments, the moieties represented by Formula I are selected from the group consisting of

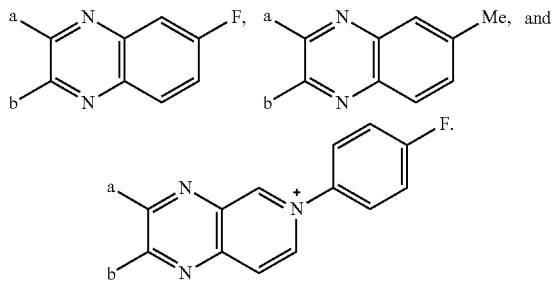

In another embodiment, A is selected from the group consisting of a monocylic aryl moiety or a monocyclic heteroaryl moiety.
In yet another embodiment, A is selected from the group consisting of benzo or pyrido.
In still another embodiment, A is selected from the group consisting of benzo or pyrido; and n is 1.
In a further embodiment, n is 1; m is 0; R is present; and both L and M are absent in [((X)$_m$—R-L).M].
In another embodiment, n is 1; m is 0; R is selected from the group consisting of halo, alkyl, alkoxy, hydroxy, carboxyl, substituted aryl, and substituted heteroaryl; and L, and M are absent in [((X)$_m$—R-L).M].
In still another embodiment, n is 1; m is 0; R is selected from the group consisting of halo, alkyl, carboxyl, and substituted aryl; and L, and M are absent in [((X)$_m$—R-L).M].
In certain embodiments, the moieties represented by Formula I are selected from the group consisting of

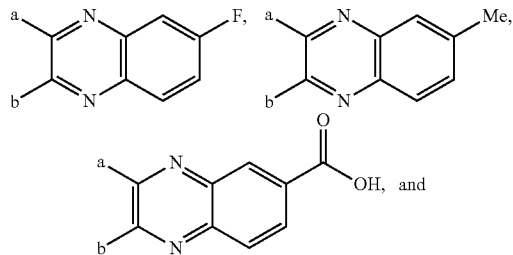

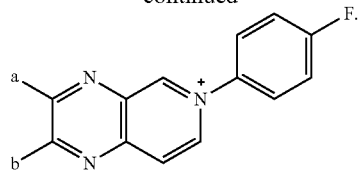

In some embodiments, a moiety represented by Formula I comprises a transition-metal-based surface electrocatalyst. For example, fac-Re(1,10-phenanthroline) (CO)$_3$Cl. Re(phen)(CO)$_3$Cl (compound 10) fragments served as a model system. Rhenium coordination compounds of this general form are known catalysts for carbon dioxide reduction (CDR) to CO, and have been immobilized onto electrode surfaces via electropolymerization and adsorption on polymeric and graphitic surfaces. In some embodiments, graphite-conjugated transition-metal electrocatalysts comprising a moiety represented by Formula I have advantages including, but not limited to, reasonable catalyst lifetimes, acceptable conductivity, and/or activity and selectivity similar to discrete molecular species. In other embodiments, graphite-conjugated transition-metal electrocatalysts comprising a moiety represented by Formula I have improved stability and durability.

In some embodiments, a moiety represented by Formula I behaves as a metallic active site, rather than a tethered complex.

In other embodiments, a moiety represented by Formula I can be modified to optimize substrate binding.

In one embodiment, A is a monocylic aryl moiety. In another embodiment, A is benzo, and n is 1. In yet another embodiment, n is 1; m is 0; R, L, and M are present in [((X)$_m$—R-L).M].

In still another embodiment, A is benzo; n is 1; m is 0; R is selected from the group consisting of alkyl or unsubstituted alkynyl; and L and M are present in [((X)$_m$—R-L).M].

In certain embodiments, the moieties represented by Formula I are selected from the group consisting of

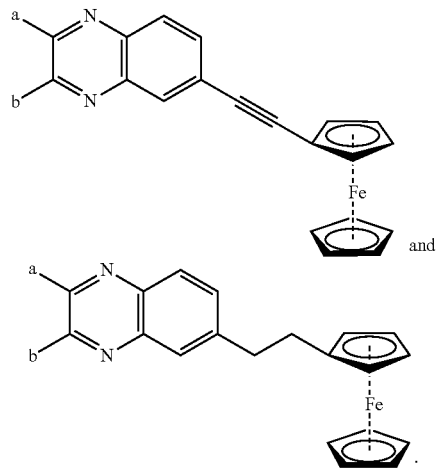

In some embodiments, A is a bi- or tricyclic heteroaryl moiety.

In another embodiment, A is a bi- or tricyclic heteroaryl moiety; n is 2; in each occurrence of [((X)$_m$—R-L).M], m is 0 and R is absent; L and M are both present in one occurrence of [((X)$_m$—R-L).M]; and L is present and M is absent in the other occurrence of [((X)$_m$—R-L).M].

In yet another embodiment, n is 2; in each occurrence of [((X)$_m$—R-L).M], m is 0; R is absent; and L is present; the first L and the second L together may form a compound which coordinates with a metal atom or a metal ion. In some embodiments, the moiety represented by Formula I comprises a moiety wherein ring A is fused to ligand L.

In another embodiment, the first L and the second L together may form a compound which coordinates with a metal atom or a metal ion, wherein the compound which coordinates with a metal atom or a metal ion is selected from the group consisting of crown ether, porphyrin, and salen.

In still another embodiment, the moieties represented by Formula I are selected from the group consisting of

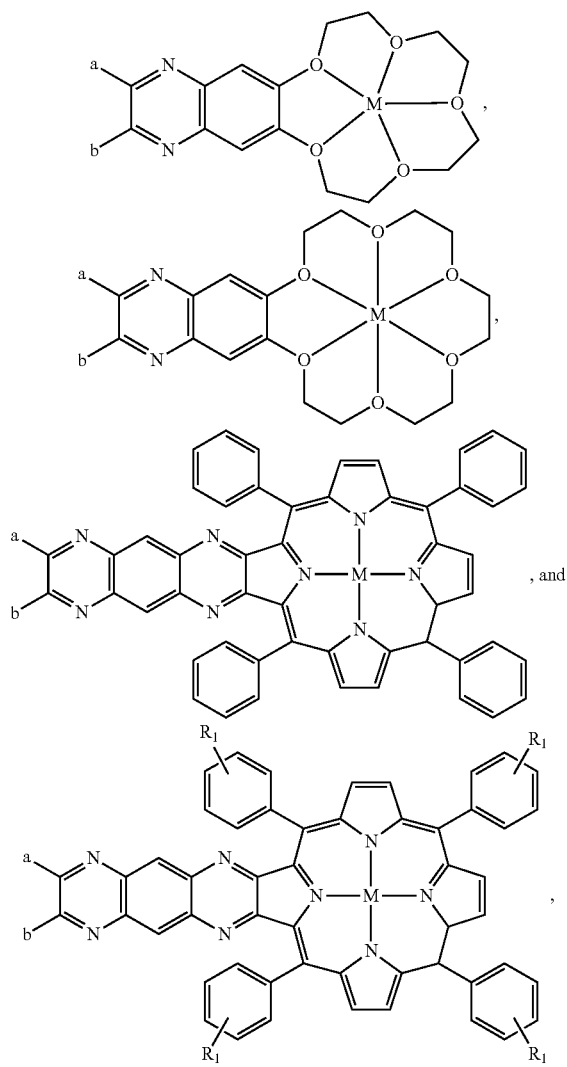

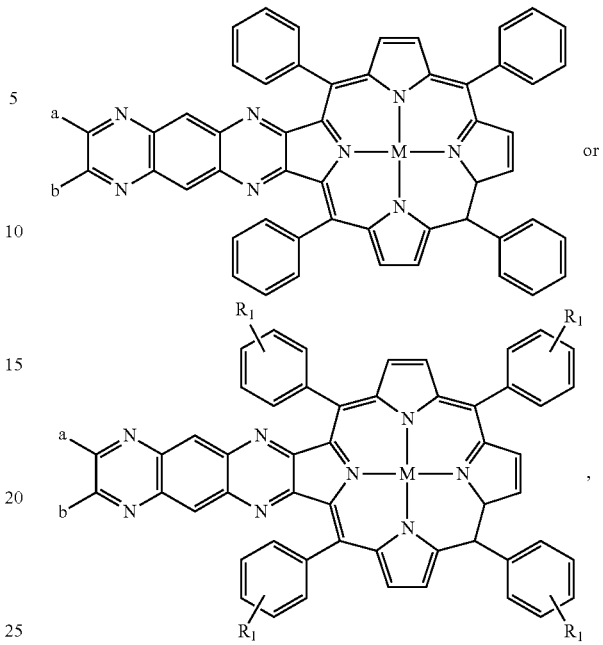

wherein $R_1$, independently at each occurrence, is selected from the group consisting of halo, alkyl, substituted or unsubstituted aryl, substituted or unsubstituted heteroaryl, hydroxy, sulfhydryl, aminosulfonyl, sulfinic acid, aminosulfinyl, formyl, carboxyl, amino, amido, aminosulfonyl, aminosulfinyl, cyano, nitro, azido, phosphinyl, phosphoryl, silyl, and silyloxy.

In some embodiments, A is a tricyclic heteroaryl moiety. In other embodiments, A is diazaphenanthreno.

In other embodiments, when M is present, and X, R, and L are absent, the metal atom or the metal ion is associated with additional ligands (i.e., the metal atom or the metal ion is coordinatively unsaturated with respect to the moiety of formula I alone).

In some embodiments, exemplary additional ligands associated with a metal atom or a metal ion include a halo (e.g., Cl), 2,2'-bipyridine, carbon monoxide (CO), 1,5-cyclooctadiene, cyclopentadienyl (Cp), dibenzothiophene, 2,5-dimethylthiophene, pentamethylcyclopentadiene (Cp*), thiophene, and 2,2',2"-tripyridine.

In another embodiment, additional ligands associated with a metal atom or a metal ion are selected from the group consisting of halo (e.g., chloro), carbon monoxide (—CO), 2,2'-bipyridine, 1,5-cyclooctadiene, cyclopentadienyl, pentamethylcyclopentadiene, and 2,2',2"-tripyridine.

In yet another embodiment, the moiety represented by Formula I is selected from the group consisting of wherein $R_1$, independently at each occurrence, is selected from the group consisting of halo, alkyl, substituted or unsubstituted aryl, substituted or unsubstituted heteroaryl, hydroxy, sulfhydryl, aminosulfonyl, sulfinic acid, aminosulfinyl, formyl, carboxyl, amino, amido, aminosulfonyl, aminosulfinyl, cyano, nitro, azido, phosphinyl, phosphoryl, silyl, and silyloxy.

In yet another embodiment, the moieties represented by Formula I are

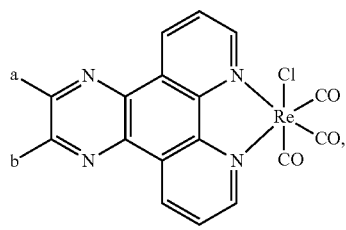

-continued

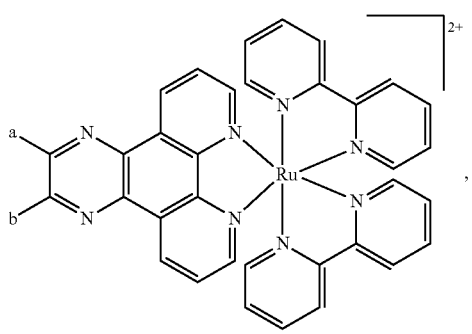,

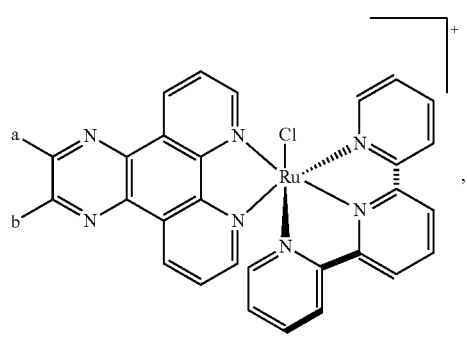,

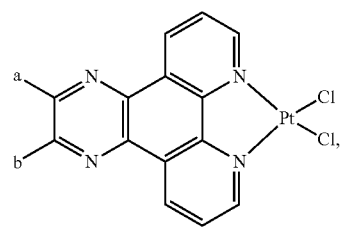,

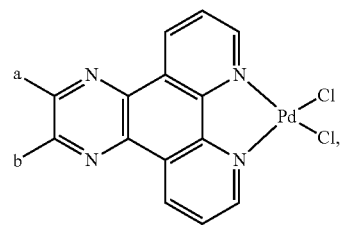,

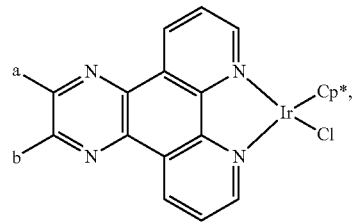,

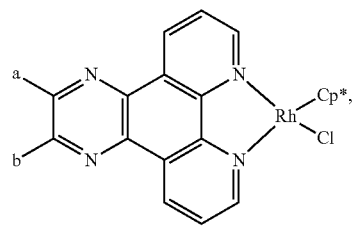

-continued

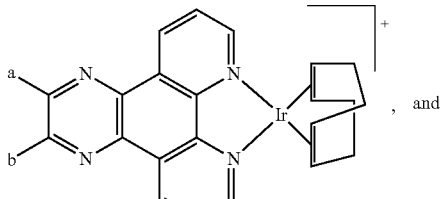, and

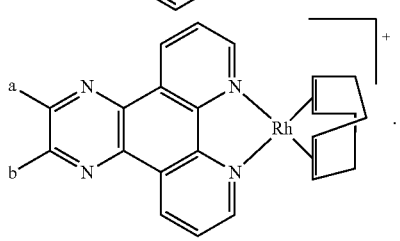.

In some embodiments disclosed herein, the moieties represented by Formula I are selected from the following Table 1, which also includes certain reference compounds not conjugated to graphite.

TABLE 1

Exemplary moieties represented by Formula I, and various compounds of the invention.

| Cmpd | Structure |
|---|---|
| 1 | a pyrazino-quinoxaline with F substituent |
| 2 | a pyrazino-quinoxaline with Me substituent |
| 3 | a pyrazino-quinoxaline with N+-(4-fluorophenyl) substituent |
| 4 | a pyrazino-quinoxaline with COOH substituent |
| 5 | a dihydro pyrazino-quinoxaline with COOH substituent |
| 6 | a pyrazino-quinoxaline |

TABLE 1-continued

Exemplary moieties represented by Formula I, and various compounds of the invention.

| Cmpd | Structure |
|------|-----------|
| 7 | |
| 8 | |
| 9 | |
| 10 | |
| 11 | |
| 12 | |
| e | |
| 14 | |
| 15 | |
| 16 | |

TABLE 1-continued

Exemplary moieties represented by Formula I, and various compounds of the invention.

| Cmpd | Structure |
|---|---|
| 17 | 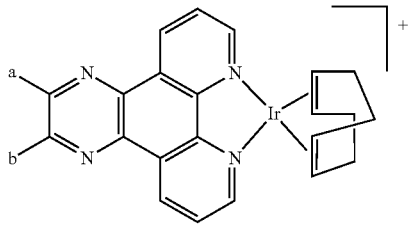 |
| 18 | 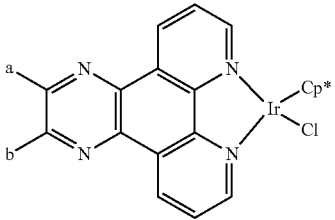 |
| 19 | 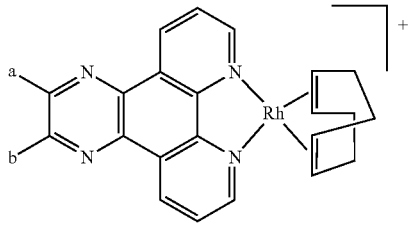 |
| 20 | 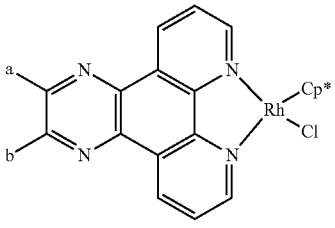 |
| 21 | 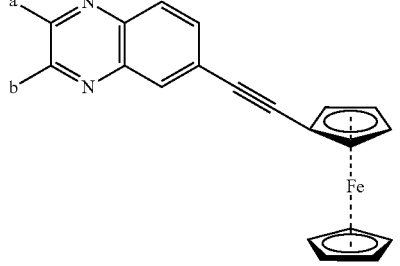 |
| 22 | 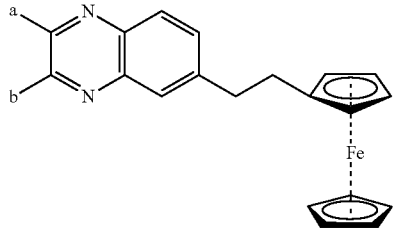 |
| 23 | 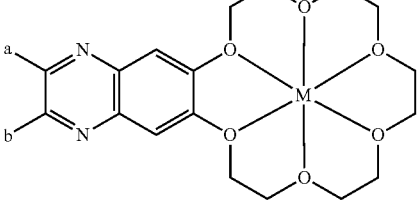 |
| 24 | 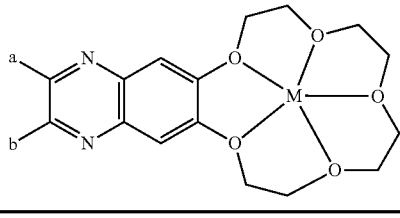 |

In certain embodiments, the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

In certain embodiments, the composition further comprises silica, alumina, or unmodified carbon.

Devices Comprising Compositions of the Invention

An aspect of the invention is an electrochemical half-cell, comprising a composition of the invention.

An aspect of the invention is a fuel cell, comprising a first electrochemical half-cell comprising a composition of the invention; a second electrochemical half-cell; and an electrolyte in contact with the first electrochemical half-cell and the second electrochemical half-cell.

A fuel cell is a device that converts the chemical energy from a fuel into electricity through a chemical reaction of positively charged hydrogen ions with oxygen or another oxidizing agent. There are many types of fuel cells, but they all consist of an anode, a cathode, and an electrolyte that allow positively charged hydrogen ions (or protons) to move between the two sides of the fuel cell. The anode and cathode contain catalysts that cause the fuel to undergo oxidation reactions that generate positive hydrogen ions and electrons. The hydrogen ions are drawn through the electrolyte after the reaction. At the same time, electrons are drawn from the anode to the cathode through an external circuit, producing direct current electricity. At the cathode, hydrogen ions, electrons, and oxygen react to form water (e.g., oxygen reduction reaction).

In certain embodiments, the electrolyte is an aqueous alkaline solution.

In certain embodiments, the second electrochemical half-cell is air or another gaseous mixture comprising oxygen.

An aspect of the invention is a catalytic reactor, comprising the composition of the invention.

Methods of the Invention

An aspect of the invention is a method of making a composition, comprising
combining graphene, a $C_1$-$C_6$ alcohol, and a compound represented by Formula II:

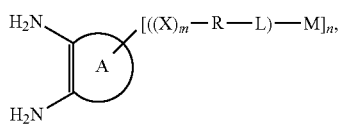

thereby forming a reaction mixture; and
heating the reaction mixture at about 60-120° C., thereby forming the composition, wherein, independently for each occurrence:

A represents a mono-, bi-, tri-, or polycyclic aryl or heteroaryl moiety;

n is 0-4; and for each occurrence of $[((X)_m\text{—}R\text{-}L).M]$:

each X, when present, is selected from the group consisting of substituted or unsubstituted alkenyl, substituted or unsubstituted alkynyl, substituted or unsubstituted aryl, substituted or unsubstituted heteroaryl, substituted or unsubstituted aryl alkenyl, substituted or unsubstituted heteroarylalkenyl, substituted or unsubstituted arylalkynyl, and substituted or unsubstituted heteroarylalkynyl; provided that when R, R-L, or L is also present, X is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each R, when present, is selected from the group consisting of halo, alkyl, substituted or unsubstituted alkenyl, substituted or unsubstituted alkynyl, substituted or unsubstituted aryl, substituted or unsubstituted heteroaryl, substituted or unsubstituted aryl alkenyl, substituted or unsubstituted heteroarylalkenyl, substituted or unsubstituted arylalkynyl, substituted or unsubstituted heteroarylalkynyl, haloalkyl, fluoroalkyl, hydroxy, alkoxy, alkyenyloxy, alkynyloxy, carbocyclyloxy, heterocyclyloxy, haloalkoxy, fluoroalkyloxy, sulfhydryl, alkylthio, haloalkylthio, fluoroalkylthio, alkenylthio, alkynylthio, sulfonic acid, alkylsulfonyl, haloalkylsulfonyl, fluororalkylsulfonyl, alkenylsulfonyl, alkynylsulfonyl, alkoxysulfonyl, haloalkoxysulfonyl, fluororalkoxysulfonyl, alkenyloxysulfonyl, alkynyloxysulfony, aminosulfonyl, sulfinic acid, alkylsulfinyl, haloalkylsulfinyl, fluororalkylsulfinyl, alkenylsulfinyl, alkynylsulfinyl, alkoxysulfinyl, haloalkoxysulfinyl, fluororalkoxysulfinyl, alkenyloxysulfinyl, alkynyloxysulfinyl, aminosulfinyl, formyl, alkylcarbonyl, haloalkylcarbonyl, fluoroalkylcarbonyl, alkenylcarbonyl, alkynylcarbonyl, carboxyl, alkoxycarbonyl, haloalkoxycarbonyl, fluoroalkoxycarbonyl, alkenyloxycarbonyl, alkynyloxycarbonyl, alkylcarbonyloxy, haloalkylcarbonyloxy, fluoroalkylcarbonyloxy, alkenylcarbonyloxy, alkynylcarbonyloxy, alkylsulfonyloxy, haloalkylsulfonyloxy, fluororalkylsulfonyloxy, alkenylsulfonyloxy, alkynylsulfonyloxy, haloalkoxysulfonyloxy, fluororalkoxysulfonyloxy, alkenyloxysulfonyloxy, alkynyloxysulfonyloxy, alkylsulfinyloxy, haloalkylsulfinyloxy, fluororalkylsulfinyloxy, alkenylsulfinyloxy, alkynylsulfinyloxy, alkoxysulfinyloxy, haloalkoxysulfinyloxy, fluororalkoxysulfinyloxy, alkenyloxysulfinyloxy, alkynyloxysulfinyloxy, aminosulfinyloxy, amino, amido, aminosulfonyl, aminosulfinyl, cyano, nitro, azido, phosphinyl, phosphoryl, silyl, and silyloxy; provided that when L is also present, R is selected from the group consisting of substituted alkenyl, substituted alkynyl, substituted aryl, substituted heteroaryl, substituted arylalkenyl, substituted heteroarylalkenyl, substituted arylalkynyl, and substituted heteroarylalkynyl;

each L is absent or, when present, a ligand capable of binding a metal atom or a metal ion;

each M is absent or, when present, a metal atom or a metal ion; and m is 0-6;

provided that if n is 0, then A is not benzo; and if n is 1, then $A[((X)_m\text{—}R\text{-}L).M]$ is not beta-nitrobenzo.

In certain embodiments, A is a mono-, bi-, tri-, or polycyclic aryl moiety.

In certain embodiments, A is benzo.

In certain embodiments, A is selected from the group consisting of naphtho, anthraceno, and phenanthreno.

In certain embodiments, A is a mono-, bi-, tri-, or polycyclic heteroaryl moiety.

In certain embodiments, A is a monocyclic heteroaryl moiety.

In certain embodiments, A is a 5-membered heteroaryl moiety.

In certain embodiments, A is selected from the group consisting of pyrrolo, furo, thiopheno, imidazo, oxazo, thiazo, and pyrazolo.

In certain embodiments, A is a 6-membered heteroaryl moiety.

In certain embodiments, A is selected from the group consisting of pyrido, pyrazino, and pyrimido.

In certain embodiments, A is selected from the group consisting of 1,8-diazaphenanthreno, 5,6-benzoquinolino, benzo(b)thieno, benzofuro, benzoimidazo, benzoimidazopyrido, benzoindazolo, benzoindolo, benzoisothiazolo, benzoisoxazo, benzopyrazino, benzopyrazolo, benzopyrido, benzopyrimido, benzopyrrolo, benzotetrazo, benzothiadiazo, benzothiazo, benzotriazo, benzoxadiazo, benzoxazo, furo, imidazo, imidazopyrido, indazolo, indolo, isoquinolino, isothiazolo, isoxazo, oxadiazo, oxazo, pyrazino, pyrazolo[3,4-d]pyrimido, pyrido, pyrimido, pyrrolo, pyrrolo[2,3-d]pyrimido, quinazolino, quinolino, tetrazo, thiadiazo, thiazo, thieno, and triazo.

In certain embodiments, A is selected from the group consisting of benzo, pyrido, pyrazino, pyrimido, and diazaphenanthreno.

In general, any transition metal (e.g., having d electrons) may be used to coordinate with the ligand, e.g., a metal selected from one of Groups 3-12 of the periodic table or from the lanthanide series. However, in certain embodiments, the metal will be selected from the group of late transition metals, e.g., preferably from Groups 5-12, in order to provide metal centers which are coordinatively unsaturated and not in their highest oxidation state. For example, suitable metals include Cr, Mn, V, Fe, Co, Ni, Mo, Ru, W, and Re.

In certain embodiments, L is a salen.

For any given occurrence of $[((X)_m\text{—}R\text{-}L).M]$, any one or more of X, R, L, and M can be present or absent.

In certain embodiments, X, R, L, and M are all present.

In certain embodiments, X, R, and L are present; and M is absent.

In certain embodiments, X and R are present; and L and M are absent.

In certain embodiments, X is present; and R, L, and M are absent.

In certain embodiments, X, R, and M are present; and L is absent.

In certain embodiments, X, L, and M are present; and R is absent.

In certain embodiments, X and M are present; and R and L are absent.

In certain embodiments, R, L, and M are present; and X is absent.

In certain embodiments, R and L are present; and X and M are absent.

In certain embodiments, R is present; and X, L, and M are absent.

In certain embodiments, R and M are present; and X and L are absent.

In certain embodiments, L and M are present; and X and R are absent.

In certain embodiments, L is present; and X, R, and M are absent.

In certain embodiments, M is present; and X, R, and L are absent.

In certain embodiments, n is 1.
In certain embodiments, n is 1; and m is 0.
In certain embodiments, n is 1; and m is 1.
In certain embodiments, n is 1; and m is 2.
In certain embodiments, n is 1; and m is 3.
In certain embodiments, n is 1; and m is 4.
In certain embodiments, n is 1; and m is 5.
In certain embodiments, n is 1; and m is 6.

In certain embodiments, n is 1; and R, L, and M are present.

In certain embodiments, n is 1; R and L are present; and M is absent.

In certain embodiments, n is 1; R is present; and both L and M are absent.

In certain embodiments, n is 1; L and M are present; and R is absent.

In certain embodiments, n is 1; L is present; and both R and M are absent.

In certain embodiments, n is 2.
In certain embodiments, n is 2; and m is 0.
In certain embodiments, n is 2; and m is 1.
In certain embodiments, n is 2; and m is 2.
In certain embodiments, n is 2; and m is 3.
In certain embodiments, n is 2; and m is 4.
In certain embodiments, n is 2; and m is 5.
In certain embodiments, n is 2; and m is 6.

In certain embodiments, n is 2; and R, L, and M are present in each occurrence of $[((X)_m—R-L).M]$.

In certain embodiments, n is 2; R and L are present; and M is absent in each occurrence of $[((X)_m—R-L).M]$.

In certain embodiments, n is 2; R is present; and both L and M are absent in each occurrence of $[((X)_m—R-L).M]$.

In certain embodiments, n is 2; L and M are present; and R is absent in each occurrence of $[((X)_m—R-L).M]$.

In certain embodiments, n is 2; L is present; and both R and M are absent in each occurrence of $[((X)_m—R-L).M]$.

In certain embodiments, n is 2, and each occurrence of $[((X)_m—R-L).M]$ need not be identical. For example, R, L, and M are present in one occurrence of $[((X)_m—R-L).M]$; and in another occurrence of $[((X)_m—R-L).M]$, R and L are present; and M is absent.

In certain embodiments, n is 3.
In certain embodiments, n is 3; and m is 0.
In certain embodiments, n is 3; and m is 1.
In certain embodiments, n is 3; and m is 2.
In certain embodiments, n is 3; and m is 3.
In certain embodiments, n is 3; and m is 4.
In certain embodiments, n is 3; and m is 5.
In certain embodiments, n is 3; and m is 6.

In certain embodiments, n is 3; and R, L, and M are present in each occurrence of $[((X)_m—R-L).M]$.

In certain embodiments, n is 3; R and L are present; and M is absent in each occurrence of $[((X)_m—R-L).M]$.

In certain embodiments, n is 3; R is present; and both L and M are absent in each occurrence of $[((X)_m—R-L).M]$.

In certain embodiments, n is 3; L and M are present; and R is absent in each occurrence of $[((X)_m—R-L).M]$.

In certain embodiments, n is 3; L is present; and both R and M are absent in each occurrence of $[((X)_m—R-L).M]$.

In certain embodiments, n is 3, and each occurrence of $[((X)_m—R-L).M]$ need not be identical. For example, R, L, and M are present in one occurrence of $[((X)_m—R-L).M]$; and in another occurrence of $[((X)_m—R-L).M]$, R and L are present; and M is absent.

In certain embodiments, n is 4.
In certain embodiments, n is 4; and m is 0.
In certain embodiments, n is 4; and m is 1.
In certain embodiments, n is 4; and m is 2.
In certain embodiments, n is 4; and m is 3.
In certain embodiments, n is 4; and m is 4.
In certain embodiments, n is 4; and m is 5.
In certain embodiments, n is 4; and m is 6.

In certain embodiments, n is 4; and R, L, and M are present in each occurrence of $[((X)_m—R-L).M]$.

In certain embodiments, n is 4; R and L are present; and M is absent in each occurrence of $[((X)_m—R-L).M]$.

In certain embodiments, n is 4; R is present; and both L and M are absent in each occurrence of $[((X)_m—R-L).M]$.

In certain embodiments, n is 4; L and M are present; and R is absent in each occurrence of $[((X)_m—R-L).M]$.

In certain embodiments, n is 4; L is present; and both R and M are absent in each occurrence of $[((X)_m—R-L).M]$.

In certain embodiments, n is 4, and each occurrence of $[((X)_m—R-L).M]$ need not be identical. For example, R, L, and M are present in one occurrence of $[((X)_m—R-L).M]$; and in another occurrence of $[((X)_m—R-L).M]$, R and L are present; and M is absent.

In certain embodiments, the moieties represented by Formula I are selected from the group consisting of

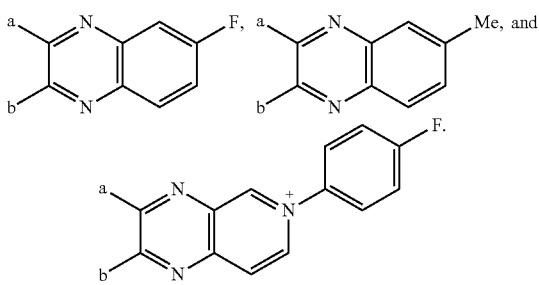

In certain embodiments, the moieties represented by Formula II are selected from the group consisting of

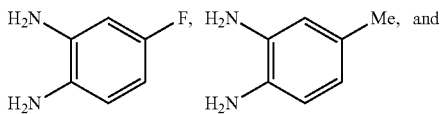

-continued

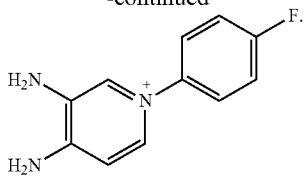

In another embodiment of the methods of making a composition, A is selected from the group consisting of a monocylic aryl moiety or a monocyclic heteroaryl moiety.

In yet another embodiment, A is selected from the group consisting of benzo or pyrido.

In still another embodiment, A is selected from the group consisting of benzo or pyrido; and n is 1.

In a further embodiment, n is 1; m is 0; R is present; and L, and M are absent in $[((X)_m—R-L).M]$.

In another embodiment, n is 1; m is 0; R is selected from the group consisting of halo, alkyl, alkoxy, hydroxy, carboxyl, substituted aryl, and substituted heteroaryl; and L, and M are absent in $[((X)_m—R-L).M]$.

In still another embodiment, n is 1; m is 0; R is selected from the group consisting of halo, alkyl, carboxyl, and substituted aryl; and L, and M are absent in $[((X)_m—R-L).M]$.

In some embodiments, n is 1; m is 0; R is present; and both L and M are absent.

In certain embodiments, the moieties represented by Formula II are selected from the group consisting of

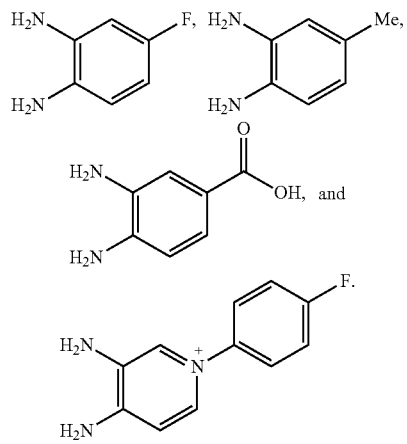

In some embodiments of the methods of making a composition, a moiety represented by Formula II comprises a transition-metal-based surface electrocatalyst.

In one embodiment of the methods of making a composition, A is a monocylic aryl moiety. In another embodiment, A is benzo, and n is 1. In yet another embodiment, n is 1; m is 0; R, L, and M are present in $[((X)_m—R-L).M]$.

In still another embodiment, A is benzo; n is 1; m is 0; R is selected from the group consisting of alkyl or unsubstituted alkynyl; and L and M are present in $[((X)_m—R-L).M]$.

In certain embodiments, the moieties represented by Formula II are selected from the group consisting of

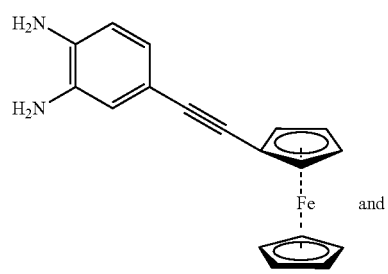

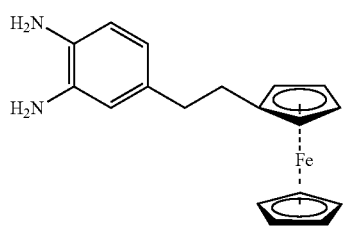

In some embodiments, A is a bi- or tricyclic heteroaryl moiety.

In another embodiment, A is a bi- or tricyclic heteroaryl moiety; n is 2; in each occurrence of $[((X)_m—R-L).M]$, m is 0 and R is absent; L and M are both present in one occurrence of $[((X)_m—R-L).M]$; and L is present and M is absent in the other occurrence of $[((X)_m—R-L).M]$.

In yet another embodiment, n is 2; in each occurrence of $[((X)_m—R-L).M]$, m is 0; R is absent; and L is present; the first L and the second L together may form a compound which coordinates with a metal atom or a metal ion. In some embodiments, the moiety represented by Formula II comprises a moiety wherein ring A is fused to ligand L.

In another embodiment, the first L and the second L together may form a compound which coordinates with a metal atom or a metal ion, wherein the compound which coordinates with a metal atom or a metal ion is selected from the group consisting of crown ether, porphyrin, and salen.

In still another embodiment, the moieties represented by Formula II are selected from the group consisting of

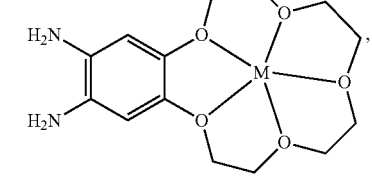

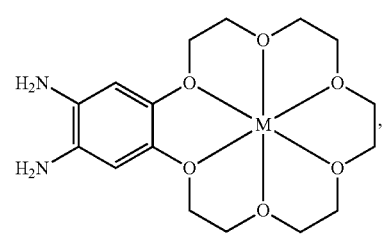

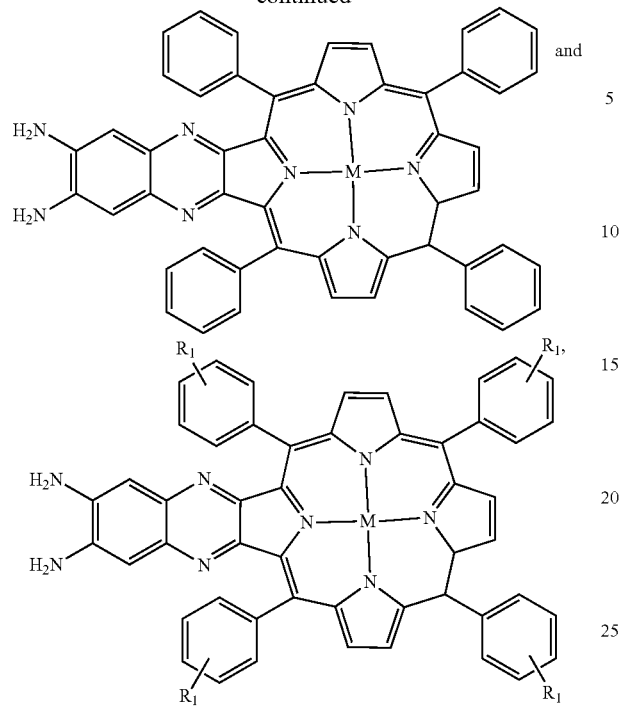

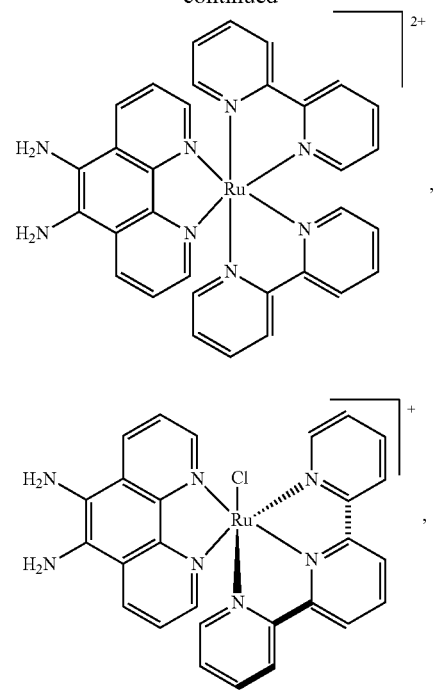

wherein $R_1$, independently at each occurrence, is selected from the group consisting of halo, alkyl, substituted or unsubstituted aryl, substituted or unsubstituted heteroaryl, hydroxy, sulfhydryl, aminosulfonyl, sulfinic acid, aminosulfinyl, formyl, carboxyl, amino, amido, aminosulfonyl, aminosulfinyl, cyano, nitro, azido, phosphinyl, phosphoryl, silyl, and silyloxy.

In some embodiments, A is a tricyclic heteroaryl moiety. In other embodiments, A is diazaphenanthreno.

In other embodiments, when M is present, and X, R, and L are absent, the metal atom or the metal ion is associated with additional ligands (i.e., the metal atom or the metal ion is coordinatively unsaturated with respect to the moiety of formula I alone).

In some embodiments, exemplary additional ligands associated with a metal atom or a metal ion include a halo (e.g., Cl), 2,2'-bipyridine, carbon monoxide (CO), 1,5-cyclooctadiene, cyclopentadienyl (Cp), dibenzothiophene, 2,5-dimethylthiophene, pentamethylcyclopentadiene (Cp*), thiophene, and 2,2',2"-tripyridine.

In another embodiment, additional ligands associated with a metal atom or a metal ion are selected from the group consisting of halo (e.g., chloro), carbon monoxide (—CO), 2,2'-bipyridine, 1,5-cyclooctadiene, cyclopentadienyl, pentamethylcyclopentadiene, and 2,2',2"-tripyridine.

In yet another embodiment, the moiety represented by Formula II is selected from the group consisting of

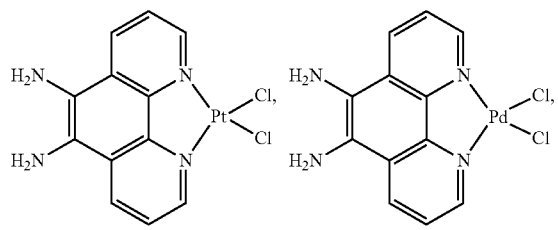

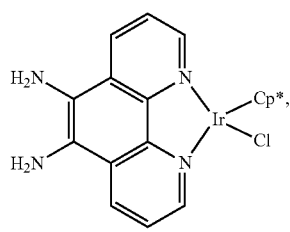

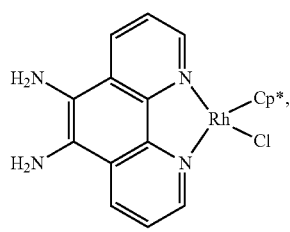

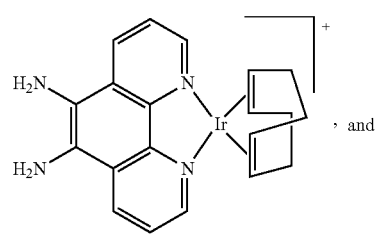

-continued

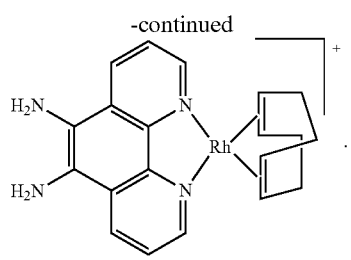

In some embodiments disclosed herein, the moieties represented by Formula II are selected from the following Table 2.

TABLE 2

| Cmpd | Structure |
|---|---|
| 25 | $H_2N$-, F-substituted benzene with $H_2N$ |
| 26 | $H_2N$-, Me-substituted benzene with $H_2N$ |
| 27 | 3,4-diamino-N-(4-fluorophenyl)pyridinium |
| 28 | 3,4-diaminobenzoic acid |
| 29 | [Ru(phen-diamine)(bpy)$_2$]$^{2+}$ |
| 30 | Re(phen-diamine)(CO)$_3$Cl |
| 31 | [Ru(phen-diamine)(Cl)(bpy)(py)]$^+$ |
| 32 | 5,6-diamino-1,10-phenanthroline |
| 33 | Pd(phen-diamine)Cl$_2$ |
| 34 | Pt(phen-diamine)Cl$_2$ |
| 35 | [Ir(phen-diamine)(cod)]$^+$ |
| 36 | Ir(phen-diamine)(Cp*)Cl |

TABLE 2-continued

Exemplary moieties represented by Formula II.

| Cmpd | Structure |
|---|---|
| 37 | [structure: diamino-phenanthroline Rh complex with cyclooctadiene, cationic] |
| 38 | [structure: diamino-phenanthroline Rh(Cp*)(Cl) complex] |
| 39 | [structure: 3,4-diaminophenyl-alkyne-ferrocene] |
| 40 | [structure: 3,4-diaminophenyl-ethylene-ferrocene] |
| 41 | [structure: diaminophenyl fused crown ether with metal M] |
| 42 | [structure: diaminophenyl fused crown ether with metal M, alternate] |

In certain embodiments, the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

In certain embodiments, the $C_1$-$C_6$ alcohol is ethanol.

In certain embodiments, the heating the reaction mixture is at about 60° C.

In certain embodiments, the heating the reaction mixture is at about 70° C.

In certain embodiments, the heating the reaction mixture is at about 80° C.

In certain embodiments, the heating the reaction mixture is at about 90° C.

In certain embodiments, the heating the reaction mixture is at about 100° C.

In certain embodiments, the heating the reaction mixture is at about 110° C.

In certain embodiments, the heating the reaction mixture is at about 120° C.

In certain embodiments, the heating is for about 1 hour to about 24 hours.

In certain embodiments, the heating is for about 1 hour to about 18 hours.

In certain embodiments, the heating is for about 1 hour to about 12 hours.

In certain embodiments, the heating is for about 1 hour to about 10 hours.

In certain embodiments, the heating is for about 1 hour to about 8 hours.

In certain embodiments, the heating is for about 1 hour to about 6 hours.

In certain embodiments, the heating is for about 1 hour to about 4 hours.

In certain embodiments, the heating is for about 1 hour to about 2 hours.

In certain embodiments, the heating is for about 12 hours.

In certain embodiments, the heating is at about 60° C. for about 12 hours.

In certain embodiments, the method further comprises the step of anodizing the graphene prior to the step of combining.

Anodizing is an electrolytic passivation process used to increase the thickness of the natural oxide layer on the surface of metal or other electric conductive parts. The process is called anodizing because the part to be treated forms the anode electrode of an electrical circuit.

In certain embodiments, the method further comprises the step of washing the composition with inorganic acid.

An "inorganic acid" as used herein is an acid derived from one or more inorganic compounds; an inorganic acid forms hydrogen ions and the conjugate base ions when dissolved in water. Examples of inorganic acids include hydrochloric acid (HCl), nitric acid ($HNO_3$), phosphoric acid ($H_3PO_4$), sulfuric acid ($H_2SO_4$), boric acid ($H_3BO_3$), hydrofluroronic acid (HF), hydrobromic acid (HBO, and perchloric acid ($HClO_4$).

In certain embodiments, the inorganic acid is $HClO_4$.

In certain embodiments, the graphene is constructed and arranged as an electrode.

An "electrode" as used herein refers to an electric conductor, not necessarily metallic, through which an electric current enters or leaves a nonmetallic medium. In certain embodiments, an electrode is or comprises graphene. In certain embodiments, an electrode is or comprises a derivative of graphene in accordance with the compositions and methods of the invention.

In certain embodiments, the graphene is attached to an electrode.

In certain embodiments, the electrode is a glassy carbon electrode.

Having now described the present invention in detail, the same will be more clearly understood by reference to the following examples, which are included herewith for purposes of illustration only and are not intended to be limiting of the invention.

EXAMPLES

Experimental Methods

Chemicals and Materials

Potassium hydroxide (99.99%, semiconductor grade), tetrabutylammonium hexafluorophosphate (99%), 4-fluoro-1,2-phenylenediamine (97%), 3,4-diaminotoluene (99%), di-tert-butyl dicarbonate (REAGENTPLUS® 99%), 1-chloro-2,4-dinitrobenzene, (>99%), 4-fluoroaniline (97%), 2,2,2-trifluoroethanol (REAGENTPLUS®, 99%), 9,10-phenanthrenequinone (95%), phenazine (98%), 3,4-diaminobenzenecarboxylic acid (97%), trifluoroacetic acid (REAGENTPLUS® 99%), 3,4-diaminopyridine, and NAFION® perfluorinated resin 5 wt % solution were obtained from Sigma Aldrich and were used as received. High surface area platinum mesh (99.997%), 1,10-phenanthroline (phen) (anhydrous, 99%), and potassium bromide (>99%) were obtained from Alfa Aesar. Sodium carbonate (granular, ACS grade) and magnesium sulfate (AR grade) were obtained from Macron Fine Chemicals. Hydrazine (anhydrous, 98%), hydroxylamine hydrochloride (99%), palladium on activated charcoal (10% Pd basis), Re standard solution (TraceCERT, 1000 mg/L Re in nitric acid), and tetrabutylammonium hexafluorophosphate (TBAPF$_6$) (for electrochemical analysis, ≥99.0%) were purchased from Sigma-Aldrich. Re(CO)$_5$Cl (98%) was obtained from Strem Chemicals. 1,10-Phenanthroline-5,6-dione (>98%) was purchased from TCI. NMR solvents were obtained from both Cambridge Isotope Laboratories and Sigma-Aldrich. Concentrated hydrochloric acid (ACS reagent grade), concentrated nitric acid (68-70%, ACS grade), and concentrated sulfuric acid (ACS grade) were purchased from EMD Millipore.

All syntheses were performed in solvent of ACS grade purity or better. Carbon dioxide (research grade) and argon (ultra high purity) were purchased from Airgas. All aqueous electrolyte solutions were prepared with reagent grade water (Millipore Type 1, 18.2 MΩ-cm resistivity). CHELEX® 100 Resin was obtained from Bio-Rad (Catalog #210011676). For some experiments, acetonitrile (ACS grade, Aldrich) was used without further purification for the preparation of all non-aqueous electrolytes. For certain experiments, acetonitrile (MeCN) was degassed and dried using a Glass Contour Solvent Purification System built by SG Water USA, LLC (New Hampshire, USA).

Glassy carbon disk electrodes were obtained from Pine Research Instrumentation, Inc. Hg/HgO and Ag/AgCl reference electrodes were obtained from CHI instruments, Inc. and BASi Inc., respectively. Monarch 1300 was obtained from Cabot. Platinum wire (99.9%) was obtained from Alfa Aesar and treated with aqua regia prior to use in all cases. Titanium foil (99.7%, trace metal basis) was obtained from Sigma Aldrich and treated with concentrated hydrochloric acid prior to use.

XPS Measurements.

The X-ray photoelectron spectra were collected using a Physical Electronics Model PHI Versaprobe II with a hemispherical energy analyzer and a non-monochromated X-ray source (Aluminum Kα, 1486.6 eV). Samples were prepared by affixing glassy carbon disk electrodes and molecular films to the sample stage using conductive Cu tape. Data were collected using a 200 μm, 50 W focused X-ray beam at a base pressure of $7 \times 10^{-7}$ Pa. High resolution scans centered over peaks of interest were collected with a pass energy of 117.4 eV and a step size of 0.7 eV. The C 1s peak arising from adventitious hydrocarbons was assigned the energy value of 285.0 eV and used as an internal binding energy reference.

Example 1

Synthesis of Pyrazine-Modified Glassy Carbon Electrodes

To facilitate systematic studies of oxygen reduction catalysis, GCPs were synthesized on glassy carbon (GC) electrodes, which contain graphitic domains with a high edge-to-basal plane ratio. To clean the GC surface and increase the population of surface quinone groups, electrodes were subjected to brief anodic treatment following literature methods. The anodized glassy carbon electrodes were then treated with the requisite phenylenediamine precursor in ethanol at 60° C. for 12 hours, after which the electrodes were rinsed with copious amounts of pure ethanol, water, and 0.1 M HClO$_4$. The final acid rinse was used to ensure removal of physisorbed diamines and to hydrolyze surface imine moieties generated via condensation with isolated surface carbonyls or para-quinone moieties. By employing differentially substituted diamines, three distinct GCP catalysts, 1-3, were obtained (Scheme 1).

All electrochemical experiments were conducted at ambient temperature (21±1° C.) using a Biologic VSP 16-channel or a Gamry REF 600 potentiostat and a three-electrode electrochemical cell with a porous glass frit separating the working and auxiliary compartments. Unless otherwise stated, a platinum mesh was used as the counter electrode. Hg/HgO and Ag/AgCl reference electrodes were used for experiments conducted in alkaline and acidic electrolytes, respectively, whereas an Ag wire pseudo-reference electrode was used for experiments conducted in non-aqueous electrolyte. Hg/HgO reference electrodes were stored in 1 M KOH solution in between measurements and were periodically checked relative to pristine reference electrodes to ensure against potential drift. Electrode potentials were converted to the reversible hydrogen electrode (RHE) scale using E(RHE)=E(Hg/HgO)+0.094 V+0.059 (pH) V. Ag/AgCl electrodes were stored in saturated NaCl solution in between measurements and were periodically checked relative to pristine reference electrodes to ensure against potential drift. Electrode potentials were converted to the RHE scale using E(RHE)=E(Ag/AgCl)+0.197 V+0.059 (pH) V. Non-aqueous electrochemical measurements were conducted using a Ag wire pseudo-reference electrode.

Glassy carbon rotating disk electrodes, 5 mm diameter, were polished by hand against an alumina slurry using a circulation motion for ~30 seconds following by sonication in Milli-Q water for 3 min. This process was repeated in sequence using 1.0 μm, 0.3 μm, and 0.05 μm alumina slurries. To further clean the glassy carbon electrode surface and expose a high population of quinone moieties, the electrodes were briefly anodized via potentiostatic electrolysis at 3.5 V vs RHE for 10 seconds in 0.1 M H$_2$SO$_4$. Electrodes were subsequently washed with copious amounts of water and ethanol prior to electrochemical evaluation or further functionalization.

Scheme 1.

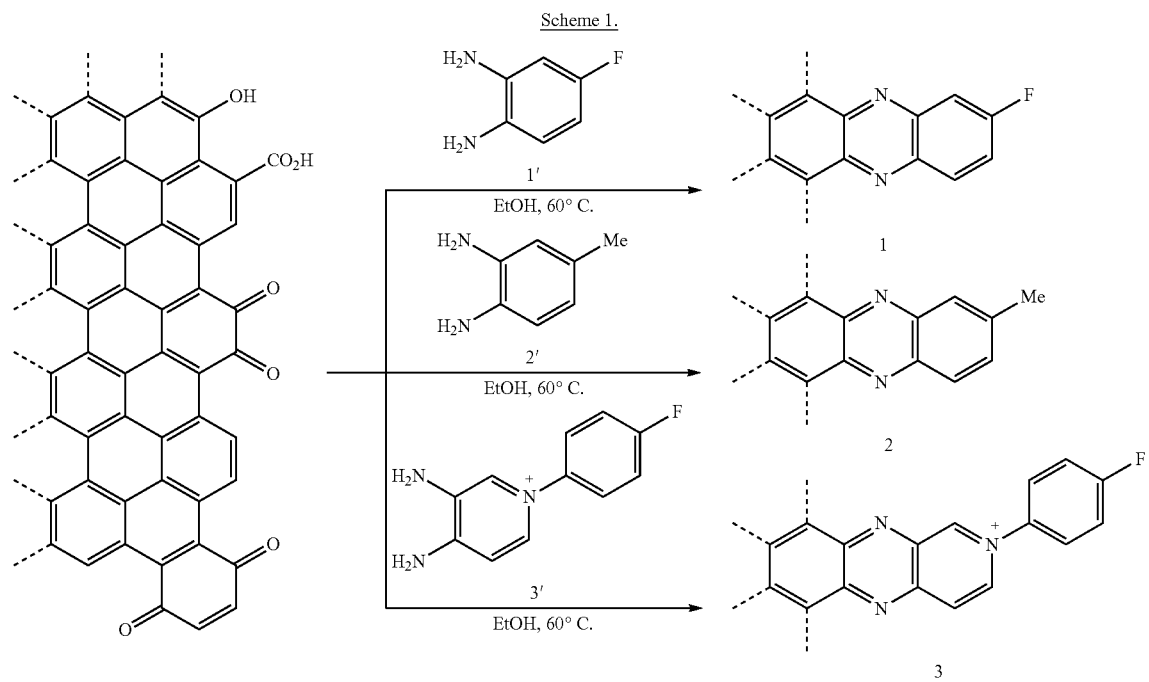

Condensation of ortho-phenylenediamine derivatives with ortho-quinone edge sites of graphene sheets to generate graphite-conjugated pyrazines (GCPs).

Surface functionalization was carried out by immersing glassy carbon electrodes in ~10 mL of $N_2$-sparged ethanol containing 50 mM of the desired ortho-phenylenediamine derivative, 1', 2', or 3'. The reaction vessel was subsequently heated under $N_2$ for 12 hours at 60° C. Upon cooling, electrodes were washed with copious amounts of pure ethanol and subsequently treated with 0.1 M $HClO_4$ for 3 hours to hydrolyze adventitious imine linkages formed on the surface.

To avoid possible photoreactions, all reactions were conducted in the dark. Following acid treatment, electrodes were rinsed with copious amounts of pure water and subsequently transferred to the desired electrolyte solution for electrochemical measurements or stored in air for analytical measurements. Unmodified control electrodes used for the comparison in FIG. 3A were prepared used the same procedure described above but with exclusion of the phenylenediamine in reaction mixture.

Example 2

XPS Curve Fitting for Pyrazine-Modified Graphite

Figure 1A:
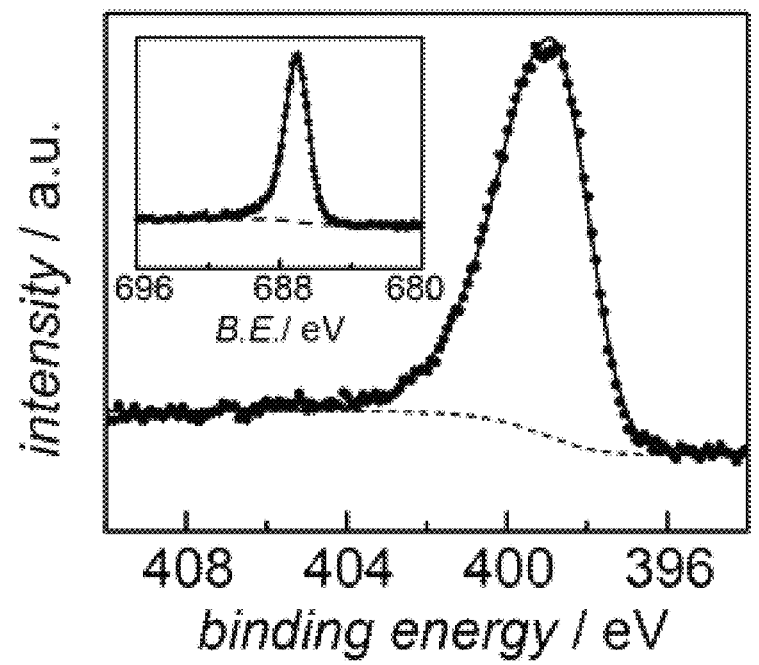
FIG. 1A is a graph depicting high resolution N 1s XPS scan of 1; inset is a graph depicting high resolution F 1s XPS scan of 1.
Figure 5A:
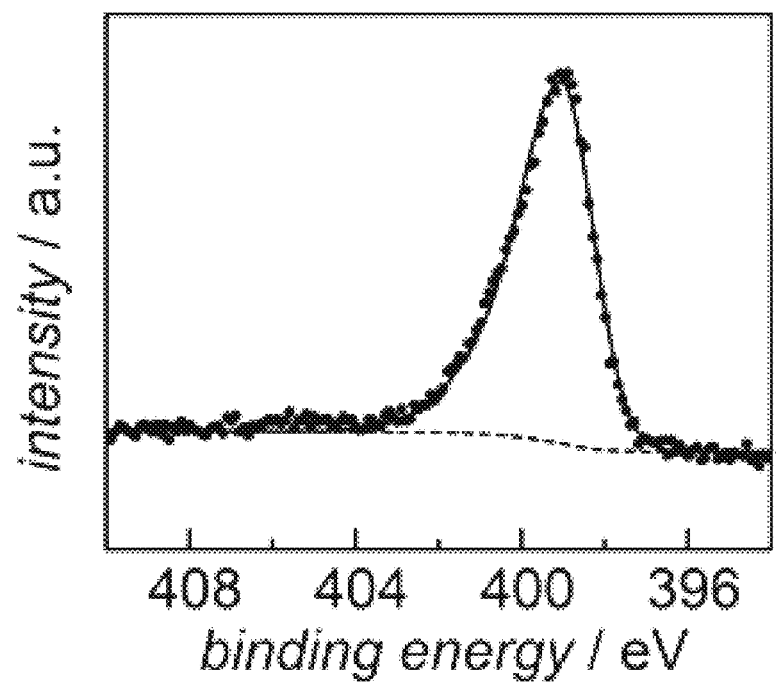
FIG. 5A is a graph depicting high resolution N 1s XPS scan of 2.
Figure 5B:
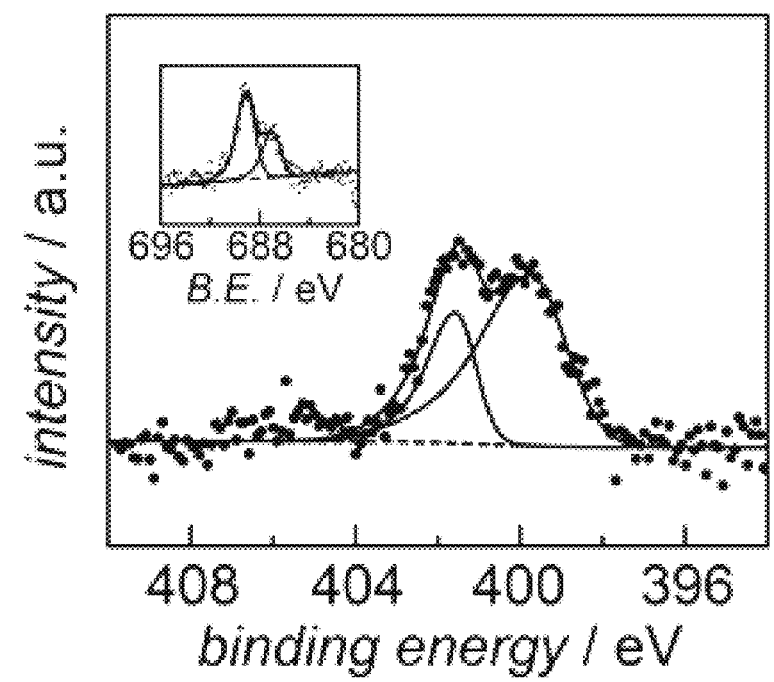
FIG. 5B is a graph depicting high resolution N 1s XPS scan of 3; inset is a graph depicting high resolution F is XPS scan of 3.
Figure 6A:
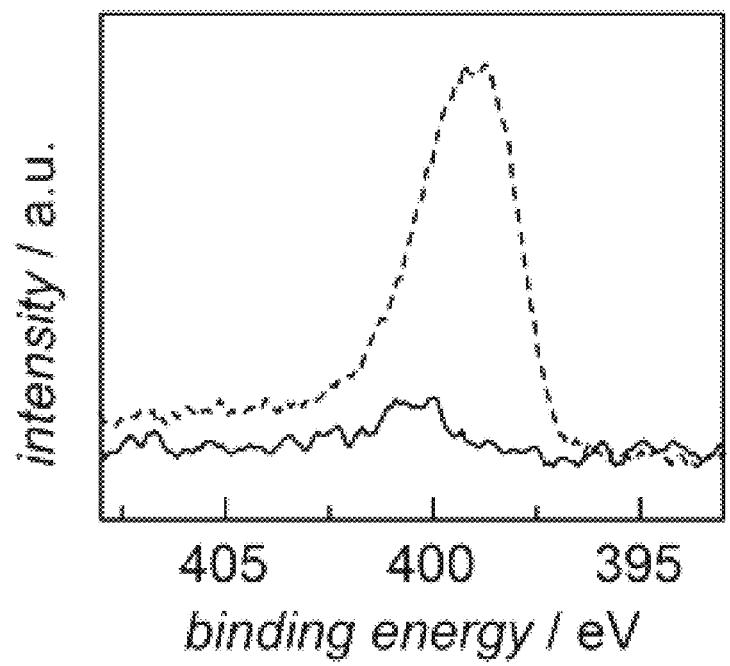
FIG. 6A is a graph depicting high resolution XPS scan of N 1s region for an unmodified glassy carbon electrode (solid line) and 1 (dashed line).
Figure 6B:
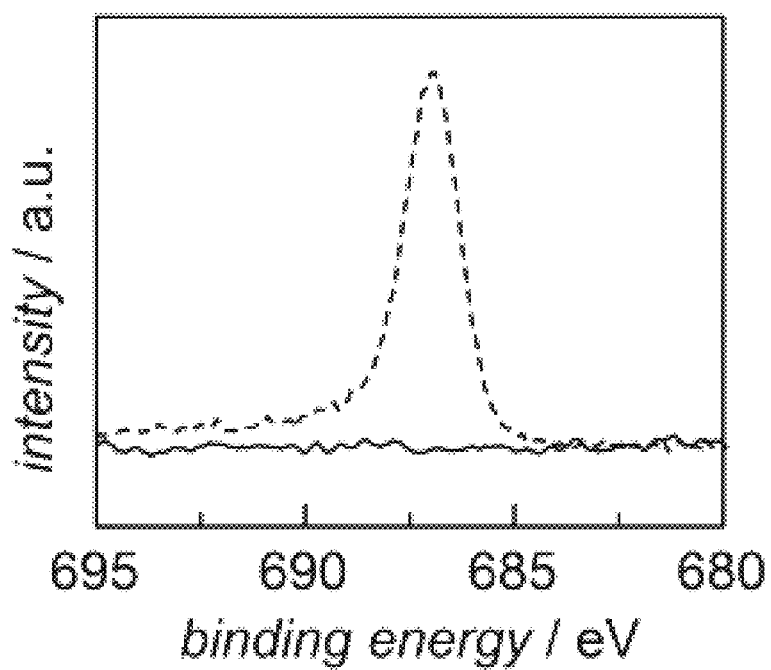
FIG. 6B is a graph depicting high resolution XPS scan of F 1s region for an unmodified glassy carbon electrode (solid line) and 1 (dashed line).

To characterize the surface species generated by the synthetic protocol in Example 1, 1-3 were examined via X-ray photoelectron spectroscopy (XPS). Data for 1 is shown in FIG. 1A, data for 2 and 3 are shown in FIG. 5A and FIG. 5B, and fitting parameters are summarized in Table 3). Upon functionalization of the glassy carbon electrode with 1', a pronounced peak was observed in the N 1s XPS spectrum at 398.9 eV binding energy that is absent in the native electrode (FIG. 6). This peak position is in line with that expected for pyridinic nitrogen moieties on N-containing carbons. In addition, a sharp F 1s peak was observed at 687.0 eV binding energy (FIG. 1A inset) and XPS spectra revealed an N/F ratio of ~2, in line with the atomic composition of 1'. These same spectral features were also observed in the N 1s spectra for 2 and 3, with an additional peak observed at 401.7 eV for 3 attributed to the pyridinium nitrogen (FIG. 5). Together the data indicate that ortho-phenylenediamines chemically ligate to glassy carbon surfaces.

XPS fitting was conducted using XPSPEAK 4.1. Shirley line was used for the background collection. All the spectra were fitted to asymmetric Gaussian functions using the following equation:

$$G(x, p, w, h, TS, TL) = h\left[e^{-ln(2)Q} + TS[1 - e^{-ln(2)Q}] * e^{-\frac{6.9}{TL}Q}\right],$$

where $$Q = \left[\frac{2(x-p)}{w}\right]^2,$$

x=binding energy, p=peak position, w=FWHM, h=peak height, and TS and TL are parameters describing the asymmetric tail. Peak fitting was carried out by optimization of p, h, w and then optimization of asymmetric parameters TS and TL.

TABLE 3

Fitting parameter for XPS spectra of 1, 2, and 3.

| Sample | Nuclei | Peak position/eV | FWHM/eV | TS | TL | $\chi^2$ |
|---|---|---|---|---|---|---|
| 1 | N1s | 398.89 | 2.56 | 0.5 | 50 | 4.55 |
| 1 | F1s | 686.99 | 1.62 | 0.2 | 50 | 2.96 |
| 2 | N1s | 399.04 | 2.24 | 0.5 | 50 | 3.72 |

TABLE 3-continued

Fitting parameter for XPS spectra of 1, 2, and 3.

| Sample | Nuclei | Peak position/eV | FWHM/eV | TS | TL | $\chi^2$ |
|---|---|---|---|---|---|---|
| 3 | N1s | 399.61 (67.4%) | 2.41 | 0.5 | 50 | 2.00 |
|   |     | 401.71 (32.6%) | 1.69 |     |    |      |
| 3 | F1s | 686.95 (34.0%) | 1.633 | 0.2 | 50 | 1.57 |
|   |     | 689.13 (66.0%) | 1.944 |     |    |      |

Example 3

Synthesis of Pyrazine-Modified High-Surface Area Carbons

Figure 1B:
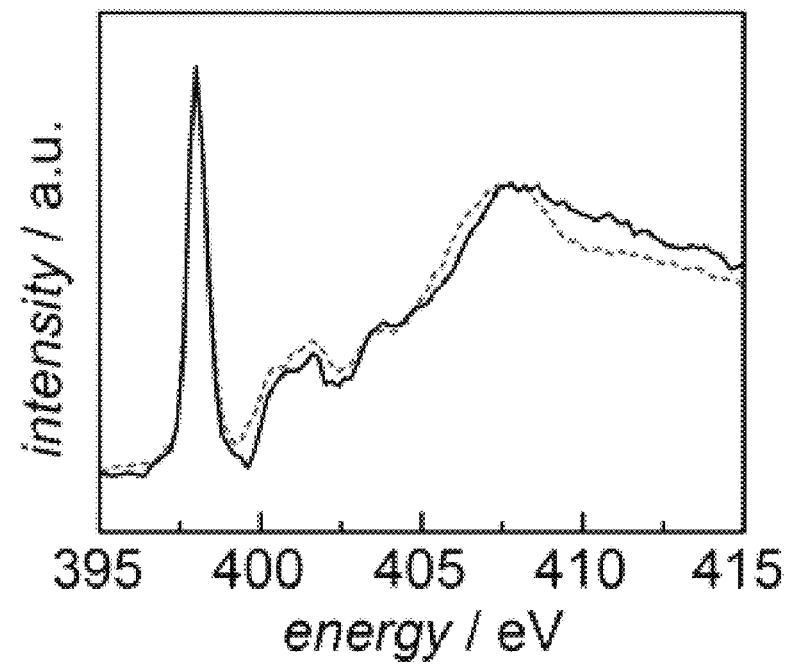
FIG. 1B is a graph depicting N K-edge XANES of 1'-treated high surface area carbon (solid line) and phenazine (dashed line).

To gain further insight into the local bonding environment of nitrogen centers, 1'-treated high surface area graphitic carbon, Monarch 1300, was probed by nitrogen K-edge X-ray absorption near edge structure (XANES) spectroscopy (FIG. 1B, solid line). Combustion analysis of this high surface area variant of 1 revealed an increase in N content from 0.1 to 1.3 mass % (Table 4), consistent with incorporation of 1' into the high surface area carbon. The XANES spectra of the modified carbon displayed a sharp feature at 398.0 eV assigned to the 1s-$\pi$* transition. This was followed by a series of broad features spanning 407 eV to 409 eV which are assigned to 1s-$\sigma$* transitions. An excellent match was observed between the spectrum of phenazine (FIG. 1B, dashed line) and high surface area carbon treated with 1' (FIG. 1B, solid line). The observed spectral features were distinct from those observed for free aryl amines in 1' (FIG. 7) or imidazole nitrogens which displayed a pre-edge feature at 401 eV, 2 eV blueshifted relative to that observed for the Monarch 1300-modified GCP. Thus, the good spectral agreement between phenazine and the modified carbon suggests a negligible population of free amines or surface imidazoles. The latter, which could arise from condensation of ortho-phenylenediamines with surface carboxylic acids, requires strong acid catalysis and high temperatures, and is thus disfavored under these mild conditions. Together, these data establish that the synthetic protocol in Scheme 1 selectively generated surface pyrazinic units and that this chemistry is generally applicable to both low surface area glassy carbons and high surface area graphitic carbons.

TABLE 4

Elemental analysis of Monarch 1300 and Monarch 1300 treated with 1'.

| # | C % | H % | N % |
|---|---|---|---|
| Monarch 1300 | 86.87 | 0.52 | 0.11 |
| Monarch 1300 - 1' | 89.72 | 1.13 | 1.31 |

Prior to functionalization, high surface area Monarch 1300 carbon was continuously washed with ethanol for ~12 hours under an $N_2$ atmosphere using a Soxhlet extractor. Following this washing step, 0.2 g of carbon powder was dispersed in 20 mL of ethanol containing 0.5 mmol of the desired phenylenediamine derivative (25 mM concentration). The reaction vessel was held at 60° C. overnight under an $N_2$ atmosphere. Upon cooling the reaction mixture, the carbon powder was filtered and washed with 500 mL of ethanol and 200 mL of water. The carbon powder was subsequently dispersed in an aqueous 0.1 M $HClO_4$ solution and allowed to react overnight. To avoid possible photoreactions, all reactions were conducted in the dark. Following acid treatment, the carbon powder was filtered and washed with 1000 mL of pure water. The washed carbon powder was then transferred to the thimble of a Soxhlet extractor and washed continuously with refluxing ethanol for 1 day and refluxing ortho-dichlorobenzene for 2 days under an $N_2$ atmosphere. To remove residual ortho-dichlorobenzene, the sample was subsequently washed with copious amounts of ethanol and dried overnight in vacuo. The sample was then stored in air in the dark prior to data collection.

Figure 7:
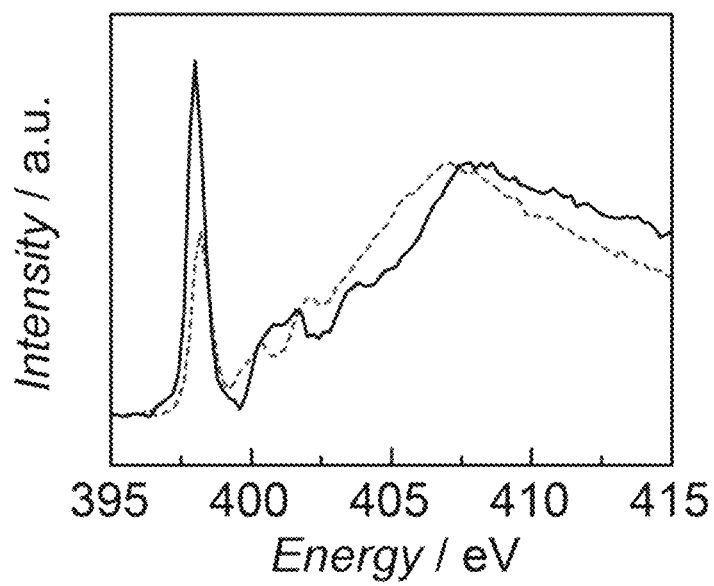
FIG. 7 is a graph depicting N K-edge XANES of 1'-treated Monarch (solid line) and 1' (4-fluoro-1,2-phenylenediamine) (dotted line).

Nitrogen K-edge X-ray absorption spectra were collected at bending magnet beamline 6.3.1 (1011 photons/s) at the Advanced Light Source at Lawrence Berkeley National Laboratory. Powder samples were pressed into In foil and mounted to a Cu sample plate. Incident radiation was tuned with a variable line spacing plane grating monochromator (VLS-PGM) and its intensity monitored with a gold mesh upstream of the samples. Spectra were collected in total electron yield (TEY) mode. The baselines were fit to third-order polynomials and removed, and intensities were normalized to the peak near 408 eV. The nitrogen K-edge spectrum of polycrystalline h-BN powder was collected in TEY mode and used for energy calibration. XANES spectra are shown in FIG. 1B and FIG. 7.

Example 4

Voltammetric Measurements of Pyrazine-Modified Glassy Carbon Electrodes

Figure 2:
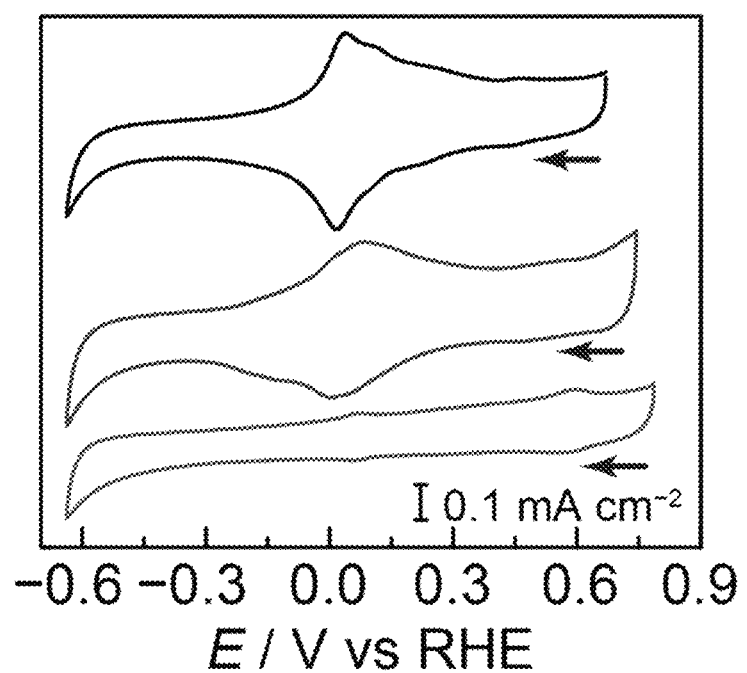
FIG. 2 is a graph depicting cyclic voltammograms (5 mV/s scan rate) of 1 (top tracing), 2 (middle tracing), and 3 (bottom tracing) recorded in $N_2$-saturated 0.1 M KOH electrolyte.
Figure 8:
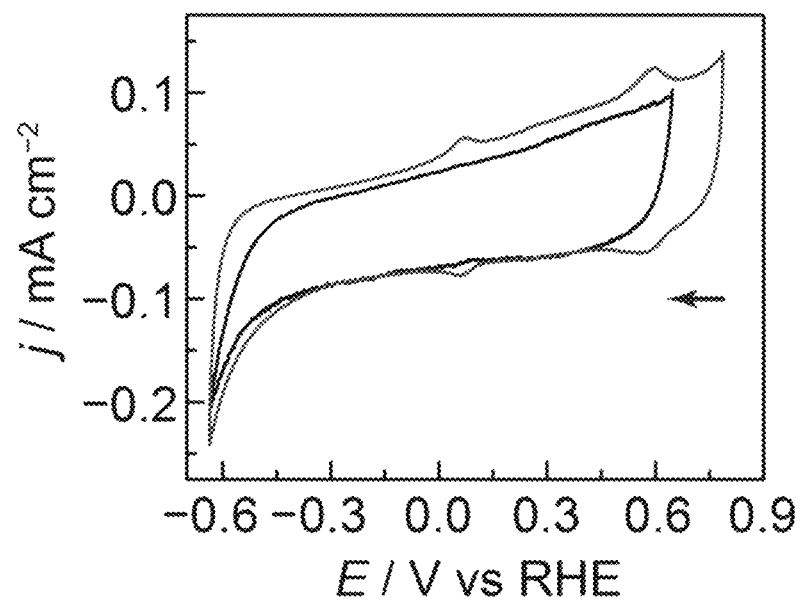
FIG. 8 is a graph depicting representative cyclic voltammograms of unmodified glassy carbon (inner tracing) and 3 (outer tracing) recorded in $N_2$-saturated 0.1 M KOH electrolyte at a scan rate of 5 mV/s.

Conveniently, surface pyrazine units display reversible redox chemistry in aqueous electrolytes. Slow-scan cyclic voltammograms of 1, 2, and 3 (FIG. 2) in $N_2$-saturated 0.1 M KOH, revealed broad chemically reversible waves with formal potentials of $E_{1/2}$=0.01, 0.05, and 0.48 V, respectively (all potentials are reported versus the reversible hydrogen electrode, RHE). 3 also exhibited a second redox wave at 0.07 V attributed to subsequent reduction of the pyrazine core. All of these features were absent for the untreated glassy carbon electrode (FIG. 8), and the peak currents scaled linearly with scan rate (FIG. 9), indicating that the redox feature resulted from a surface-bound rather than diffusing species. In all cases, the redox waves were broad, displaying a peak width at half height of >200 mV, significantly greater than the 90.6/n mV value expected for ideal non-interacting surface-bound molecular centers. The broadness of these redox waves was attributed to lateral electrostatic interactions on the surface between proximate pyrazine units, as has been observed for densely-packed ferrocenyl self-assembled monolayers, as well as interactions between pyrazine units and charged surface oxides. In any case, substitution of the diamine precursor had a dramatic influence on the redox potential, with the strongly electron-withdrawing pyridinium unit in 3 imposing a ~0.5 V shift in the first redox potential.

Figure 4A:
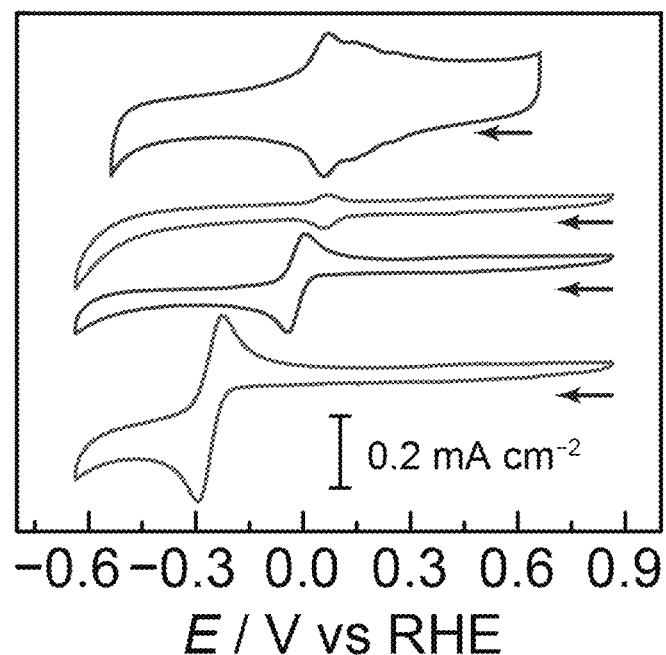
FIG. 4A is a graph depicting cyclic voltammograms of pyrazine (bottom trace), quinoxaline-6-carboxylic acid (next-to-bottom trace), dibenzo[a,c]phenazine-2-carboxylic acid (next-to-top trace) and 4 (top trace) recorded in $N_2$-saturated 0.1 M KOH.
Figure 4B:
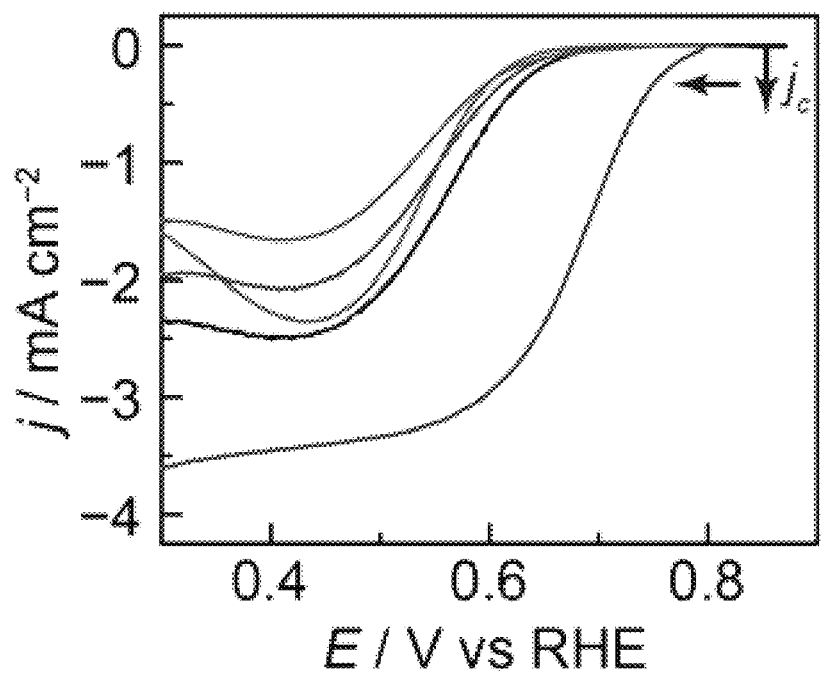
FIG. 4B is a graph depicting linear sweep voltammograms of a freshly polished GC disk electrode rotated at 2000 RPM and recorded in $O_2$-saturated 0.1 M KOH electrolyte containing (from top to bottom at 0.45 E/V vs RHE:) 5 mM pyrazine, 1 mM dibenzo[a,c]phenazine-2-carboxylic acid, 5 mM quinoxaline-6-carboxylic acid, and no molecular catalyst. Linear sweep voltammetry of 4 (bottom trace) rotated at 2000 RPM and recorded in $O_2$-saturated 0.1 M KOH. All data recorded at 5 mV/s scan rate.

Native and modified glassy carbon rotating disk electrodes were prepared as described above and transferred to 0.1 M KOH electrolyte. Linear sweep or cyclic voltammograms were initiated at the open circuit potential and swept in the negative direction while rotating the electrode at a rotation rate of 2000 RPM. Uncompensated resistances were measured prior to each experiment and typically ranged from 40-50Ω, leading to maximum uncompensated Ohmic losses of ~2 mV for the cyclic voltammograms (CVs). As such, all CV scans were recorded without iR compensation. Cyclic voltammetry scans recorded in $N_2$-saturated 0.1 M KOH produced the data shown in FIG. 2, FIG. 4, and FIG.

Figure 9A:
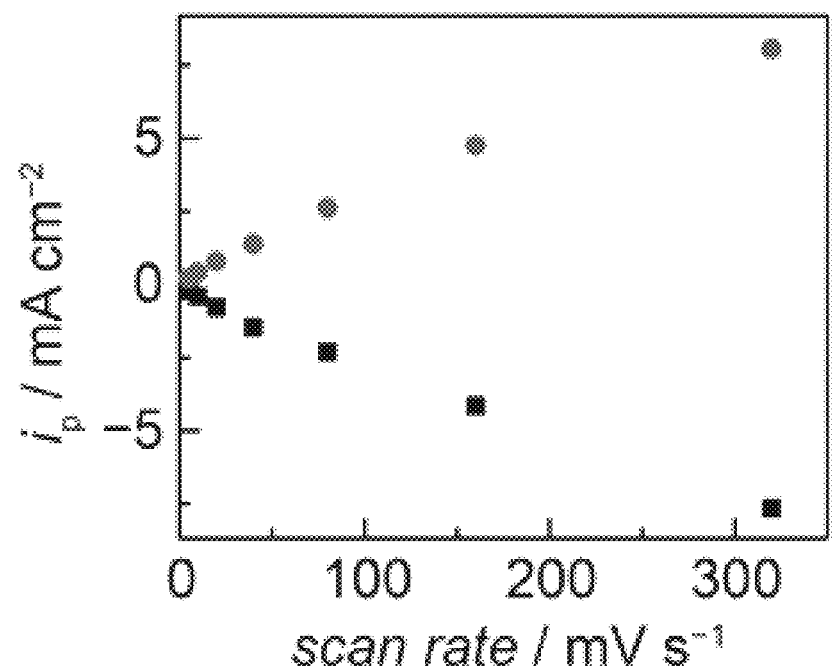
FIG. 9A is a graph depicting scan rate dependence of anodic (circles) and cathodic (squares) peak currents for 1.
Figure 9B:
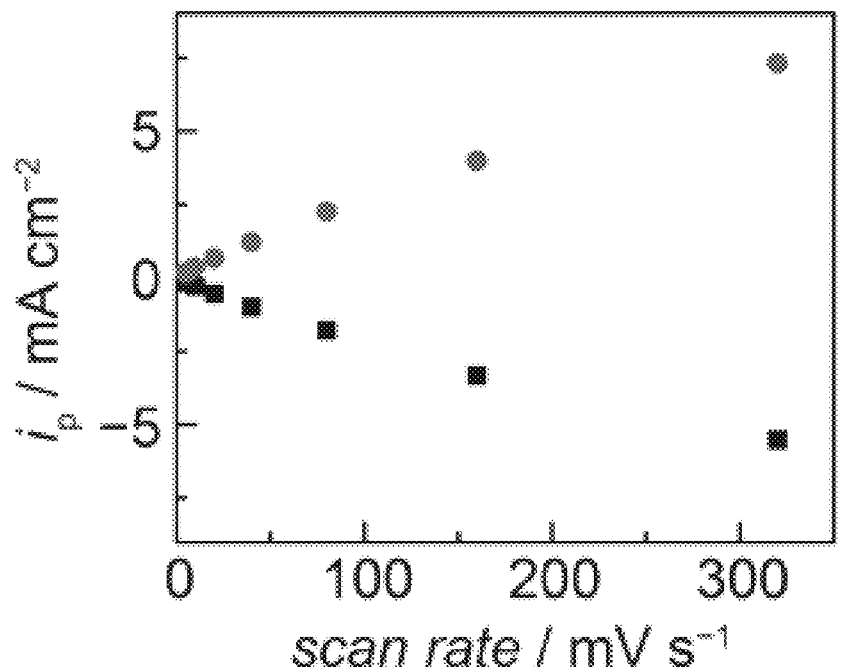
FIG. 9B is a graph depicting scan rate dependence of anodic (circles) and cathodic (squares) peak currents for 2.
Figure 9C:
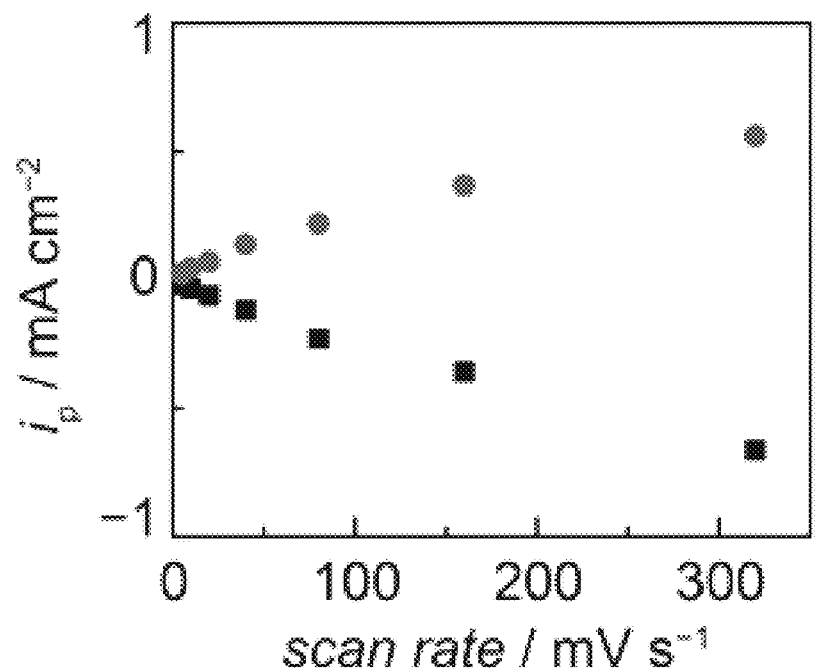
FIG. 9C is a graph depicting scan rate dependence of anodic (circles) and cathodic (squares) peak currents for 3.
Figure 11A:
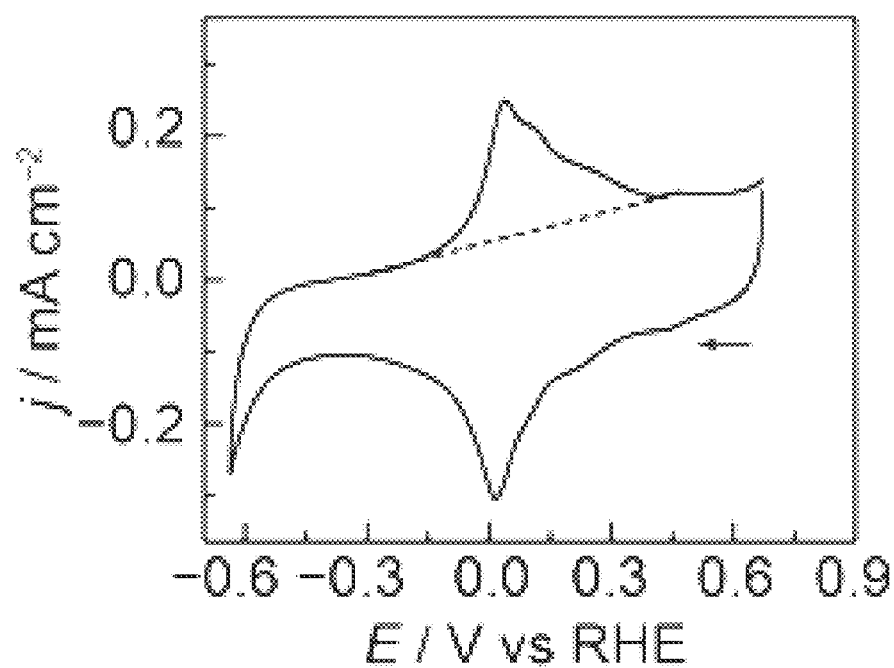
FIG. 11A is a graph depicting representative cyclic voltammogram of 1 recorded in $N_2$-saturated 0.1 M KOH electrolyte by 5 mV/s. Dotted line denotes baseline for peak integration.
Figure 11B:
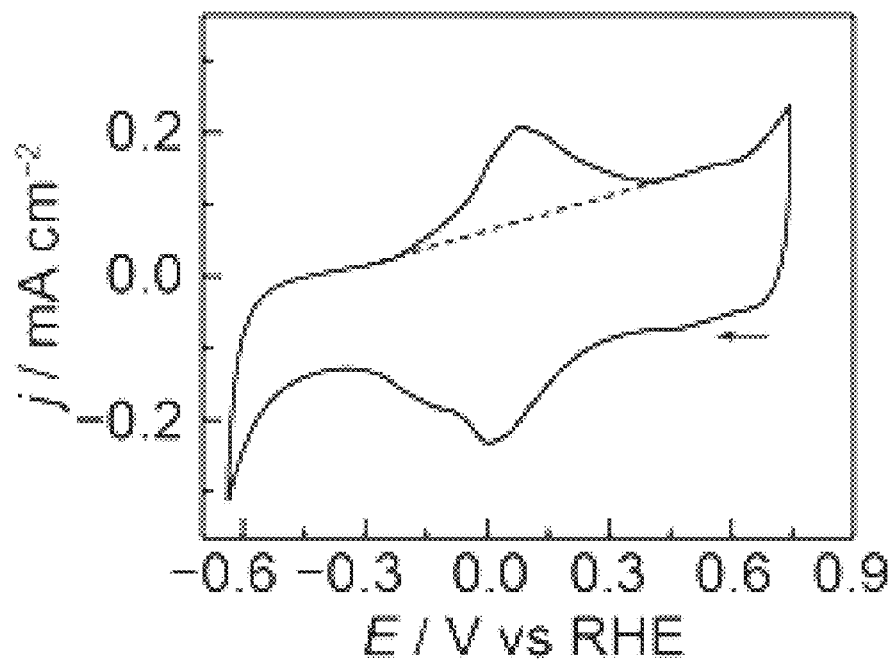
FIG. 11B is a graph depicting representative cyclic voltammogram of 2 recorded in $N_2$-saturated 0.1 M KOH electrolyte by 5 mV/s. Dotted line denotes baseline for peak integration.
Figure 11C:
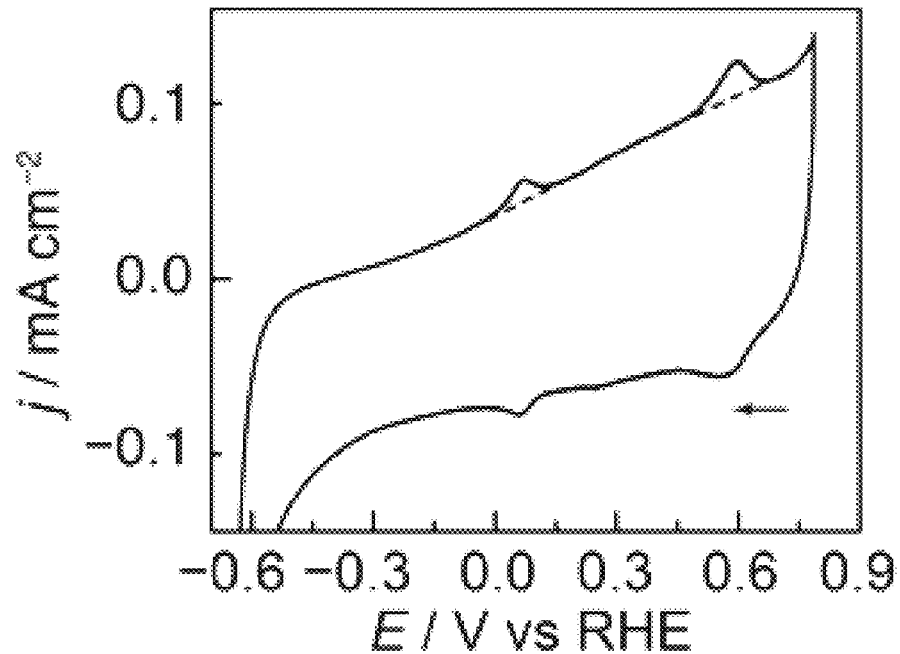
FIG. 11C is a graph depicting representative cyclic voltammogram of 3 recorded in $N_2$-saturated 0.1 M KOH electrolyte by 5 mV/s. Dotted line denotes baseline for peak integration.

8. Redox waves corresponding to surface bound pyrazine units were found to have peak currents linearly proportional to the scan rate (representative data is shown in FIG. 9). The population of electroactive surface-bound pyrazines was estimated by integration of redox waves observed in slow scan (5 mV/s) cyclic voltammograms (FIG. 11). Linear sweep voltammetry scans of oxygen reduction catalysis were recorded in $O_2$-saturated 0.1 M KOH without iR compensation and produced the data shown in FIGS. 3, 4, 12, 15, and 20.

Example 5

Determination of Surface Concentration of Pyrazine Units

Integration of the redox waves described in Example 4 provided an estimate of the surface site density of electroactive pyrazines. Accounting for the surface roughness of the anodized glassy carbon electrode (see FIG. 10, FIG. 11, and Table 5) and assuming two electrons transferred per pyrazine unit, site densities of ~0.25 nmol cm$^{-2}$ were calculated for 1 and 2, and 14 pmol cm$^{-2}$ was calculated for 3. The values obtained for 1 and 2 are comparable to the coverages observed for self-assembled monolayers on Au electrodes, indicating that the surface population of pyrazines in 1 and 2 was relatively high, whereas the surface population of 3 was ~20 fold lower. The relatively low site density observed for 3 may be due to the low nucleophilicity of the amines in 3' and/or electrostatic repulsion of pyridinium units on the surface, inhibiting a high degree of incorporation.

Figure 10A:
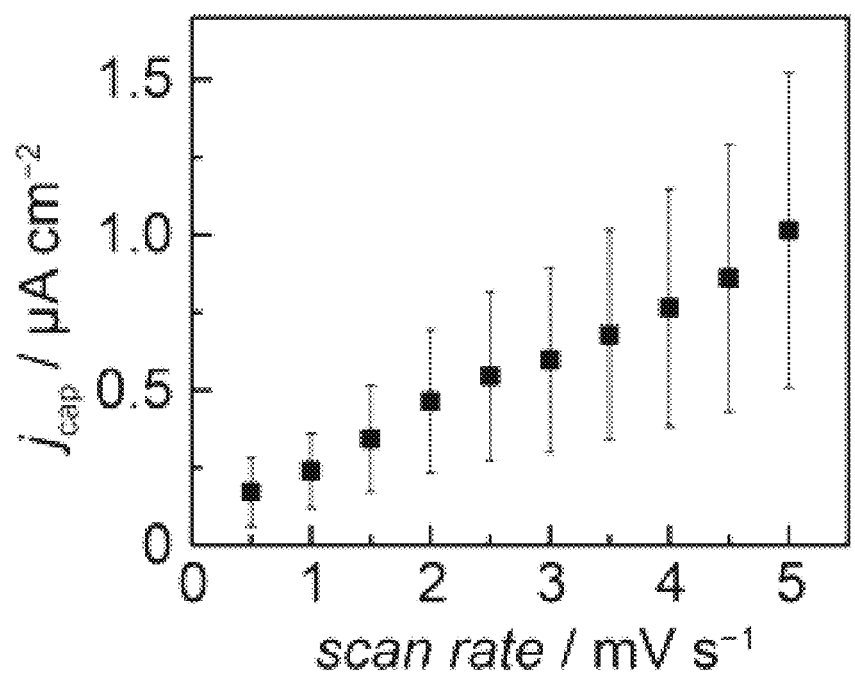
FIG. 10A is a graph depicting representative double layer capacitance measurement for polished glassy carbon. Plot was obtained by taking the capacitive current $(j_{cap}=(j_a-j_c)/2)$ recorded in cyclic voltammogram in $N_2$-saturated 0.1 M $N(Bu)_4PF_6$ acetonitrile electrolyte.
Figure 10B:
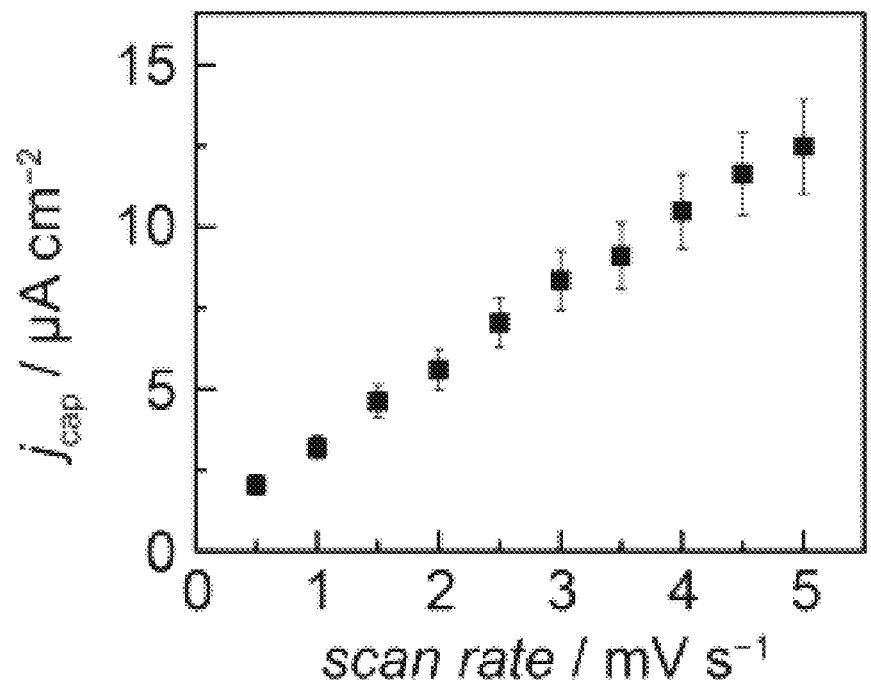
FIG. 10B is a graph depicting representative double layer capacitance measurement for unmodified anodized glassy carbon. Plot was obtained by taking the capacitive current $(j_{cap}=(j_a-j_c)/2)$ recorded in cyclic voltammogram in $N_2$-saturated 0.1 M $N(Bu)_4PF_6$ acetonitrile electrolyte.
Figure 10C:
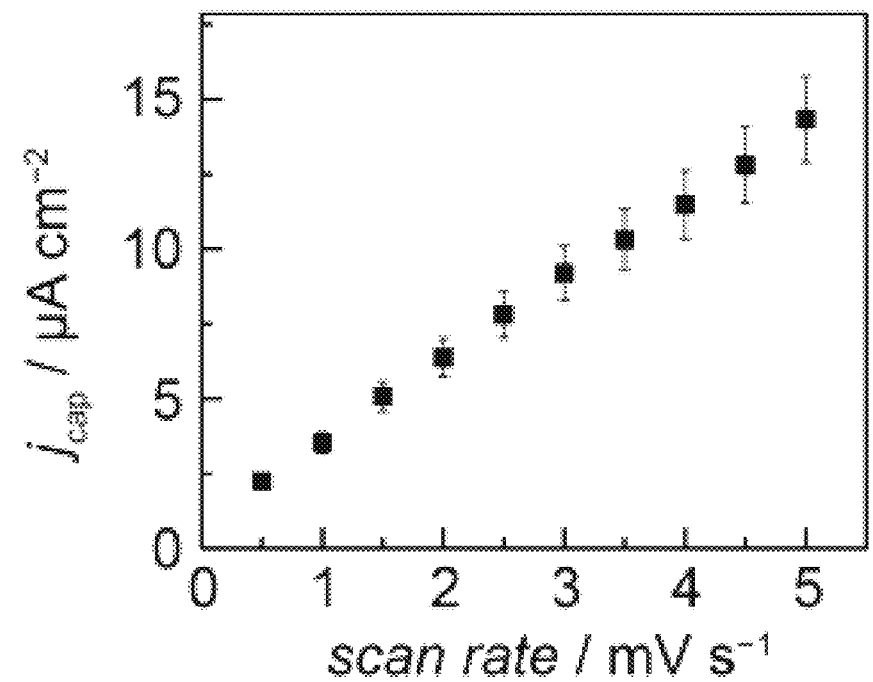
FIG. 10C is a graph depicting representative double layer capacitance measurement for 1. Plot was obtained by taking the capacitive current $(j_{cap}=(j_a-j_c)/2)$ recorded in cyclic voltammogram in $N_2$-saturated 0.1 M $N(Bu)_4PF_6$ acetonitrile electrolyte.

In order to obtain accurate values of the surface concentration of the pyrazine units, we determined the surface roughness of the anodized glassy carbon electrodes using double-layer capacitance measurements recorded in $N_2$-saturated acetonitrile electrolyte containing 0.1 M $N(Bu)_4$ $PF_6$. These measurements were conducted in nonaqueous electrolyte to minimize proton coupled pseudocapacitive currents that have been shown to artificially inflate surface area measurements. Double-layer capacitance measurements were conducted by sweeping the potential over a 100 mV window centered at the open circuit potential using a range of sweep rates spanning 0.5 to 5 mV/s. These low sweep rates were chosen to minimize convolution from ion transport limitations within the electrode microstructure. A representative plot of double layer capacitive current versus sweep rate is shown in FIG. 10 and yields the surface capacitance values shown in Table 5. This value was used to calculate the area normalized surface concentrations of pyrazine units using the following equation:

$$\Gamma_{GCP} = \frac{Q_{GCP} \times C_{dl\text{-}planar}}{C_{dl} \times nF}$$

where $\Gamma_{GCP}$ is the surface concentration of the pyrazines unit in moles per electroactive cm$^2$, $Q_{GCP}$ is the aggregate integrated charge density of the redox waves for surface pyrazines in the absence of $O_2$ (FIG. 11), F is Faraday's constant, n is the number of electrons, taken to be 2 based on the known two electron redox chemistry of pyrazines, $C_{dl}$ is the double layer capacitance measured via variable scan-rate voltammetry, and $C_{dl\text{-}planar}$ is the theoretical double layer capacitance of a planar glassy carbon electrode, taken to be 20 µF/cm$^2$ based on literature precedent. Surface concentration data for all electrodes is shown in Table 4.

TABLE 5

Electrochemical parameters used to calculate the surface concentration of pyrazine moieties. Based on literature precedent, the double layer capacitance of a planar glassy carbon surface, $C_{dl\text{-}planar}$, was taken as 20 µF cm$^{-2}$. The surface concentration of pyrazine units was calculated assuming that each site underwent a net two-electron reduction under $N_2$.

| Sample | Double-layer capacitance, $C_{dl}$ | Integrated charge, $Q_{GCP}$, of surface pyrazine redox waves | Surface concentration of pyrazine units, $\Gamma_{GCP}$ |
|---|---|---|---|
| Polished glassy carbon | 190 ± 100 µF cm$^{-2}$ | N/A | N/A |
| Anodized glassy carbon | 2.4 ± 0.4 mF cm$^{-2}$ | N/A | N/A |
| 1 | 2.9 ± 0.3 mF cm$^{-2}$ | 7.3 ± 0.8 mC cm$^{-2}$ | 0.26 ± 0.04 nmol cm$^{-2}_{real}$ |
| 2 | 2.8 ± 0.3 mF cm$^{-2}$ | 6.6 ± 0.6 mC cm$^{-2}$ | 0.24 ± 0.03 nmol cm$^{-2}_{real}$ |
| 3 | 2.9 ± 0.2 mF cm$^{-2}$ | 387 ± 61 µC cm$^{-2}$ | 14 ± 2 pmol cm$^{-2}_{real}$ |

Example 6

Electrolyte Purity Dependence of Oxygen Reduction Catalysis

Figure 3A:
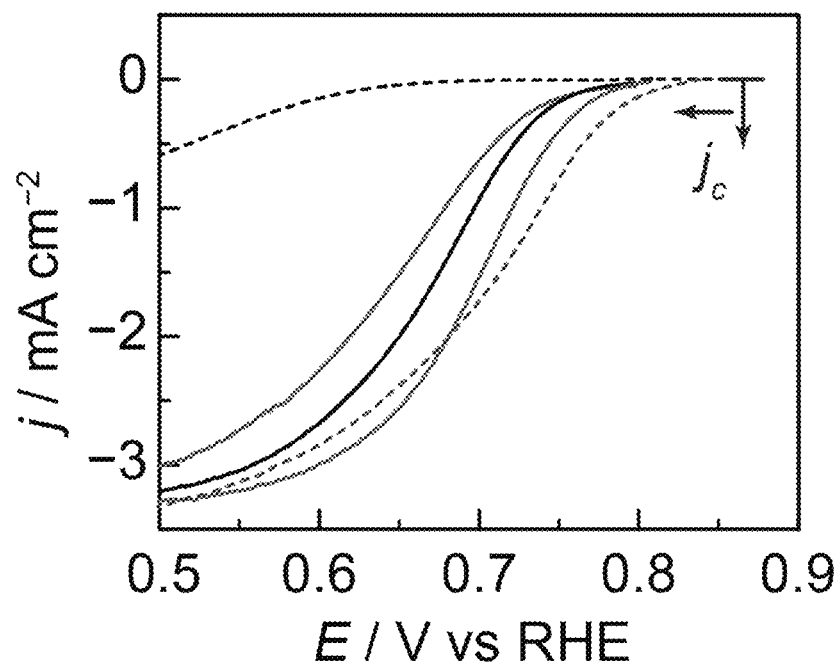
FIG. 3A is a graph depicting linear sweep voltammograms (5 mV/s scan rate) of 1 (middle solid line), 2 (top solid line), 3 (bottom solid line), 3'-treated Monarch 1300 (lower dashed line) and unmodified GC (upper dashed line) recorded in $O_2$-saturated 0.1 M KOH electrolyte. Data were recorded on a rotating disk electrode at 2000 RPM.
Figure 3B:
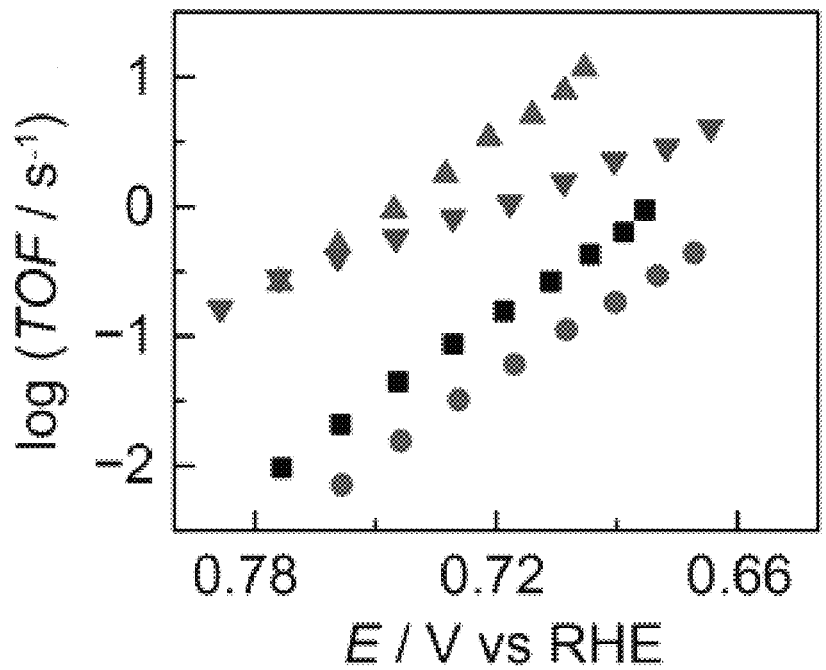
FIG. 3B is a graph depicting Tafel plots of per site activity versus applied potential for 1 (squares), 2 (circles), 3 (triangles) and polycrystalline Ag (inverted triangles).

GCPs were active for oxygen reduction catalysis as prepared without any thermal annealing. FIG. 3A shows linear sweep voltammograms of an unmodified GC rotating disk electrode (upper dashed line) and 1 (middle solid line). Whereas the unmodified glassy carbon electrode showed a catalytic onset potential of ~0.6 V, 1 displayed catalytic onset at 0.75 V and displayed 18-fold higher current at 0.6 V. The differential substitution pattern of 2 and 3 gave rise to a systematic change in catalytic activity; the electron-donating methyl group in 2 led to an ~18 mV shift to higher overpotential at 1 mA cm$^{-2}$ current density, whereas the electron-withdrawing pyridinium moiety in 3 led to an ~24 mV shift to lower overpotential at the same current density. Owing to a higher surface area, films of 3'-treated Monarch 1300 on GC disk electrodes exhibited a ~19 mV positive shift relative to 3 at the same current density. Importantly, exhaustive efforts to remove trace metal ion impurities from the KOH electrolyte via pre-electrolysis or chelation resulted in no change in catalytic activity for the modified carbons (FIG. 12), indicating that catalysis emerged from the surface pyrazine moiety itself rather than adsorbed metal ion impurities from the electrolyte. Together, these results establish that GCPs display oxygen reduction activity that can be incrementally tuned via derivatization of the phenylenediamine precursor.

Figure 12:
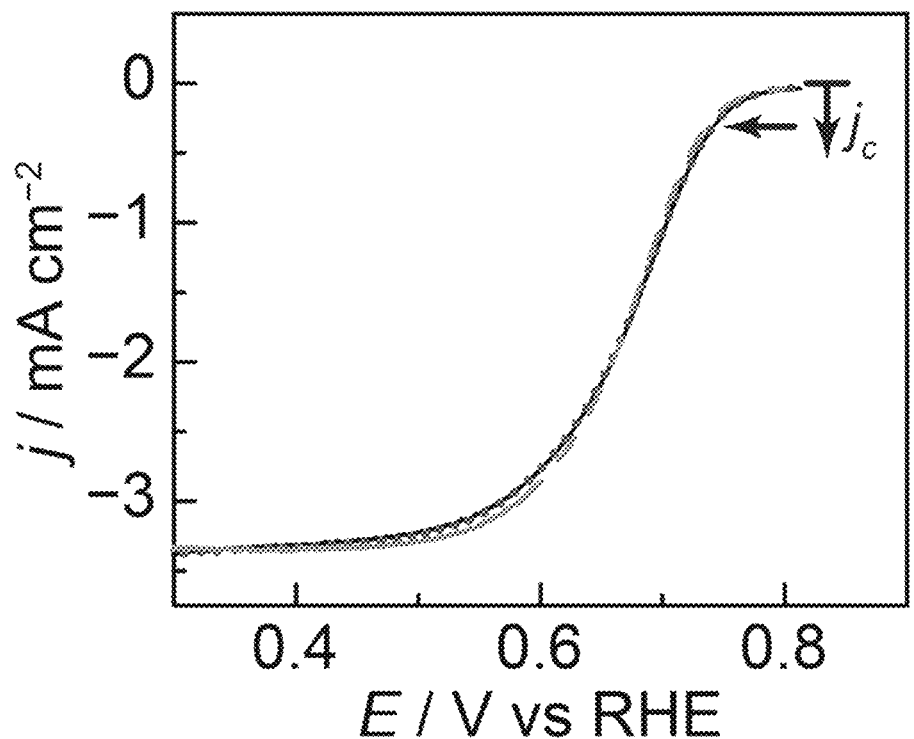
FIG. 12 is a graph depicting linear sweep voltammograms of 1 in $O_2$-saturated native (solid line), CHELEX®-treated (dotted line), pre-electrolyzed (dashed line) 0.1 M KOH electrolyte. Data were recorded on a rotating disk electrode at 2000 RPM at a scan rate of 5 mV/s.

To evaluate whether trace metal ion impurities in the electrolyte impact oxygen reduction catalysis, 1 was evaluated in native 0.1 M KOH (FIG. 12, solid line) and 0.1 M KOH purified of metal ion impurities by two independent methods: pre-electrolysis and metal ion chelation. Pre-electrolyzed solutions were prepared by potentiostatic electrolysis of an $N_2$-saturated 0.1 M KOH electrolyte bath at −1 V for 1 hour using a glassy carbon disk working electrode rotated at 2000 RPM. Electrode rotating increases the rate of mass transport to the surface accelerating electrodeposition of metal ion impurities. The working electrode was removed from the electrolyte solution under polarization to ensure removal of any electrodeposited metal ions, after which 1 was evaluated for oxygen reduction catalysis (FIG. 12, dashed line). Independently, the 0.1 M KOH was purified by metal ion chelation using an iminodiacetate resin (CHELEX® 100) known to have a high affinity for a broad array of metal ions. Prior to use, the CHELEX® resin was regenerated by treatment with 1 M HCl overnight, followed by washing with 5 liters of MilliQ water. Subsequently, 1 liter of 1 M KOH was added to the CHELEX® resin to generate the anionic active form and was then washed with one 1 liter of MilliQ water to remove residual base. The purified 0.1 M KOH solution was prepared by stirring the native 0.1 M KOH with the regenerated CHELEX® resin overnight and subsequent filtering. 1 was evaluated for oxygen reduction catalysis in this purified medium and the produced the data in FIG. 12, dotted line. In all cases, the data overlaid within ±5 mV.

Example 7

Potentiostatic Tafel Data Collection for Pyrazine-Modified Graphite

Figure 13:
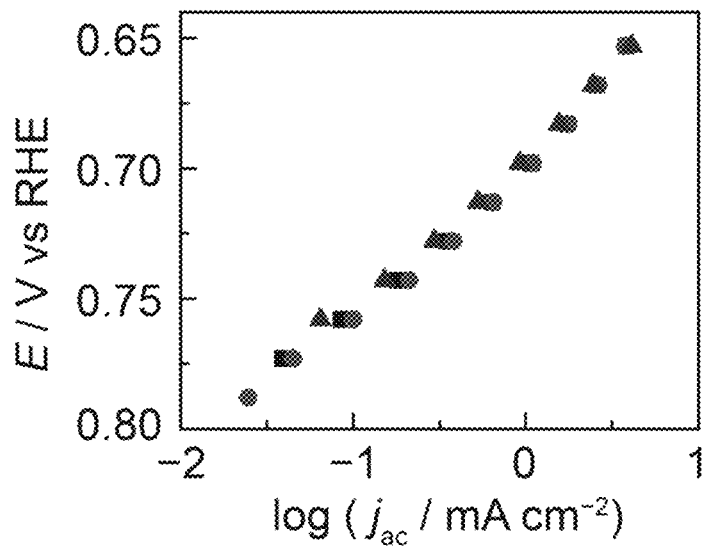
FIG. 13 is a graph depicting representative, potentiostatic, steady-state Tafel plots of 1 for three independent electrodes in $O_2$-saturated 0.1 M KOH aqueous electrolyte.
Figure 14:
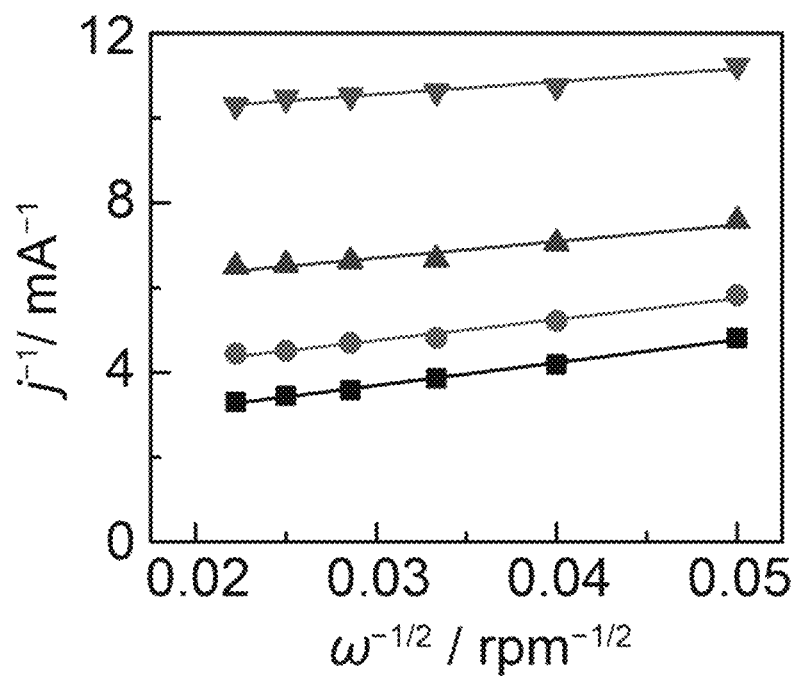
FIG. 14 is a graph depicting representative steady-state Koutecky-Levich plot of 1, polarized at 0.72 V (inverted triangles), 0.71 (triangles), 0.69 V (circles), and 0.68 V (squares). Data recorded in $O_2$-saturated 0.1 M KOH electrolyte.

To probe catalytic efficiency and mechanism in greater detail, steady state measurements of the activation-controlled current density for oxygen reduction as a function of applied potential were collected. Independently prepared electrodes exhibited very similar activity (FIG. 13), highlighting the reproducibility of this system. At larger overpotentials, the measured currents were corrected for transport limitations by extrapolating Koutecky-Levich (K-L) plots (representative K-L plots are shown in FIG. 14) to infinite rotation rate. The activation-controlled currents were then normalized to the integrated charge passed to reduce the electroactive surface pyrazine in the absence of $O_2$ (see above), thereby generating turnover frequency (TOF) values in electrons transferred per site per second.

Tafel plots of the log of the turnover frequency vs the applied potential are shown in FIG. 2B and reveal that the rate of oxygen reduction was highly sensitive to the substitution pattern of the GCP catalyst. Whereas methyl-substituted 2 (FIG. 3B, circles) displayed a turnover frequency of 0.12±0.01 $s^{-1}$ at 0.7 V, fluoro-substituted 1 was nearly 3-fold more active (FIG. 3B, squares) at the same potential with a turnover frequency of 0.35±0.04 $s^{-1}$. Interestingly, 3 displayed a turnover frequency value of 8.6±0.2 $s^{-1}$ at the same potential (FIG. 3B, triangles), over one order of magnitude greater than 1—providing for similar turnover frequency values to that of polycrystalline Ag (FIG. 3B, inverted triangles) on a per-site basis. This is believed to be the first report of a per-site turnover frequency for a metal-free N-containing carbon. Interestingly, 1-3 all displayed similar Tafel slopes of 60±5 mV/decade, indicating that they all proceed through a reversible one-electron transfer step followed by rate-limiting chemistry. These results establish that heterogeneous oxygen reduction catalysis can be tuned with molecular-level specificity using this simple surface condensation chemistry.

Steady-state current-potential (Tafel) data were collected by conducting controlled-potential electrolysis of modified glassy carbon rotating disk electrodes in $O_2$-saturated 0.1 M KOH electrolyte at a variety of potentials spanning the foot of the catalytic wave observed in FIG. 3. Typical values of $R_u$ ranged from 40-50Ω, leading to uncompensated Ohmic losses of <5 mV, which were neglected during data processing. For the higher overpotential data points, activation-controlled currents were determined by extrapolating Koutecky-Levich (K-L) plots to infinite rotation rate. The rotation rate of the electrode was varied between 400 to 2025 RPM, and representative K-L plots are shown in FIG. 14. In all cases, catalytic currents reached steady state within 1 minute, and the endpoint current was taken as the steady-state value. The data shown in the Tafel plots (FIG. 3) are the average and standard deviation of three independently prepared electrodes, and representative data overlays of independent electrode preparations are shown in FIG. 13. The Tafel data were normalized by the number of electroactive pyrazine units by dividing the raw activation-controlled catalytic current by the total integrated charge of the redox wave(s) observed in the absence of $O_2$ to generate the per-site turnover frequency plots shown in FIG. 3. These data are also the average and standard deviation of three independently prepared electrodes.

Example 8

Figure 15A:
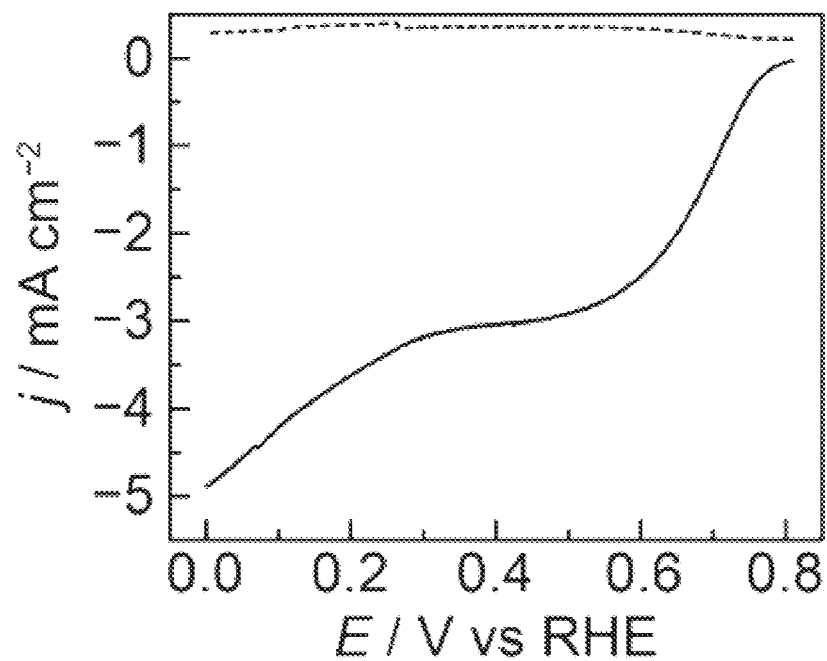
FIG. 15A is a graph depicting rotating ring disk linear sweep voltammetry for four-electron reduction of $O_2$ to $H_2O$. Disk current (solid line) for $O_2$ reduction on 3'-treated high surface area carbon and ring current of Pt (dotted line) for peroxide oxidation at a rotation rate of 2000 RPM.
Figure 15B:
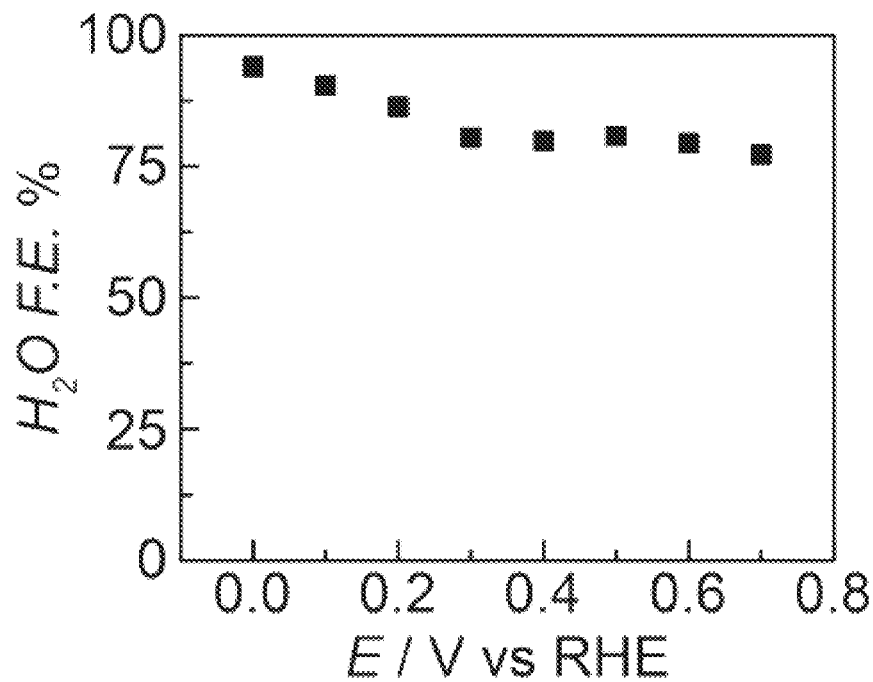
FIG. 15B is a graph depicting steady-state faradaic efficiency for four-electron reduction of $O_2$ to $H_2O$.
Figure 16A:
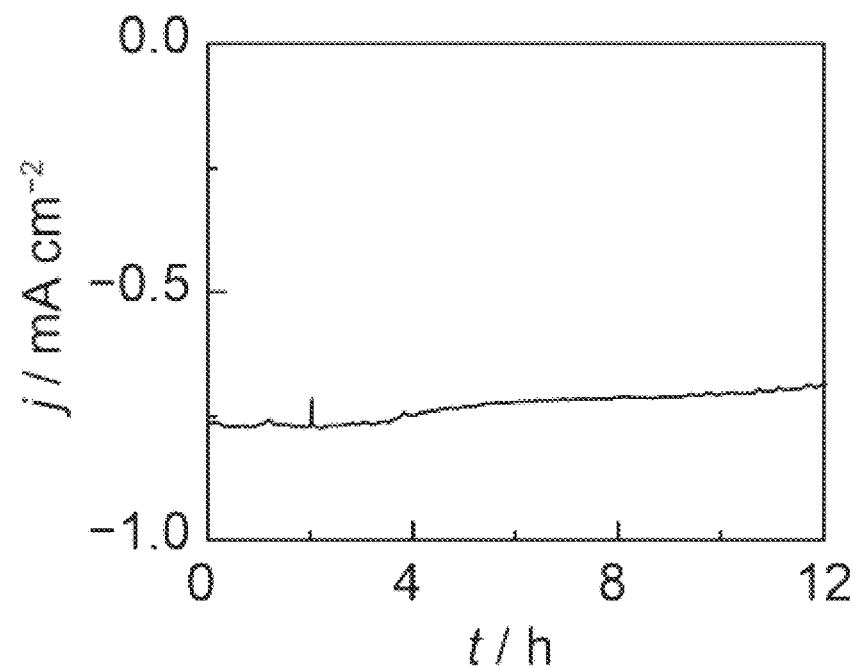
FIG. 16A is a graph depicting potentiostatic electrolysis for 1 recorded in $O_2$-saturated 0.1 M KOH electrolyte at 0.7 V at a rotation rate of 2000 RPM.
Figure 16B:
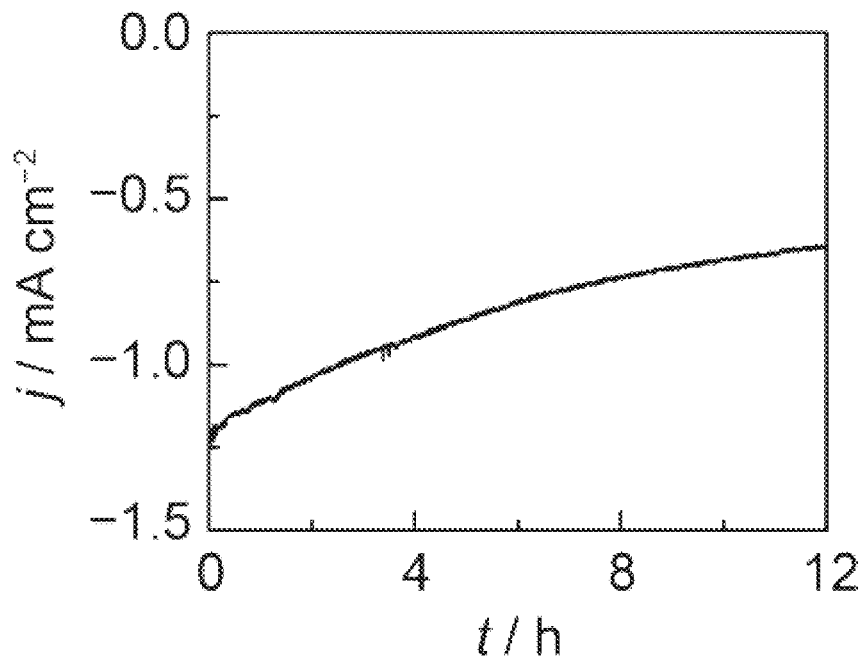
FIG. 16B is a graph depicting potentiostatic electrolysis for 3 recorded in $O_2$-saturated 0.1 M KOH electrolyte at 0.7 V at a rotation rate of 2000 RPM.

Rotating Ring Disk Electrode Linear Sweep Voltammetry for Pyrazine-Modified Graphite To probe the selectivity of 1-3 for four-electron reduction of $O_2$ to water, rotating ring-disk electrode (RRDE) voltammetry was conducted (FIG. 15). Largely invariant of the substitution pattern of the GCP, the Faradaic efficiency (FE) for water production was found to be ~77% at 0.7 V and rose to ~94% at 0 V. Additionally, long-term potentiostatic electrolysis of 1 revealed only 7% decay in catalytic activity over 12 hours (FIG. 16). Based on the total charge passed over this time period, this corresponds to a lower limit turnover number (TON) of ~8,000. Over the same time period 3 slowly deactivated to ~50% of its initial activity, which was attributed to base-catalyzed hydrolysis of the pyridinium moiety. Following initial decay, 3 exhibited sustained catalytic activity comparable to 1 (FIG. 16)—highlighting the robustness of the pyrazine linkage under harsh electrocatalytic conditions.

The Faradaic efficiency for four-electron reduction of $O_2$ to $H_2O$ was calculated via rotating ring disk electrode (RRDE) voltammetry using a Pine E6 RRDE containing a Pt ring electrode surrounding the modified glassy carbon disk electrode under investigation. While rotating the electrode at 2000 RPM, CV scans were initiated at the open circuit potential while the ring electrode was held at a constant polarization of 1.2 V vs RHE. These CV scans were invariant with cycle number and produced the representative data shown in FIG. 15. The Faradaic efficiency at a given potential was determined using the following equation:

$$FE_{H_2O} = \frac{i_d - \frac{i_r}{CE}}{i_d}$$

where $FE_{H2O}$ corresponds to the faradaic efficiency for four-electron oxygen reduction, $i_d$ is the disk current, $i_r$ is the background-corrected ring current, and CE is the collection efficiency of the RRDE. The background ring current was taken as the steady-state ring current measured while the disk electrode was held at open circuit. Prior to the measurement, a collection efficiency of 0.2 for this rotating ring disk electrode was determined by potentiostatically reducing ferricyanide while concurrently back oxidizing the generating ferrocyanide on the ring electrode. The calculated Faradaic efficiencies for four-electron reduction of $O_2$ are shown in FIG. 15B.

Example 9

Voltammetry of Water-Soluble Pyrazines

Figure 17A:
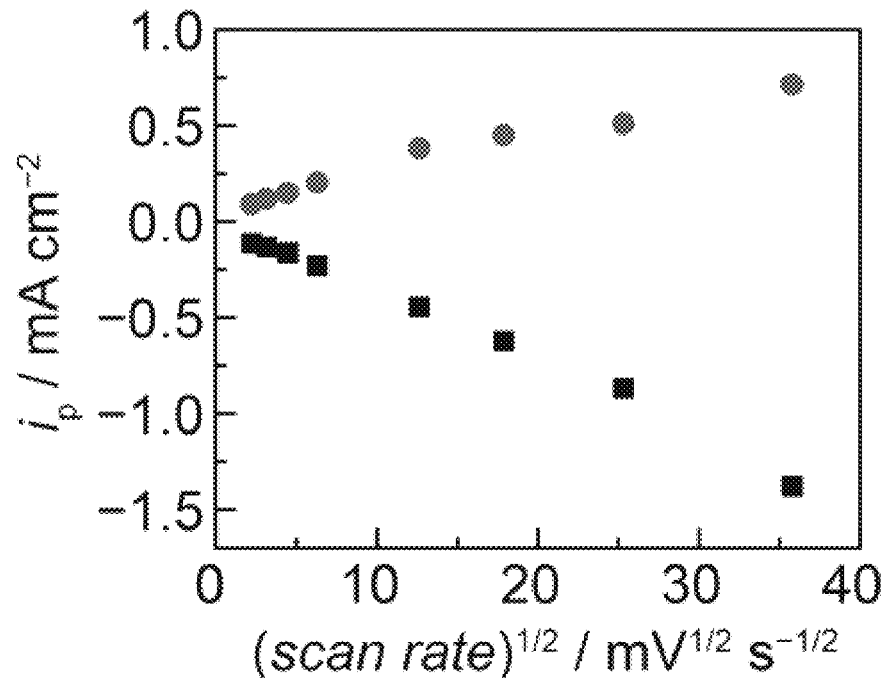
FIG. 17A is a graph depicting scan-rate dependence of peak current for pyrazine obtained from cyclic voltammetry in $N_2$-saturated 0.1 M KOH electrolyte. Circles and squares represent anodic and cathodic peak currents, respectively.
Figure 17B:
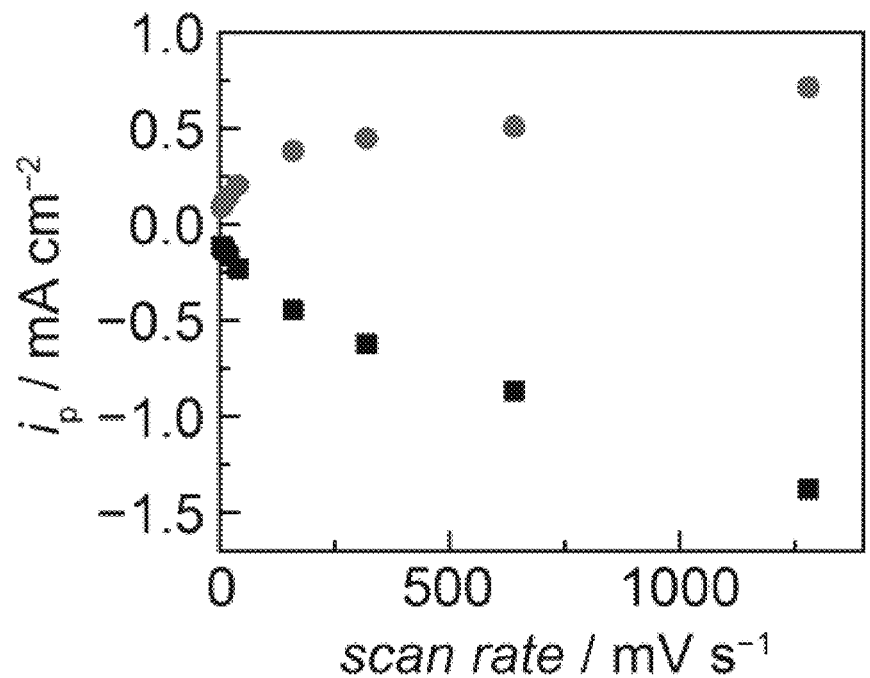
FIG. 17B is a graph depicting scan-rate dependence of peak current for pyrazine obtained from cyclic voltammetry in $N_2$-saturated 0.1 M KOH electrolyte. Circles and squares represent anodic and cathodic peak currents, respectively.
Figure 18A:
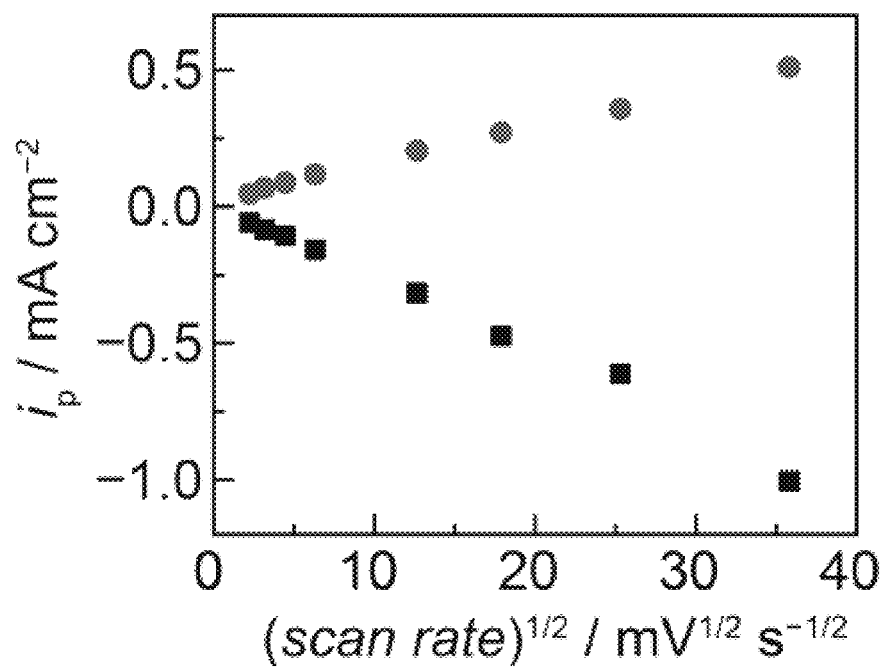
FIG. 18A is a graph depicting scan-rate dependence of peak current for quinoxaline-6-carboxylic acid obtained from cyclic voltammetry in $N_2$-saturated 0.1 M KOH electrolyte. Circles and squares represent anodic and cathodic peak currents, respectively.
Figure 18B:
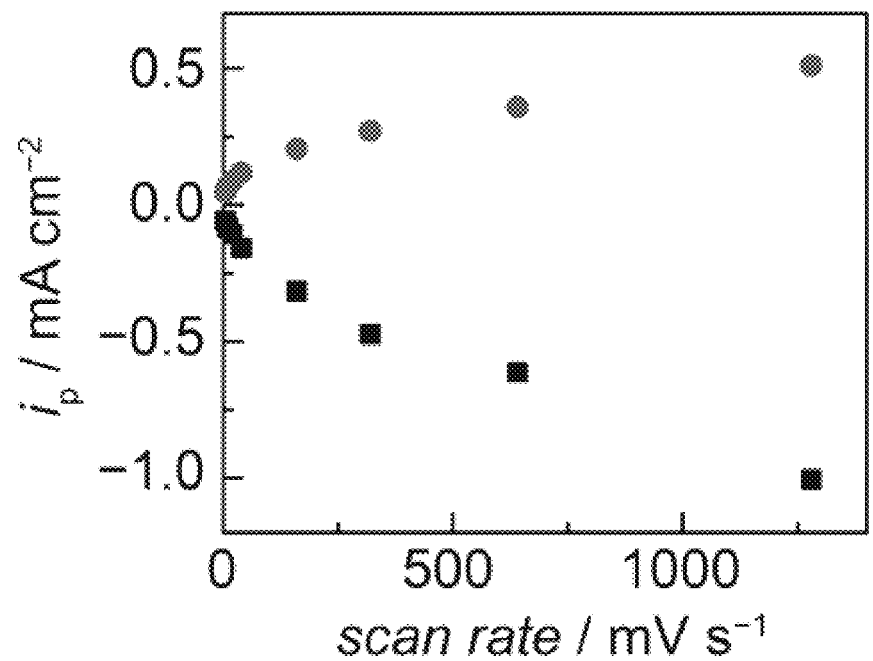
FIG. 18B is a graph depicting scan-rate dependence of peak current for quinoxaline-6-carboxylic acid obtained from cyclic voltammetry in $N_2$-saturated 0.1 M KOH electrolyte. Circles and squares represent anodic and cathodic peak currents, respectively.
Figure 19A:
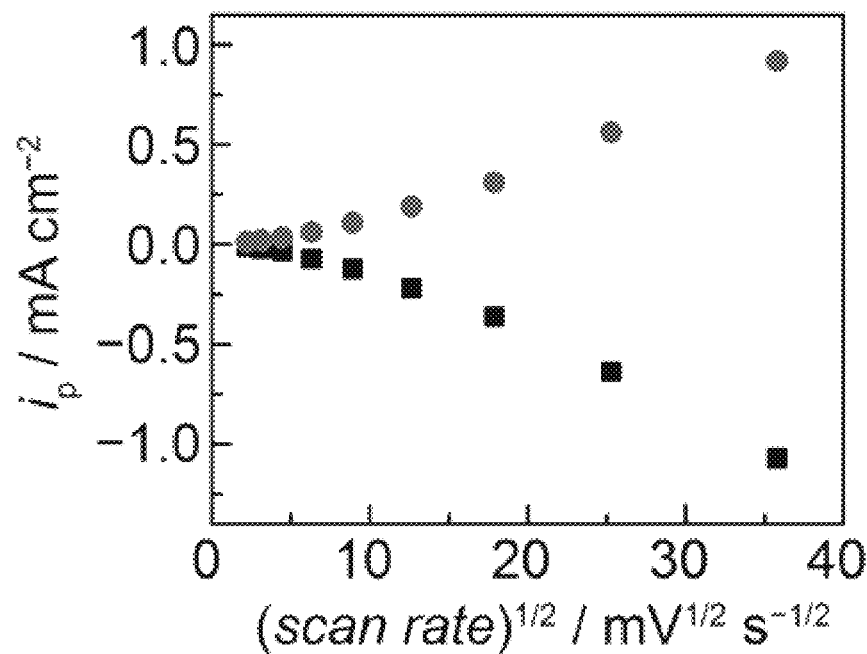
FIG. 19A is a graph depicting scan-rate dependence of peak current for dibenzo[a,c]phenazine-2-carboxylic acid obtained from cyclic voltammetry in $N_2$-saturated 0.1 M KOH electrolyte. Circles and squares represent anodic and cathodic peak currents, respectively.
Figure 19B:
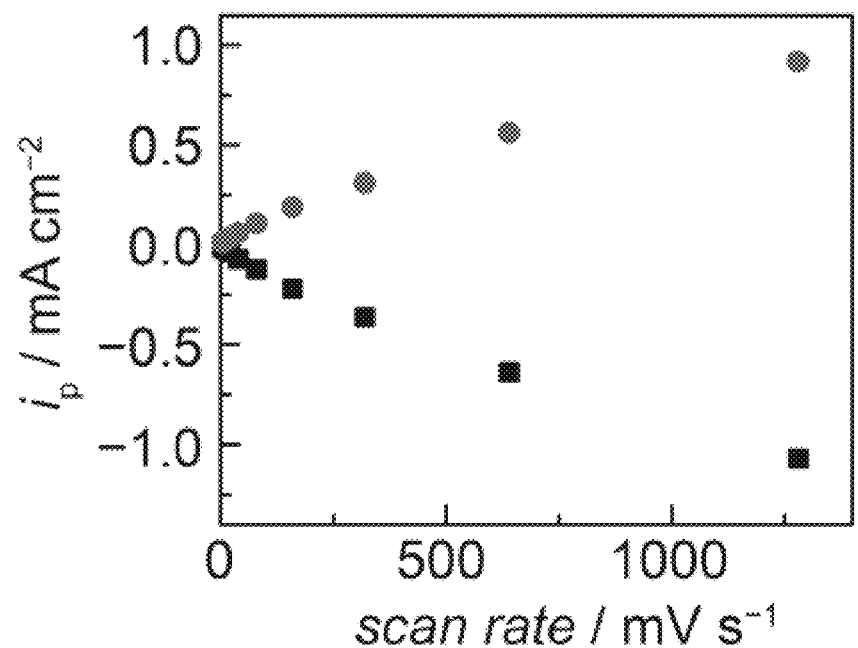
FIG. 19B is a graph depicting scan-rate dependence of peak current for dibenzo[a,c]phenazine-2-carboxylic acid obtained from cyclic voltammetry in $N_2$-saturated 0.1 M KOH electrolyte. Circles and squares represent anodic and cathodic peak currents, respectively.
Figure 20:
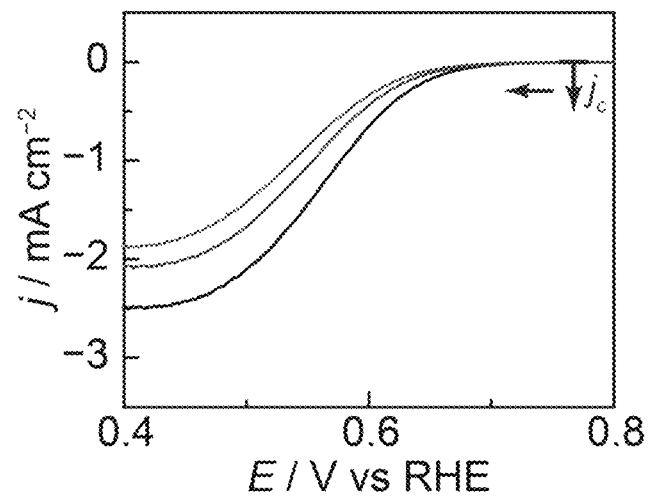
FIG. 20 is a graph depicting linear sweep voltammograms (5 mV/s scan rate) of a polished glassy carbon disk electrode in $O_2$-saturated 0.1 M KOH electrolyte containing 0 (bottom curve), 5 (middle curve), and 22 (top curve) mM quinoxaline-6-carboxylic acid.

GCPs displayed significantly greater oxygen reduction activity than homogenous molecular analogs. Cyclic voltammograms of pyrazine (FIG. 4A, bottom trace), quinoxaline-6-carboxylic acid (FIG. 4A, next-to-bottom trace) and dibenzo[a,c]phenazine-2-carboxylic acid (FIG. 4A, next-to-top trace) displayed reversible waves in the absence of $O_2$. The former two molecules exhibited peak currents that scaled linearly with the square root of the scan rate, diagnostic of a diffusing species (FIG. 17 & FIG. 18), whereas the wave for the latter arises from both adsorbed and diffusing species (FIG. 19). As the number of fused rings increased across this series, the formal reduction potential shifted positively by ~0.3 V to a value comparable to the main peak observed for 4 (FIG. 4A, top trace), the GCP analog bearing a 4-carboxy-substituent. Interestingly, ORR catalytic current for all of the molecular analogs was actually suppressed relative to the background activity of the freshly polished glassy carbon electrode, suggesting that these molecules deactivate the electrode towards oxygen reduction catalysis. Indeed, increasing the concentration of quinoxaline-6-carboxylic acid only served to suppress catalytic activity further (FIG. 20). In contrast, 4 displayed ORR onset ~100 mV more positive than the GC background. The unique performance of the GCP may arise from surface-bound species with more positive potentials than that of discrete molecules, that give rise to the broad shoulders observed in cyclic voltammograms recorded in the absence of $O_2$ (FIG. 2A, bottom tracing), or to an intrinsic role of extended conjugation in lowering the barrier for electron transfer and $O_2$ activation. These data highlight that GCPs can display potent multi-electron reactivity, which is absent in discrete molecular analogs.

Polished glassy carbon disks served as working electrodes. CV scans of molecules bearing pyrazine units were recorded without iR compensation in $N_2$-saturated 0.1 KOH electrolyte and generated the data shown in FIG. 4A. Peak currents were found to linearly scale with the square root of the scan rate for pyrazine (FIG. 17) and quinoxaline-6-carboxylic acid (FIG. 18), indicating a freely diffusing species. For dibenzo[a,c]phenazine-2-carboxylic acid, peaks currents scaled neither as a linear nor square root function of the scan rate (FIG. 19), indicating contributions to the CV wave from adsorbed and diffusing species. The oxygen reduction activity of the molecules was probed in $O_2$-saturated 0.1 KOH electrolyte using a polished glassy carbon disk electrode rotated at 2000 RPM and produced the data shown in FIG. 4B. Increasing concentrations of quinoxaline-6-carboxylic acid were found to progressively passivate the electrode surfaces (FIG. 20).

Example 10

Long-Term Electrode Stability for Pyrazine-Modified Graphite

The long-term stability of the modified electrodes was evaluated by controlled potential electrolysis in $O_2$-saturated 0.1 M KOH electrolyte. Electrolysis was conducted in a single-compartment 3-electrode cell containing a modified glassy carbon rotating disk electrode rotated at 2000 RPM, a Ti foil counter electrode, and a Hg/HgO reference electrode. A single-compartment cell was used to prevent pH gradients from developing over the course of prolonged electrolysis. Long-term stability traces are shown in FIG. 12 for 1 and 3.

Example 11

Fabrication of High-Surface Area Carbon-Coated Disk Electrodes 0.1 mL of 5% NAFION® solution, 0.1 mL of ethanol, 1.8 mL of water, and 10 mg of functionalized carbon powder were combined and resulting dispersion was sonicated for 30 minutes to generate a homogeneous colloidal ink. 20 μL of this dispersion was dropcast onto a 5 mm diameter glassy carbon rotating disk electrode and dried at 60° C. to form a well-adhered film. This procedure led to a carbon mass loading of ~0.5 mg cm$^{-2}$.

Example 12

Synthesis and Characterization of Molecular Precursors and Model Compounds for Pyrazine-Modified Graphite General Characterization Methods:
$^1$H and $^{13}$C NMR spectra were recorded on a Varian 500 MHz spectrometer. All chemical shifts are reported in ppm and are referenced to tetramethylsilane (TMS) utilizing residual $^1$H or $^{13}$C signals of deuterated solvents as internal standards. $^{19}$F NMR spectra were recorded on a Varian 300 MHz spectrometer. $^{19}$F chemical shifts are reported in ppm and are referenced to $CFCl_3$ utilizing 2,2,2-trifluoroethanol as an internal standard. High-resolution mass spectra were obtained using a Bruker Daltonics APEXIV 4.7 Tesla FT-ICR-MS using ESI or DART ionization. Elemental analyses were carried out by Robertson Microlit Laboratories, Inc., Ledgewood, N.J.

Synthesis of 3'

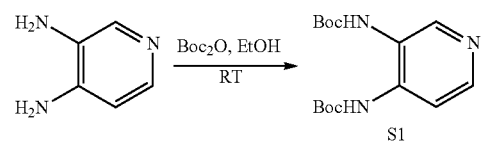

The synthesis was conducted according to the modified literature procedure. 1.09 g (10 mmol) of 3,4-diaminopyridine was dispersed in 20 mL of ethanol. 5.45 g (25 mmol) of di-t-butyl dicarbonate (Boc₂O) was added to the ethanol solution and allowed to react at room temperature overnight. The solution color changed from transparent to yellow with visible bubble formation. Subsequently, the solution was evaporated to give a crude product as a yellow oil. The crude product was purified by silica column chromatography (2:8 ethanol/CH₂Cl₂). The purified product was dried in vacuo overnight to give 0.58 g (19%) of a pale yellow powder, S1.

$^1$H NMR (500 MHz, CD$_2$Cl$_2$, δ): 8.09 (s, 1H), 8.01 (d, 1H), 7.59 (d, 1H), 6.78 (s, 2H) 1.51 (s, 18H).

$^{13}$C NMR (500 MHz, CD$_2$Cl$_2$, δ): 153.1, 141.7, 139.6, 134.5, 133.3, 114.8, 81.4, 28.4.

HRMS (ESI-M+): theoretical [M+H] 310.1761, experimental 310.1775.

2.55 g (5 mmol) of S2 was dispersed in 10 mL of 4-fluoroaniline (100 mmol) and 60 mL of ethanol. The solution was then heated to reflux under an N₂ atmosphere overnight. Upon cooling, the reaction mixture was concentrated to generate ~15 mL of a red oil. 5 mL of ethanol was then added to precipitate an orange solid. The orange solid was filtered, washed with 5 mL of ethanol, and dried in vacuo to yield 0.91 g (41%) of S3.

$^1$H NMR (500 MHz, CD$_2$Cl$_2$, δ): 9.92 (s, 1H), 9.18 (s, 0.6H), 8.19 (d, 1H), 7.38 (d, 2H), 7.23 (d, 2H), 7.03 (d, 1H), 1.53 (s, 18H).

$^{13}$C NMR (500 MHz, CD$_2$Cl$_2$, δ): 162.8, 160.9, 147.6, 137.6, 133.2, 131.3, 130.1, 128.1, 128.0, 123.9, 117.6, 117.4, 116.1, 88.2, 86.9, 30.3, 29.7.

$^{19}$F NMR (300 MHz, CDCl$_3$, δ): −108.3.

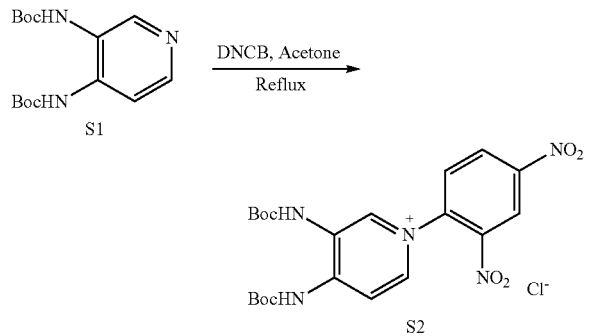

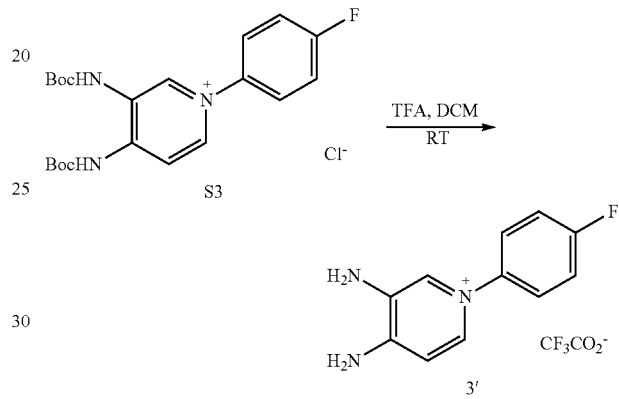

Preparation of the Zincke salt (shown above) was conducted according to a modified literature procedure. 3.09 g (10 mmol) of S1 and 2.22 g (11 mmol) of 2,4-dinitrochlorobenzene (DNCB) were dissolved in 20 mL of acetone. The solution was heated to reflux under N₂ atmosphere. Following an overnight reaction, the resulting orange solid was filtered, washed with 10 mL of acetone, and dried to yield 1.43 g (56%) of S2.

$^1$H NMR (500 MHz, DMSO-d$^6$, δ): 9.01 (s, 1H), 8.83 (d, 1H), 8.58, (s, 1H), 8.33 (d, 1H), 8.24 (d, 1H) 7.99 (s, 1H), 7.65 (d, 1H), 1.54 (s, 18H).

$^{13}$C NMR (500 MHz, DMSO-d$^6$, δ): 151.5, 150.1, 148.0, 145.9, 141.5, 141.0, 140.6, 134.1, 132.2, 123.7, 120.2, 109.6, 88.4, 87.3, 30.4, 29.8.

0.40 g (10 mol) of S3 was dissolved in 20 mL of a 1:1 mixture of trifluoroacetic acid and dichloromethane and allowed to react at room temperature for 3 hours. Subsequently, the solvent was removed by rotary evaporation and the crude product was recrystallized from an ethanol/dichloromethane mixture, yielding orange crystals of 3' as a mixture of chloride and trifluoroacetate salts 0.21 g (72%).

$^1$H NMR (500 MHz, CD$_2$Cl$_2$, δ): 9.86 (s, 1H), 9.14 (s, 0.7H), 8.17 (d, 1H) 7.32 (d, 2H), 7.23 (d, 2H), 7.04 (d, 1H) ppm.

$^{13}$C NMR (500 MHz, CD$_2$Cl$_2$, δ): 162.9, 160.9, 147.7, 137.6, 133.1, 131.3, 130.2, 128.3, 128.2, 124.1, 117.4, 117.2, 116.2.

$^{19}$F NMR (300 MHz, CDCl$_3$, δ) 64.7, −114.5.

Elemental analysis: C$_{24}$H$_{22}$ClF$_5$N$_6$O$_2$, Calculated: C, 51.76; H, 3.98; N, 15.09. Found: C, 52.48; H, 3.46; N, 14.76.

Synthesis of dibenzo[a,c]phenazine-2-carboxylic acid

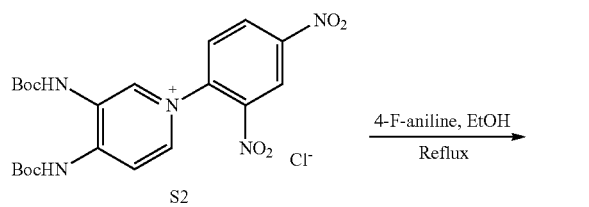

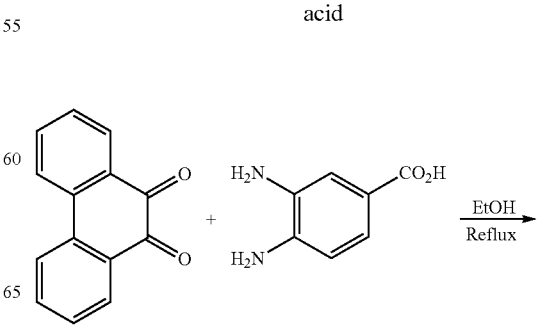

[Structure: dibenzo[a,c]phenazine-2-carboxylic acid]

1.04 g (5 mmol) of 9,10-phenanthraquinone and 0.75 g of 3,4-diaminobenzene-1-carboxylic acid (5 mmol) were suspended in 100 mL of ethanol. The reaction mixture was refluxed for 3 hours, and the resulting yellow solid was isolated by filtration. The solid was dispersed in 100 mL of ethanol, and heated to reflux for 30 minutes to dissolve residual starting materials. The solid was filtered hot and dried overnight in vacuo to yield 0.52 g (32%) of dibenzo[a,c]phenazine-2-carboxylic acid.

$^1$H NMR (500 MHz, DMSO, δ): 9.29 (d, 2H), 8.86 (s, 1H) 8.81 (d, 2H), 8.41 (t, 2H), 7.92 (m, 2H) 7.85 (t, 2H) ppm.

$^{13}$C NMR (N/A—the compound exhibited too low solubility).

Elemental analysis: Calculated: C, 77.77; H, 3.73; N, 8.64. Found: C, 77.44; H, 3.40; N, 8.66.

HRMS (ESI-MS−): m/z theoretical [M−] 323.0826, experimental 323.0805.

Example 13

Cyclic Voltammetry with and without Graphite Conjugation

Figure 21:
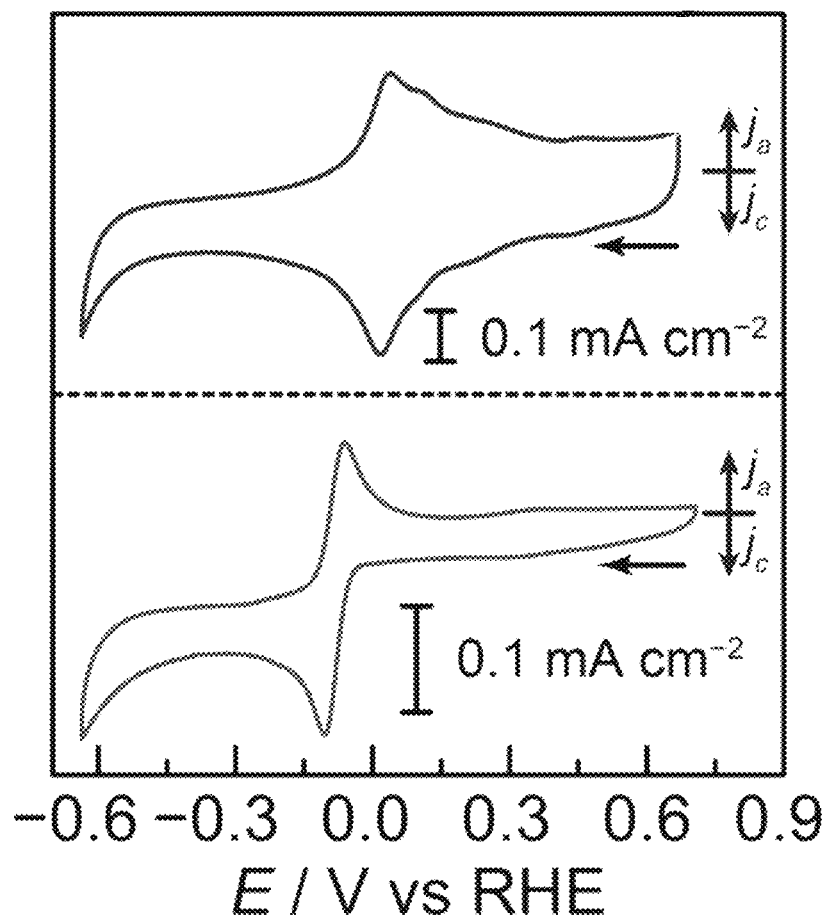
FIG. 21 is a graph depicting representative cyclic voltammograms (5 mV/s scan rate) of 4 (top trace) and 5 (bottom trace) recorded in $N_2$-saturated 0.1 M KOH electrolyte.

In aqueous electrolyte, graphite-conjugated pyrazines showed redox features analogous to soluble molecular analogs. Cyclic voltammograms of soluble pyrazines compound 5 (FIG. 21, bottom trace) and compound 7 (FIG. 22A, bottom trace) displayed reversible waves. Cyclic voltammograms in 0.1M KOH showed the two-proton, two-electron reduction of graphite-conjugated pyrazines to form surface N—H bonds. The data suggested that the pyrazine linkage was reduced to hydropyrazine in aqueous media for compounds 4 (FIG. 21, top trace) and 5 (FIG. 21, bottom trace).

Figure 22A:
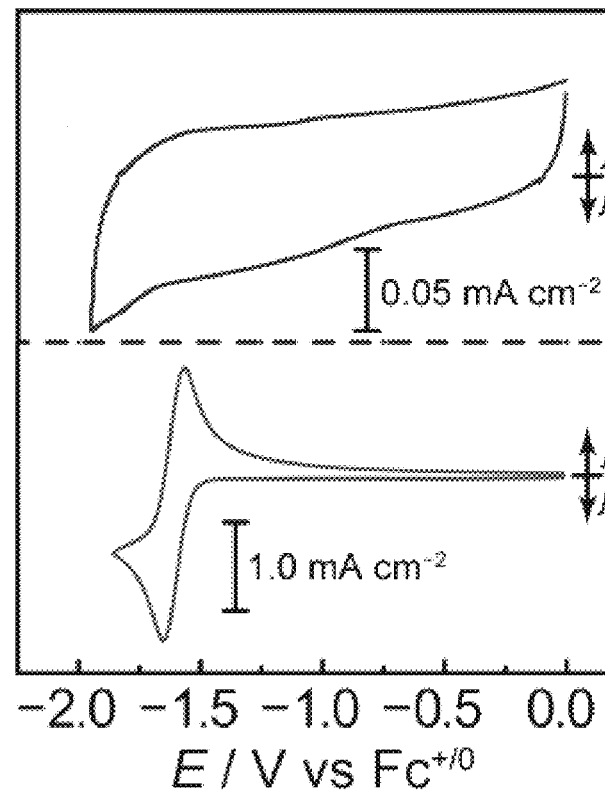
FIG. 22A is a graph depicting representative cyclic voltammograms (5 mV/s scan rate) of 6 (top trace) and 7 (bottom trace) recorded in 0.1 M $TBAPF_6$ acetonitrile electrolyte.

In nonaqueous electrolyte, graphite-conjugated pyrazines showed an absence of redox features relative to soluble molecular analogs. Whereas the unconjugated compound 7 displayed a reversible redox wave (FIG. 22A, bottom trace), now redox waves were observed above background for 6 (FIG. 22A, top trace). That is, the cyclic voltammograms reflected an absence of surface redox features without bond formation to graphite in aprotic media (acetonitrile electrolyte with 0.1 M TB APF$_6$).

Figure 22B:
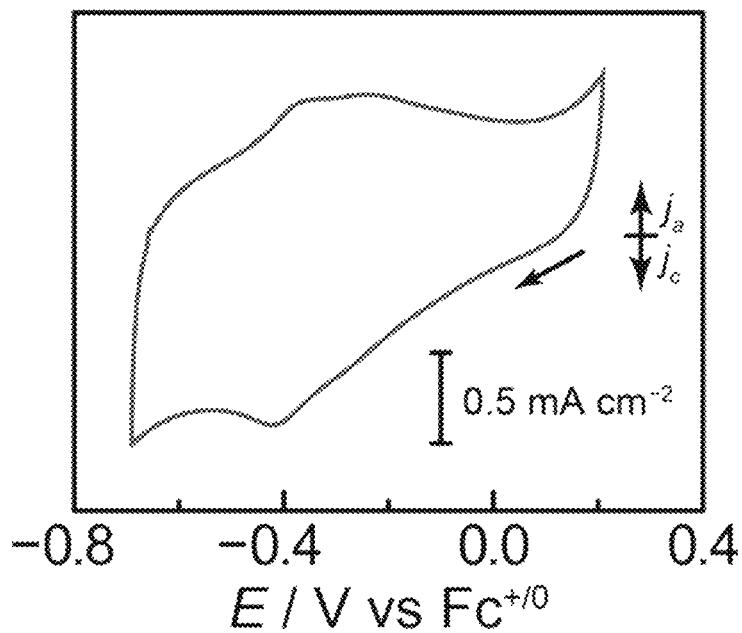
FIG. 22B is a graph depicting representative cyclic voltammogram (5 mV/s scan rate) of 6 recorded in acetonitrile with 0.1 M tosylic acid showing a proton transfer enabling an electron transfer.

In addition, the cyclic voltammogram (CV) of compound 6 recorded in acetonitrile with 0.1 M tosylic acid showed proton transfer enabling electron transfer, which is analogous to a metal surface (FIG. 22B). These data demonstrated that a proton source was required in order to observe a redox feature in the cyclic voltammogram.

Example 14

Synthesis of Graphite-Conjugated Rhenium (Re) Glassy Carbon Electrodes

Graphite-conjugated Re surfaces displayed a uniform distribution of well-defined Re sites that performed CO$_2$ reduction to CO with near-unity selectivity and improved activities relative to that of a soluble molecular analogue. To facilitate detailed electrochemical studies, compound 9 was prepared as described in Scheme 2 using a glassy carbon (GC) electrode as the graphitic host. Compound 9 refers to this functionalized GC surface unless otherwise noted. To clean the GC surface and increase the population of o-quinone moieties, electrodes were subjected to a brief anodic treatment adapted from literature methods. The oxidized glassy carbon electrodes were then treated with Re(5,6-diamino-1,10-phenanthroline)-(CO)$_3$Cl in ethanol for 12 h at 60° C. (Scheme 2). Residual monoimine-linked and physisorbed Re(5,6-diamino-1,10-phenanthroline)(CO)$_3$Cl was removed by subsequent treatment with 0.1 M HCl followed by washing with copious amounts of water and ethanol, furnishing the final compound 9 surface.

Scheme 2
Condensation of ortho-phenylenediamine derivatives with ortho-quinone edge sites of graphene sheets to generate graphite-conjugated catalysts (GCCs).

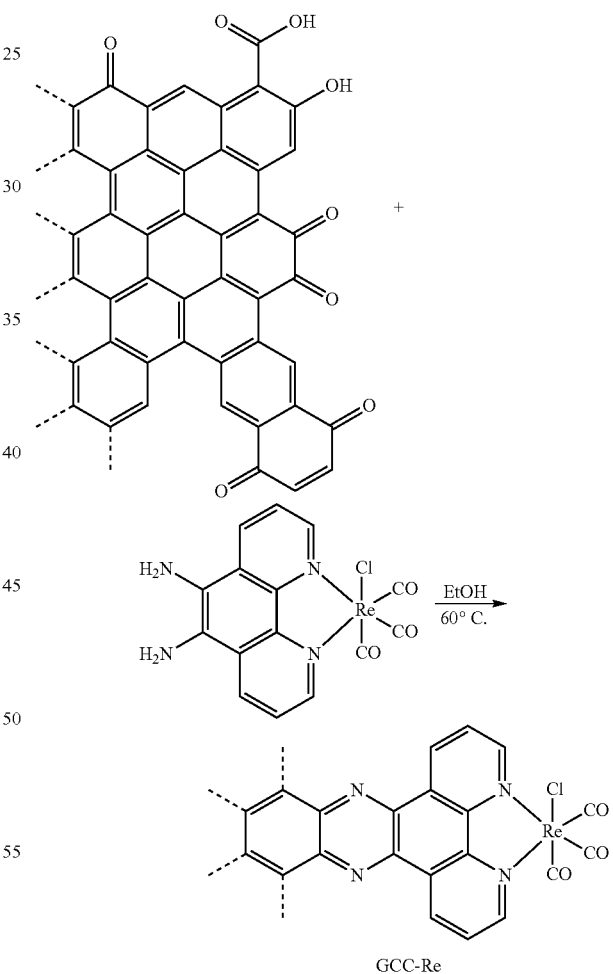

GCC-Re

All electrochemical measurements were performed at ambient temperature (21±1° C.) using a Biologic VSP 16-channel or Gamry REF 600 potentiostat and a three-electrode electrochemical cell with a porous glass frit separating the working and auxiliary compartments. Prior to use, electrochemical cells were soaked in concentrated nitric acid overnight, rinsed with Millipore water, and dried in an oven at 120° C. for a minimum of 1 h. All measurements on functionalized glassy carbons were conducted using a glassy carbon RDE tip working electrode (5 mm diameter, 0.196 cm$^2$, Pine Research Instrumentation). Measurements on molecular catalysts were recorded using a glassy carbon working electrode (3 mm diameter, 0.0707 cm$^2$, CH instruments). Prior to each experiment, glassy carbon (GC) electrodes were successively polished in an aqueous 1, 0.3, 0.05 μm alumina slurry against a Buehler MasterTex polishing pad. Unless otherwise stated, current densities were normalized to the geometric surface area of the working electrode. In all cases, the auxiliary electrode was a high surface area platinum mesh (Alfa Aesar, 99.997%). All electrochemical measurements in non-aqueous electrolyte were performed in an N$_2$-filled Purelab RE 4 GB 2500 Glovebox. As the modified surfaces displayed deactivation in the presence of Brønsted acids (FIG. 36), anhydrous acetonitrile was used for all measurements. TBAPF$_6$ was used as the supporting electrolyte unless otherwise noted. All measurements were conducted using a Ag/AgCl pseudoreference consisting of a bleach-oxidized silver wire immersed in 0.1 M TBAPF$_6$ electrolyte and separated from the working compartment by a porous CoralPor (BASi) frit. All potentials are referenced to the ferrocene/ferrocenium (Fc/Fc$^+$) couple, which was measured at the end of every experiment by adding a small amount of ferrocene to the electrolyte solution. For measurements conducted under CO$_2$ saturation, CO$_2$ was continuously bubbled through the electrolyte in the working compartment of the electrochemical cell.

Example 15

XPS Curve Fitting for Graphite-Conjugated Re

Figure 23:
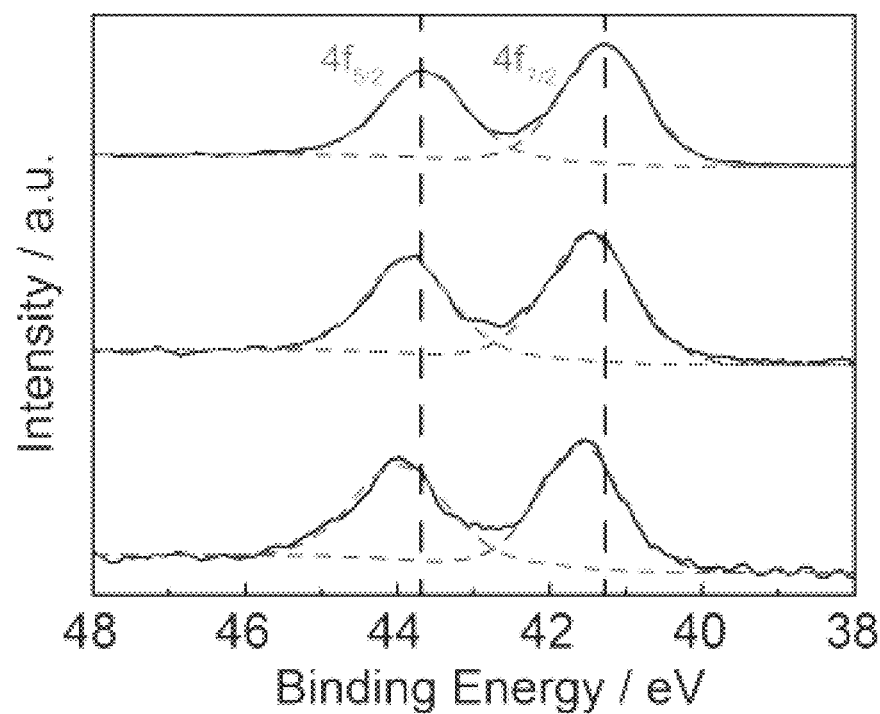
FIG. 23 is a graph depicting high resolution XPS scans of the Re 4f region for a sample of freshly prepared 9 (top trace), 9 following two CV cycles (middle trace), and 9 following 1.5 h of cathodic electrolysis at 1.0 mA $cm^{-2}$ (bottom trace).
Figure 24:
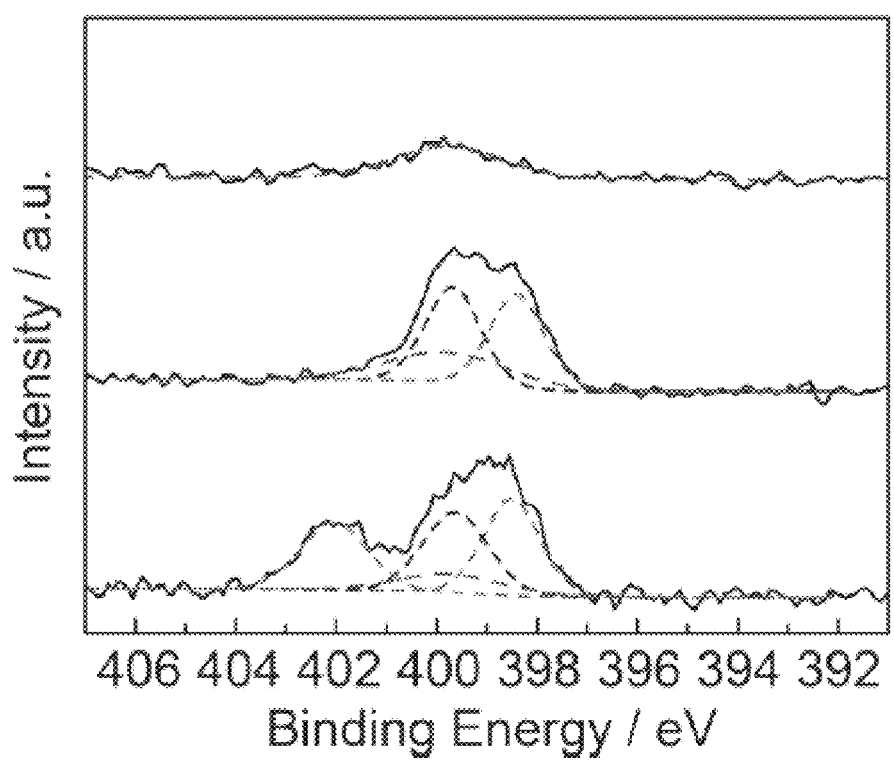
FIG. 24 is a graph depicting high resolution XPS scan of the N 1s region for an oxidized glassy carbon electrode (top trace), freshly prepared 9 (middle trace), and 9 following two CV cycles (bottom trace).
Figure 29:
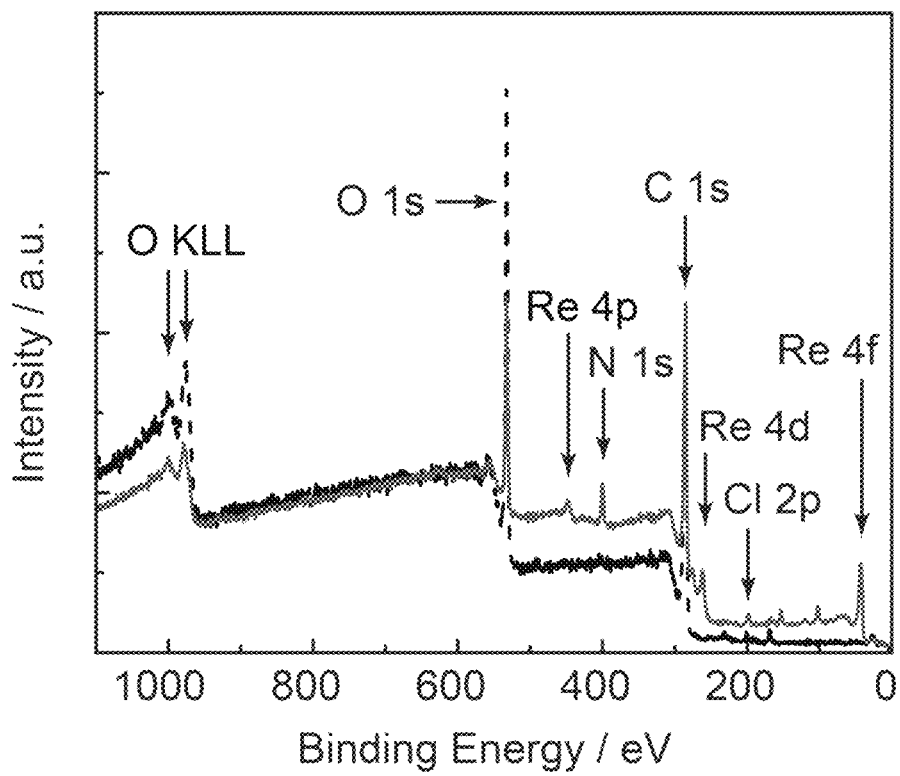
FIG. 29 is a graph depicting XPS survey spectra of oxidized glassy carbon (black dashed line) and 9-modified glassy carbon (gray line).

Surface analysis supported the structural assignment shown in Scheme 2 for compound 9. Survey XPS spectra of compound 9 (FIG. 29) exhibited new peaks corresponding to Re 4f and Cl 2p transitions as well as increased intensity in the N 1s peak relative to the native N concentration of unmodified glassy carbon electrodes. Peak integrations revealed an increase in atomic surface concentrations of 1.2 and 4.2% for Re and N, respectively (Table 6). This was consistent with the expected Re/N ratio of 1:4 based on the structure of compound 9. High-resolution XPS spectra provided additional information about the surface chemistry of the modified electrodes. The Re 4f spectrum of freshly prepared compound 9 (FIG. 23, top trace) revealed Re 4f$_{5/2}$ and 4f$_{7/2}$ peaks at 43.7 and 41.3 eV, respectively. These peaks were sharp, with full widths at half-maximum (fwhm) of 1.29 and 1.34 eV, respectively, and indicated the presence of a single homogeneous environment for the Re centers. Likewise, the N 1s spectra of freshly prepared compound 9 (FIG. 23, middle trace) evinced the introduction of two new surface nitrogen environments above the native N background of the unmodified electrode (FIG. 24, top trace). The new peaks appeared in a 1:1 ratio at 398.4 and 399.7 eV and corresponded to the pyrazine and phenanthroline nitrogens, respectively. Together, the XPS data supported the formation of discrete Re(phen)(CO)$_3$Cl fragments linked to the surface through pyrazine bridges in compound 9.

TABLE 6

Surface atomic concentrations of 9 determined from XPS survey spectra with different electrochemical treatment.

| Sample | Treatment | C % | O % | N % | Re % | Cl % |
|---|---|---|---|---|---|---|
| GC | Oxidized at +3.5 V vs RHE inaqueous 0.1M H$_2$SO$_4$ | 63.02 | 35.61 | 1.36 | 0 | 0 |
| Cmpd 9 | None (freshly prepared) | 70.5 ± 2.1 | 22.0 ± 2.5 | 5.6 ± 1.4 | 1.23 ± 0.48 | 0.61 ± 0.25 |
| | Two CV cycles between −0.4 and −2.4 V | 79.7 ± 2.9 | 17.0 ± 2.2 | 3.07 ± 1.2 | 0.20 ± 0.10 | 0 |
| | Galvanostatic polarization at −1 mA/cm2 for ~1.4 h** | 82.8 ± 1.3 | 14.33 ± 0.67 | 2.37 ± 0.42 | 0.04 ± 0.02 | 0.4 ± 0.5* |

Figure 33:
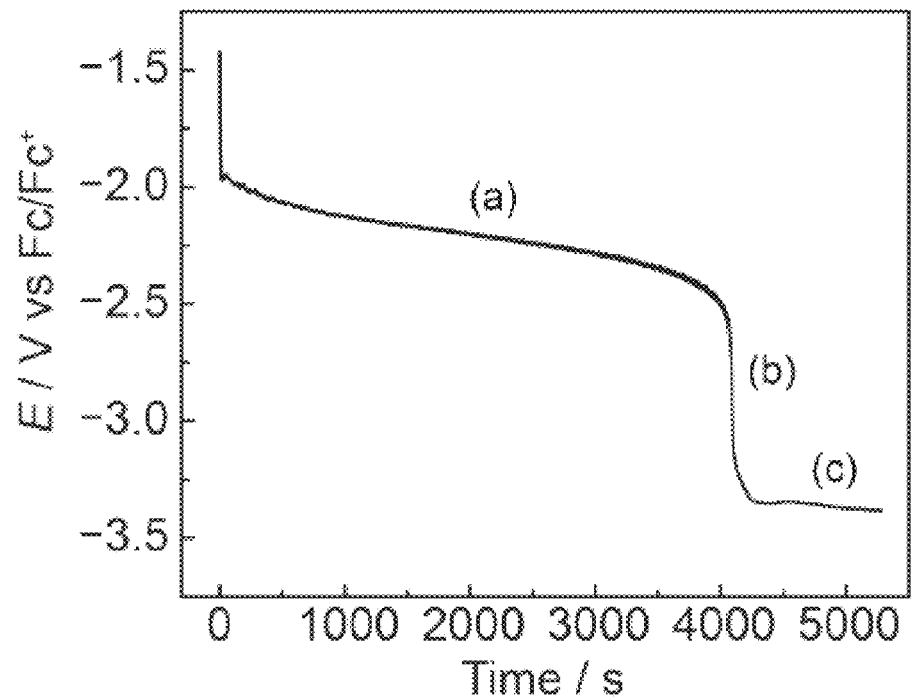
FIG. 33 is a graph depicting a galvanostatic polarization trace (no electrode rotation) at −1.0 $mA/cm^2$ for 9 recorded in $CO_2$-saturated 0.1 M $TBAPF_6$ acetonitrile electrolyte. For the first 1.4±0.3 h of electrolysis (region a) CO is produced with a Faradaic efficiency (FE) of 96±3%, after which there is a precipitous increase in the required overpotential (region b) that is accompanied by a significant drop in the FE for CO production to <5% upon further polarization (region c).

*High-resolution XPS spectra over the Cl 2 p peaks showed that the binding energy of Cl in the galvanostatically polarized sample was distinct from that of the freshly prepared sample and was attributed to adventitious adsorbed chloride.
**Polarized until end of region (b) in FIG. 33.

Example 16

Synthesis of Rhenium-Modified High-Surface Area Carbons

Figure 25:
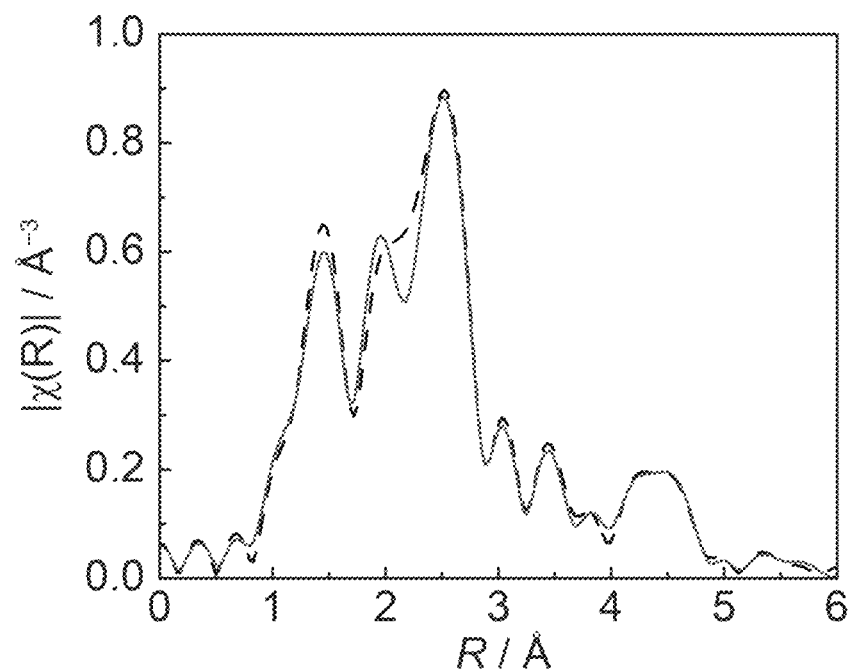
FIG. 25 is a graph depicting $k^2$-weighted magnitude of the Fourier transform of the extended X-ray absorption fine structure ($\Delta k$=2.6-11.9 $Å^{-1}$) of 10 (black dashed line) and 9-modified Monarch 1300 (gray line). The imaginary parts of the Fourier transform (not shown) of 10 and 9-modified Monarch carbon powder are also identical.
Figure 28:
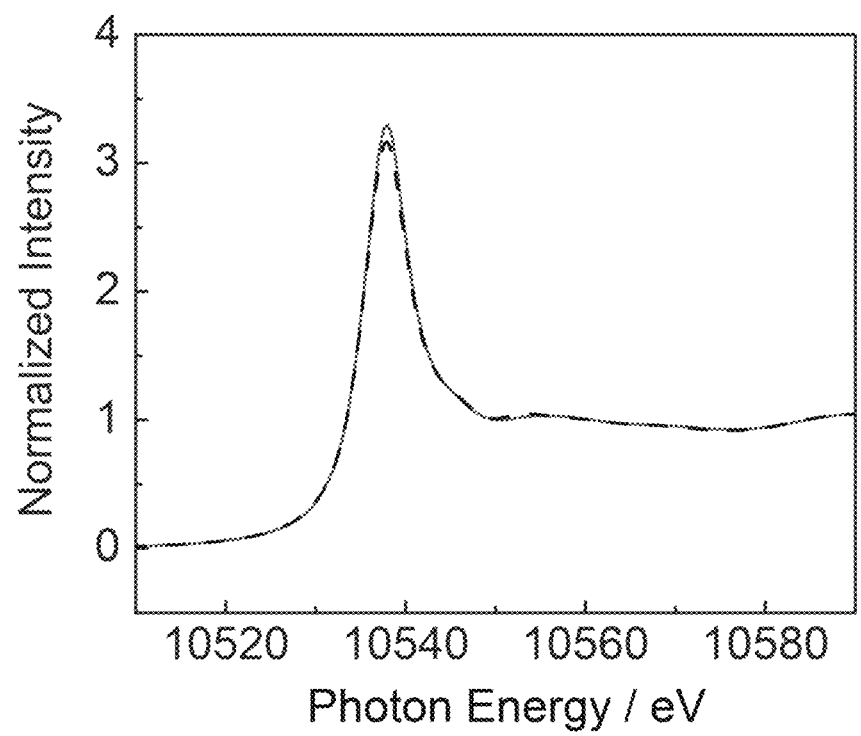
FIG. 28 is a graph depicting X-ray absorption near edge structure spectra of 9 (gray line) and 10 (black dashed line).

X-ray absorption spectroscopy (XAS) provided additional evidence in support of the existence of molecularly well-defined Re centers on compound 9 surfaces. To facilitate XAS studies, high surface area Monarch 1300 carbon black was used as the support instead of GC. Application of the same synthetic method in Scheme 2 generated compound 9 modified Monarch carbon with a 1.8 wt % Re loading as determined by inductively coupled plasma optical emission spectrometry. Re L3-edge X-ray absorption near edge spectroscopy (XANES) of compound 9 modified Monarch carbon and of compound 10 revealed nearly identical spectra (FIG. 28), establishing no significant changes in the oxidation state or local coordination geometry of the Re centers upon surface condensation. In addition, extended X-ray absorption fine structure (EXAFS) spectra of both samples (FIG. 25) revealed excellent agreement, indicating that the local environment of the Re center remains unchanged upon condensation. Together, the XPS and XAS data established that this mild surface ligation strategy preserved the integrity of the Re sites. See Example 22 for additional details on the XPS experiments and Example 24 for additional details on the XAS experiments.

Example 17

Figure 26A:
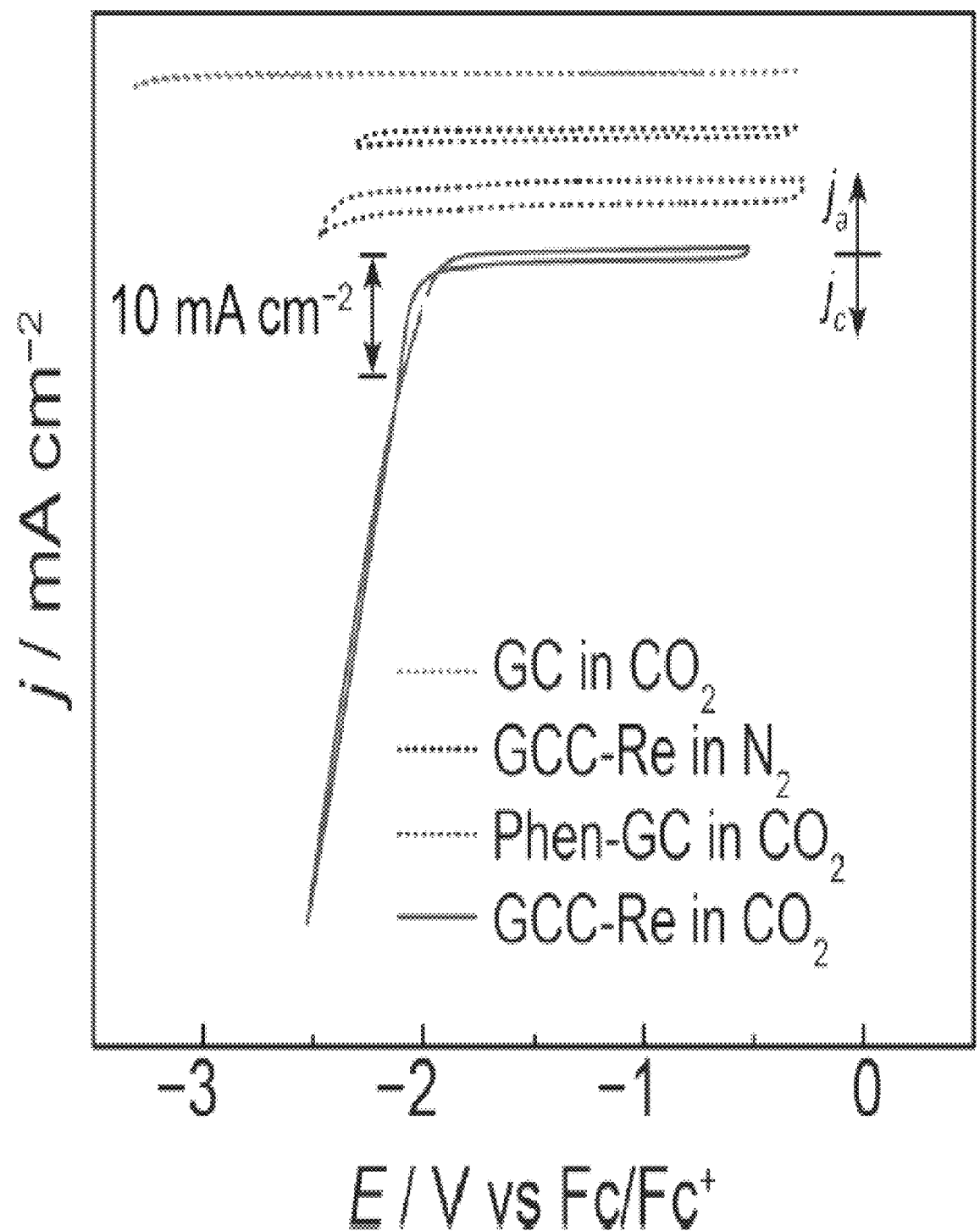
FIG. 26A is a graph depicting representative cyclic voltammograms (5 mV/s scan rate) of unmodified glassy carbon in $CO_2$ (top trace), 9 in $N_2$ (next-to-top trace), 14 in $CO_2$ (next-to-bottom trace), and of 9 in $CO_2$ (bottom trace) recorded in 0.1 M $TBAPF_6$ acetonitrile electrolyte in the absence of $CO_2$.
Figure 26B:
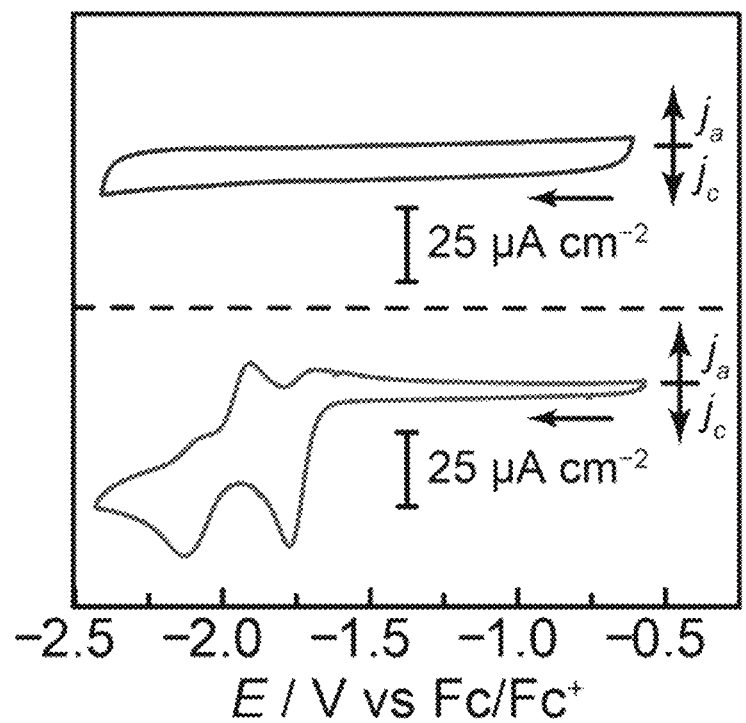
FIG. 26B is a graph depicting representative cyclic voltammograms (5 mV/s scan rate) of 9 (top trace) and of 10 (bottom trace) recorded in acetonitrile 0.1 M $TBAPF_6$ acetonitrile electrolyte in the absence of $CO_2$.

Cyclic Voltammetry and Chronoamperometry of Rhenium-Modified High-Surface Area Carbons Compound 9 catalysts displayed high activity for CO$_2$ reduction to CO. The cyclic voltammogram (CV) of compound 9 recorded in CO$_2$-saturated acetonitrile (MeCN) containing 0.1 M tetrabutylammonium hexafluorophosphate (TBAPF$_6$) electrolyte (FIG. 26A, bottom trace) displayed a large catalytic wave that reached 10 mA cm$^{-2}$ at −2.09 V (all potentials were reported versus the ferrocene/ferrocenium couple and normalized to the geometric surface area of the electrode) corresponding to carbon dioxide reduction catalysis. Both compound 14, which lacks the catalytic Re center, (FIG. 26A, next-to-bottom trace) and unmodified glassy carbon electrodes (FIG. 26A, top trace) did not display carbon dioxide reduction catalysis over the same potential range in $CO_2$-saturated MeCN. Likewise, no catalytic current was observed for compound 9 in the absence of $CO_2$ (FIG. 26A, next-to-top trace). Notably, discrete redox waves corresponding to Re or phen reduction were not observed for compound 9 (FIG. 26B, top trace). For comparison, cyclic voltammograms of compound 10 (FIG. 26B, bottom trace) in the absence of $CO_2$ showed multiple redox features corresponding to reduction of the compound 10.

Compound 9 surface sites remained robust under the conditions of catalysis, but the GC host surface was subject to dynamic change upon initial polarization. The CV scan of compound 9 in FIG. 26A remained unchanged upon subsequent scanning but differed from the initial trace recorded on a freshly prepared compound 9 electrode. The initial CV scan (FIG. 30) displayed a broad cathodic feature spanning from −0.80 to −2.06 V. This feature was also observed for the unmodified oxidized glassy carbon electrode and was attributed to detachment of loosely bound graphitic domains or graphene sheets on the oxidized GC surface. This contention was corroborated by reports of reductive exfoliation of grapheme induced by tetrabutylammonium cation intercalation into graphite. Indeed, XPS spectra recorded following polarization display a new N 1s peak at 402.0 eV, corresponding to tetraalkylammonium ions (FIG. 24, bottom trace). Inductively coupled plasma mass spectrometry (ICP-MS) quantification (Table 7, see Example 23 for experimental details) revealed a decrease in surface Re concentration following the initial CV cycles of a freshly prepared compound 9 electrode, in line with partial detachment of graphitic domains from the surface. However, after this initial loss, Re surface concentrations remained stable during CV cycling.

TABLE 7

Surface Re content of 9 measured by ICP-MS following the described electrode treatments.

| Electrochemical Treatment | Re content (nmol/cm$^2$) |
|---|---|
| None (freshly prepared) | 13 ± 3 |
| Two CV cycles between −0.4 and −2.4 V | 2.1 ± 0.8* |
| Galvanostatic polarization at −1 mA/cm2 for ~1.4 h** | 1.3 ± 0.9 |

*This value was used for turnover frequency (TOF) and turnover number (TON) calculations.
**Polarized until end of region (b) in FIG. 33.

Figure 30:
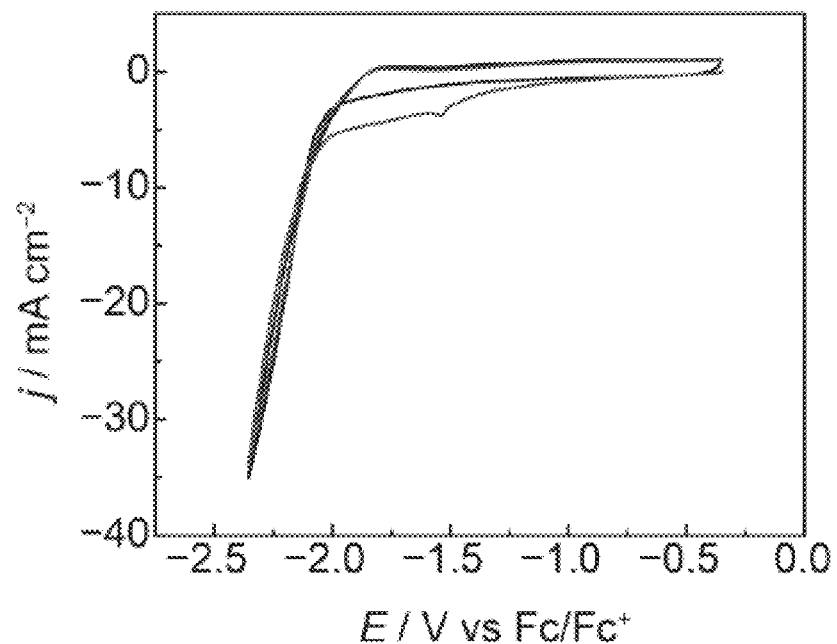
FIG. 30 is a graph depicting cyclic voltammograms (100 mV/s scan rate, no rotation) of 9 recorded in $CO_2$-saturated 0.1 M $TBAPF_6$ acetonitrile electrolyte. The first CV cycle (gray) differs from all subsequent CV cycles (black), indicating irreversible electrode restructuring. The small peak at −1.61 V integrates to 1.2±1.0 $mC/cm^2$, consistent with one electron transferred per Re center on the surface as quantified by ICP-MS of freshly prepared 9 electrodes.

Superimposed on the broad cathodic feature in the initial CV scan is a sharp irreversible wave at −1.61 V that was attributed to reductive cleavage of the Re—Cl bond (FIG. 30). This assignment was also supported by XPS spectra recorded following two CV scans of a freshly prepared compound 9 electrode, which revealed significantly diminished Cl surface concentrations (Table 6) and Re 4f peaks that were shifted positively by 0.3 eV (FIG. 23). The positive shift of the Re 4f peaks was consistent with an exchange of Cl for more electron-withdrawing CO generated during catalysis. Notably, Cl dissociation has been documented for analogous molecular species at similar potentials. However, the Re 4f peaks remained sharp (fwhm=1.45 and 1.27 eV) following CV scans over the catalytic wave, indicating that the Re center was not subject to degradation on the time scale of the measurement. Likewise, no peaks were observed at ~40.3 eV expected for the Re $4f_{7/2}$ peak of $Re^0$, excluding significant formation of metallic Re nanoparticles. Additionally, high-resolution XPS spectra of the N 1s region (FIG. 24) revealed that the pyrazine and phenanthroline peaks at 398.4 and 399.7 eV persisted even after reductive polarization into the catalytic wave. Together, the data suggest that surface bound Re centers remain robust under the conditions of carbon dioxide reduction catalysis.

Cyclic voltammograms (CVs) (FIGS. 26A, 30, 31, 34B, 34C, and 36) and chronoamperograms (FIG. 35) were corrected in situ for uncompensated Ohmic loss ($iR_u$ loss) using positive feedback (PF) correction at the 70-80% level relative to the measured solution resistance value prior to the experiment. Higher levels of compensations led to instabilities in the CV scans. The residual uncompensated resistances ranged between 10 and 30 ohms and would be expected to give rise to maximal Ohmic losses of 0.3 V, causing a sloping shape and underestimation of the cathodic current in the catalytic wave in FIG. 26A.

Example 18

Calculation of Faradaic Efficiency for Graphite-Conjugated Re

Compound 9 is highly selective for $CO_2$ reduction to CO. The gaseous products of carbon dioxide reduction catalysis were analyzed in real-time by in-line gas chromatography. The compound 9 modified electrodes were polarized at constant cathodic current densities of 0.50 and 1.0 mA cm$^{-2}$ in gastight electrochemical cells that were continuously sparged with $CO_2$. CO was the only product detected by gas chromatography and was produced with a Faradaic efficiency (FE) of 96±3%, indicating that compound 9 modified electrodes retain the high selectivity for CO production observed for homogeneous molecular analogs.

Faradaic efficiency (FE) for CO production was determined by applying the equation FE=$j_{CO}/j_{total}$, where $j_{CO}$ is the partial current density from CO production. $j_{CO}$ values were determined from gas chromatography measurements using the relation $$j_{CO} = \frac{FnvCP}{RTS},$$

where F is the Faraday constant, n is the number of electrons necessary for $CO_2$ reduction catalysis (n=2 for $CO_2$ reduction to CO), v is the flow rate, C is the concentration measured from gas chromatography, P is the pressure in the electrochemical cell headspace (1 atm), R is the gas constant, S is the geometric area of the electrode, and Tis the temperature.

Example 19

Tafel Data Collection for Graphite-Conjugated Re

To gain insight into the mechanism of carbon dioxide reduction catalyzed by compound 9, steady-state catalytic activity was examined using galvanostatic measurements. The steady-state currents were normalized to the surface concentration of Re, as determined by ICP-MS (Table 7), to calculate lower limit turnover frequencies (TOFs) expressed in units of CO produced per Re site per second. The Re concentration of compound 9 after two CV cycles (2.1 nmol cm$^{-2}$) was used to provide an upper limit estimate of the surface active site population. The Tafel data (FIG. 27) exhibited linearity over an ~0.6 V range and displayed a Tafel slope for compound 9 of ~150 mV/decade, suggesting that catalysis is gated by a rate-limiting one-electron transfer.

The turnover frequencies of compound 9 were greater than that of the molecular compound 10 catalyst across a wide range of potentials. The CV scans of freely diffusing compound 10 (FIG. 31) display classical S-shaped catalytic waves, which were examined by foot-of-the-wave analysis (see Example 20 for details). The resulting turnover frequency data for the molecular catalyst compound 10 are overlaid with that of compound 9 in FIG. 27. As compound 10 proceeds via an EC mechanism, its catalytic activity scales by 60 mV/decade at potentials more positive than the catalytically relevant $Re^{+1/0}$ redox potential of −2.0 V and is invariant at potentials more negative than −2.0 V. The higher Tafel slope observed for compound 9 suggested that surface conjugation induced a change in mechanism, leading to higher observed activity at the lowest overpotentials and no clear plateau at high overpotentials. The turnover frequenciess observed for compound 9 were lower limit values that might be suppressed due to local depletion of $CO_2$ on the roughened GC surface or transient deactivation of catalytic sites, both of which were explicitly excluded in foot-of-the-wave analysis of molecular electrocatalysts. Together, the data establish that the surface modification method described here was effective for translating the robust activity of Re-based carbon dioxide reduction catalysts to carbon surfaces.

Figure 34A:
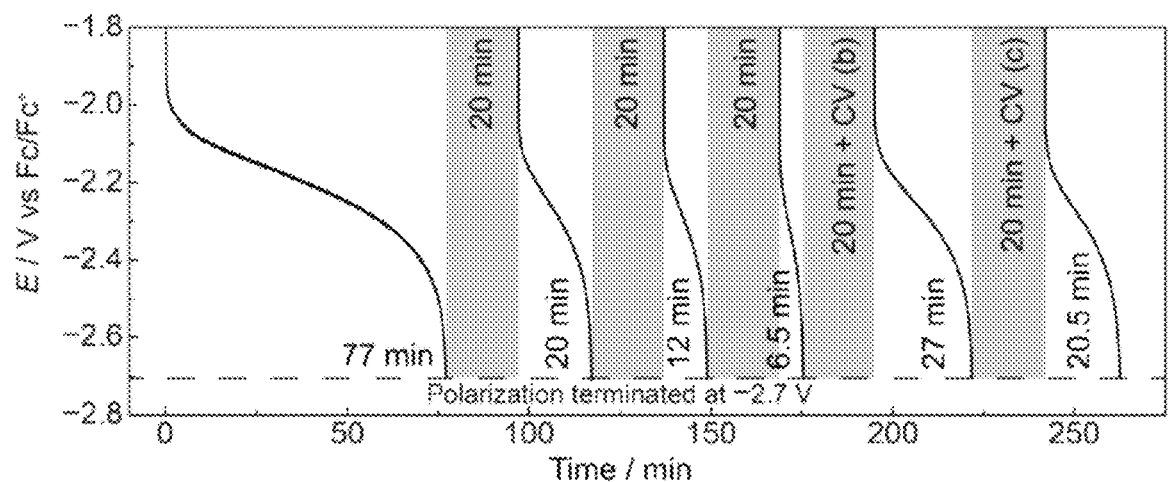
FIG. 34A is a graph depicting multiple galvanostatic polarization traces (no electrode rotation) at −1.0 $mA/cm^2$ of a 9 electrode recorded in $CO_2$-saturated 0.1 M $TBAPF_6$ acetonitrile electrolyte. The polarization was halted when the potential became more negative than −2.7 V. The shaded regions indicate when the sample was not under polarization. The last two traces were taken after CV cycling between −0.2 and −2.1 V.
Figure 34B:
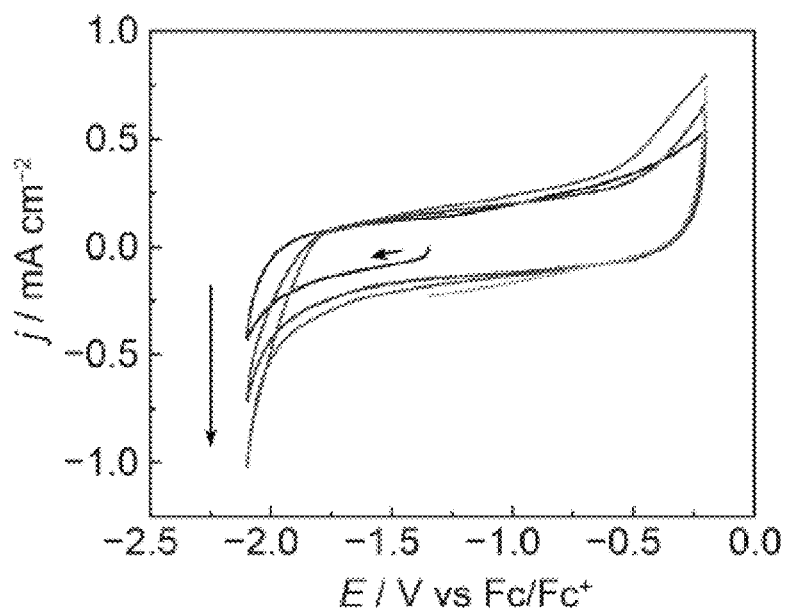
FIG. 34B is a graph depicting cyclic voltammograms (100 mV/s scan rate) measured after four galvanostatic polarization runs (see FIG. 34A).
Figure 34C:
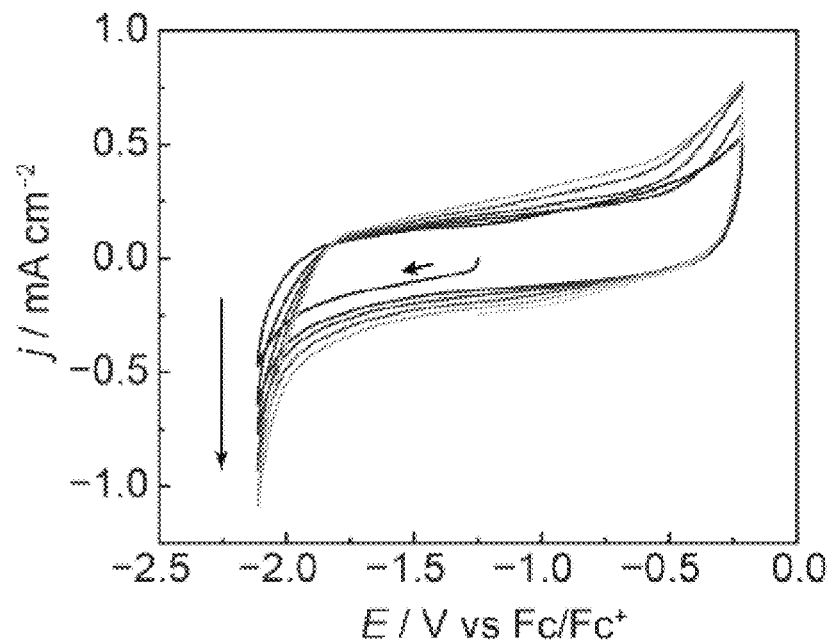
FIG. 34C is a graph depicting cyclic voltammograms (100 mV/s scan rate) measured after five galvanostatic polarization runs (see FIG. 34A).

Controlled current electrolyses of compound 9 (FIG. 33) revealed sustained catalytic activity at 1.0 mA cm$^2$ (corresponding to a turnover frequency of 2.5 s$^{-1}$) for 1.4±0.3 h followed by rapid deactivation. Using the Re concentration on a compound 9 surface after two CV cycles, this corresponded to a lower-limit per Re turnover number (TON) of 12,000. Similar turnover numbers were observed for constant potential electrolyses (FIG. 35). Re XPS spectra recorded following 1.4 h electrolyses indicate negligible change in Re 4f peak positions or widths (FIG. 23), suggesting that the Re centers retain their structure and valency (without implying a particular mechanism of deactivation). CV cycling compound 9 between −0.2 and −2.1 V following 2 h of galvanostatic polarization recovered significant catalytic activity (FIG. 34A), suggesting that electrode deactivation may be due to the formation of a passivating film on the electrode, which is removed upon polarization at anodic potentials. However, this data does not imply a particular mechanism of deactivation.

Figure 27:
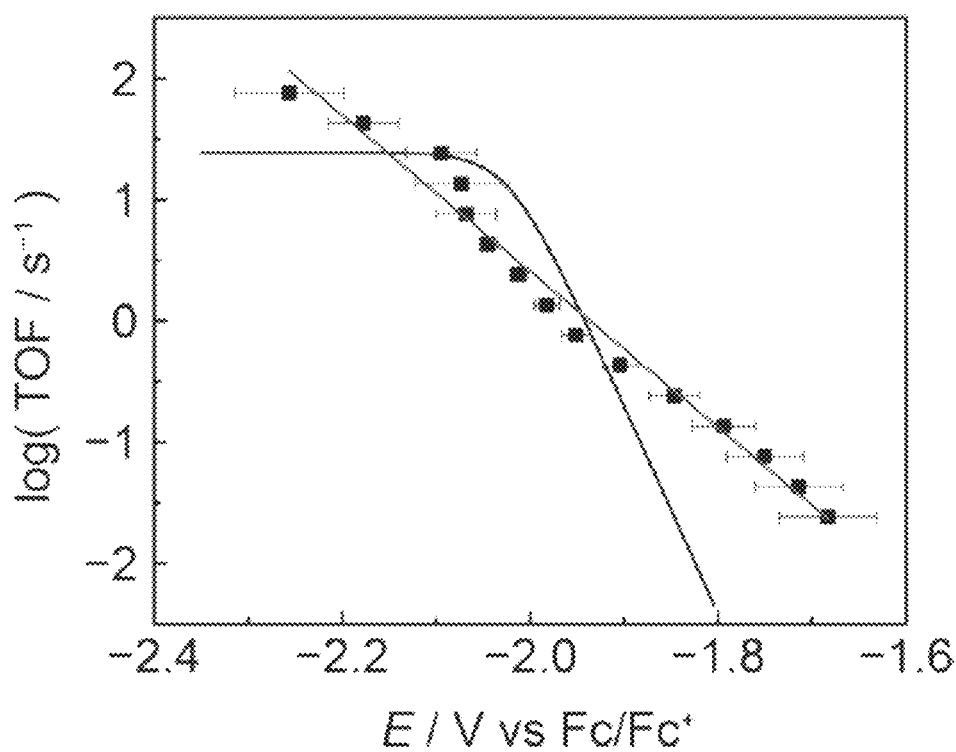
FIG. 27 is a graph depicting Tafel plots of turnover frequency versus potential for $CO_2$ reduction catalysis by 9 (squares) and 10 (solid line). Data for 9 are the average and standard deviation of four independently prepared electrodes. The slope of a linear fit to the Tafel data (red line) is 150 mV/decade.

Tafel plots were obtained via galvanostatic measurements on graphite-conjugated rhenium (compound 9) catalysts in $CO_2$-saturated 0.1 M TBAPF$_6$ electrolyte. In each run, the potential necessary to sustain a specified current after 5 s of polarization was measured. The applied currents were decremented from 31 to 0.01 mA/cm$^2$ in log-wise equally spaced increments. Data were collected in succession for each current step without intervening pause. Tafel data that was instead collected with incremented current steps were the same at modest to high currents (>0.1 mA/cm$^2$) but skewed to higher values at the lowest current, presumably due to sluggish electrode charging. Data were manually corrected for iR$_u$ losses after the experiment by adjusting the potential using the following equation: $E_{corrected} = E_{measured} - iR_u$, where i is the applied current (not current density) in the galvanostatic measurement. For this correction, R$_u$ values were measured using the R$_u$ test function prior and following Tafel data collection and were constant over the course of the measurement. The Tafel plots were then normalized for the number of Re surface sites as measured by ICP-MS (Example 23 and Table 7) to generate per site turnover frequency values shown in FIG. 27 as black squares. The data in FIG. 27 are the average and standard deviation of four independently prepared electrodes.

Example 20

Calculation of Turnover Frequency for Graphite-Conjugated Re

To provide a fair comparison between molecular and heterogeneous catalysts on a per site turnover frequency basis, foot-of-the-wave analysis was performed on fac-Re (1,10-phenanthroline)(CO)$_3$Cl (Re(phen)(CO)$_3$Cl, compound 10) using the method described by Constentin and Savéant (Costentin, C.; Savéant, J.-M. *ChemElectroChem* 2014, 1, 1226). The current-potential relationship of a molecular catalyst depends on its reaction mechanism. The mechanisms that have been put forward for electrochemical carbon dioxide reduction catalyzed by Re polypyridyl complexes generally involve a catalyst resting state that undergoes a reversible one-electron transfer followed by a rate-limiting chemical step. With this mechanistic information, foot-of-the-wave analysis was performed under the assumptions that carbon dioxide reduction proceeds through either an ECEC or ECCE mechanism in which both electrons are transferred from the electrode and that there is no significant dimerization of the catalyst. Conveniently, both mechanisms yield the same equation for catalytic current.

The turnover frequency (TOF) for a molecular electrocatalyst that proceed via rate limiting chemistry following reversible one-electron transfer is described by:

$$TOF = \frac{k_{obs}}{1 + \exp\left[\frac{F}{RT}(E - E_{1/2}^0)\right]}$$

Where k$_{obs}$ is defined as the apparent rate constant of the rate-limiting chemical step. Since the molecularity of this rate-limiting step is not known, the observed rate constant was explicitly calculated under the conditions of catalysis, which are the same for the molecular and surface species. In this expression, F is Faraday's constant, R is the gas constant, T is temperature, E is the applied potential, and $E_{1/2}^0$ is the potential at which the catalytic current is half of the plateau current. Under the mechanistic assumptions outlined above, this $E_{1/2}^0$ corresponds to the reduction potential of the operative catalytic resting state species undergoing reversible one-electron transfer. The catalytic waves observed for compound 10 display a classical S-shaped form, allowing for direct measurement of $E_{1/2}^0$.

The maximum TOF, k$_{obs}$, was determined by measuring CVs of the molecular compound and plotting the relationship:

$$\frac{i}{i_p^0} = \frac{4.48\sqrt{\frac{RT}{Fv}k_{obs}}}{1 + \exp\left[\frac{F}{RT}(E - E_{1/2}^0)\right]}$$

Which was derived using the following relations:

$$i = \frac{i_{pl}}{1 + \exp\left[\frac{F}{RT}(E - E_{1/2}^0)\right]}$$

Figure 31:
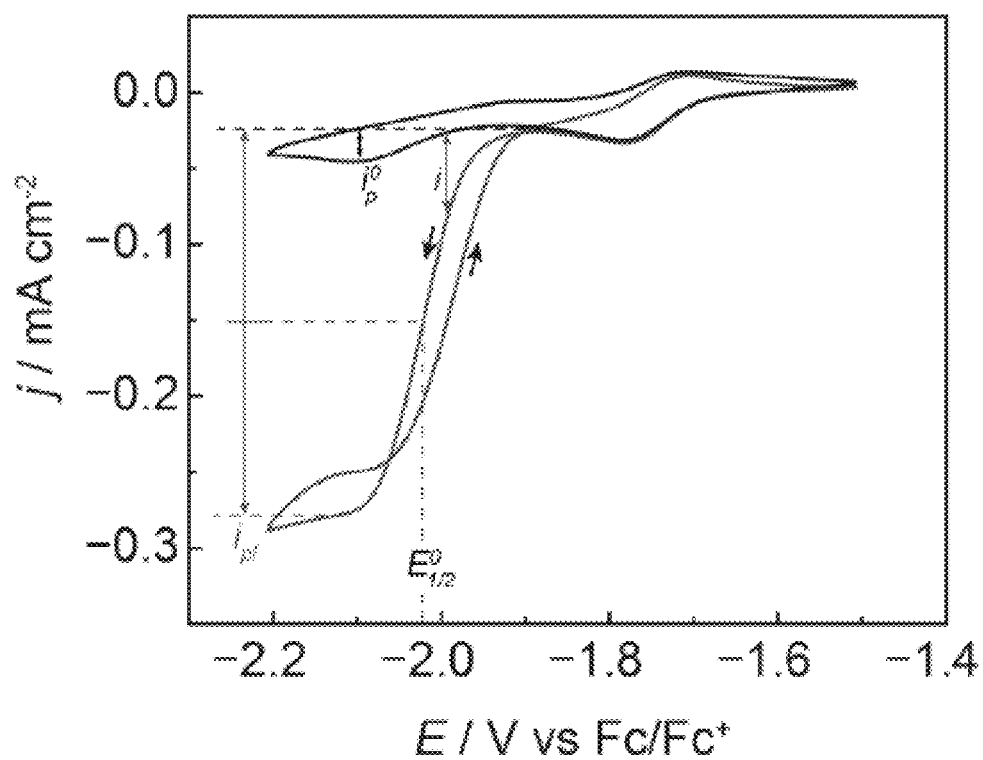
FIG. 31 is a graph depicting cyclic voltammograms (100 mV/s scan rate, no rotation) of 0.5 mM 10 in $N_2$- (black) and $CO_2$-saturated (gray) 0.1 M $TBAPF_6$ acetonitrile electrolyte. Diagnostic values of $i_p^0$, i, and $E_{1/2}^0$ used for foot-of-the-wave analysis are indicated on the plot. The current measured right before the onset of second reduction wave was used as the baseline (black dashed line) for peak ($i_p^0$) and catalytic (i) currents. $E_{1/2}^0$ is the potential at which the catalytic current is half of the plateau current ($i_{pl}$) (gray dashed line).

-continued $$i_{pl} = 2FSC_{cat}^0 \sqrt{D_{cat}} \sqrt{k_{obs}}$$

$$i_p^0 = 0.446FSC_{cat}^0 \sqrt{\frac{FvD_{cat}}{RT}}$$

Where i is the catalytic current, $i_{pl}$ is the plateau current of the catalytic wave, S is the surface area of the electrode, $C_{cat}^0$ is the bulk concentration of the catalyst, $D_{cat}$ is the diffusion constant of the catalyst, $i_p^0$ is the peak current of the reduction wave of the catalyst in the absence of $CO_2$, and v is the scan rate (FIG. 31). The plot of $$\frac{i}{i_p^0} \text{ vs } 1 + \exp\left[\frac{F}{RT}(E - E_{1/2}^0)\right]$$

Figure 32:
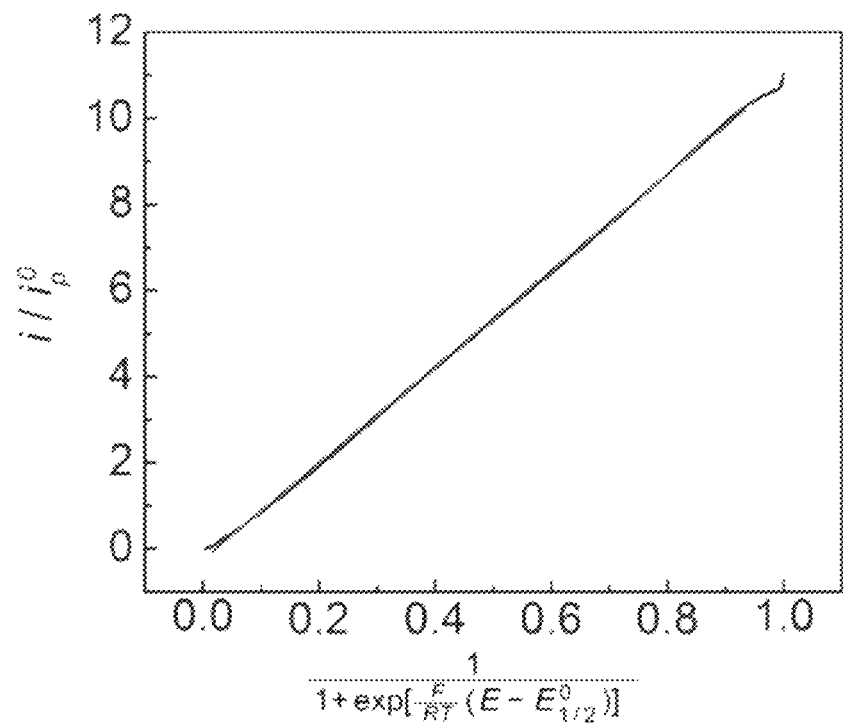
FIG. 32 is a graph depicting foot-of-the wave analysis for 10 showing measured data (black line) and linear fit (gray line).

(FIG. 32) displays excellent linearity throughout the catalytic wave, validating the applicability of this model. This linear fit yields a slope equal to $$4.48\sqrt{\frac{RT}{Fv}k_{obs}},$$

which is used to calculate the value of $k_{obs}$. Using the TOF equation above, this $k_{obs}$ value was used to calculate a Tafel plot for the molecular catalyst compound 10 that is overlaid with the Tafel plot of compound 9 in FIG. 27.

Example 21

Gas Chromatography for Graphite-Conjugated Re

Product formation was monitored in real time using an in-line gas chromatograph (SRI Instruments, Multi-Gas Analyzer #3) equipped with Molsieve and Hayesep D Columns as well as a thermal conductivity detector, methanizer, and flame ionization detector (FID). Alicat (MC Standard Series) mass flow controllers were used to maintain a constant 10 sccm flow of CO2 in the electrolysis cell during the measurement. This CO2 carrier stream carried evolved CO from the electrolysis cell to the in-line gas chromatograph, where it was sampled every 15 minutes. CO was detected as methane by the FID and the detector response was converted to a CO concentration using an external calibration curve.

Example 22

X-Ray Photoelectron Spectroscopy for Graphite-Conjugated Re

X-ray photoelectron spectra were recorded for glassy carbon electrodes following various chemical and electrochemical treatments. Freshly prepared electrodes were measured with no further treatment beyond their usual preparation described in Section 2.7 below. Electrodes subjected to cathodic polarization were washed with MeCN and ethanol to remove residual adsorbed electrolyte from the surface. Samples were attached to the sample stage with conducting carbon tape. Spectra were collected using a Physical Electronics PHI Versaprobe II with a hemispherical energy analyzer and a monochromatic aluminum $K_\alpha$ X-ray source (1486.6 eV). Data were collected using a 200 μm, 50 W focused X-ray beam at a base pressure of $5\times10^{-9}$ torr, and a take-off angle of 45°. Survey scans were collected with a pass energy of 187.85 eV and a step size of 0.8 eV. High-resolution scans of peaks of interest were collected with a pass energy of 23.50 eV and a step size of 0.1 eV. Data were analyzed with CASA XPS software. All peaks were referenced to the 1s graphitic carbon peak (284.3 eV) in glassy carbon. Peak fittings were performed with a Shirley-type background and Gaussian/Lorentzian line-shapes with 30% Gaussian shape. Spectra were smoothed using a 5-point quadratic Savitzky-Golay method.

Example 23

Inductively Coupled Plasma Mass Spectrometry for Graphite-Conjugated Re

Inductively coupled plasma mass spectra (ICP-MS) were collected using an Agilent 7900 ICP-MS and were used to determine the amount of Re on the compound 9 surface. Raw count data were converted to concentrations using a calibration curve generated from aqueous 2% nitric acid solutions containing known concentrations of Re. The calibration solution series was prepared by dilution of a 1000 ppm Re standard solution. Compound 9 functionalized glassy carbon electrodes were digested with 100 μL of concentrated nitric acid (EMD Millipore, OmniTrace Ultra) for 10 min and diluted to a final volume of 5 mL by addition of Millipore water. glassy carbon electrodes remained in Teflon RDE holders during digestion to ensure that only the electrochemically relevant surface was analyzed (rather than the sides or back of the GC disk insert). The concentration of the resulting solution was measured and converted to a Re concentration present on the electrochemically active surface. Subsequent acid digestions of the same electrode yielded less that 10% residual Re relative to the first digestion, indicating the efficacy of this procedure for liberating Re from the surface.

Example 24

X-Ray Absorption Spectroscopy for Graphite-Conjugated Re

X-ray absorption measurements of high surface area compound 9-Monarch samples (see Example 25 for preparation details) were conducted at the Re L3-edge (10.535 keV) on the bending magnet beam line of the Materials Research Collaborative Access Team (MRCAT) at the Advanced Photon Source, Argonne National Laboratory. The data were collected in transmission step scan mode. The ionization chambers were optimized for the maximum current with linear response (~1010 photons detected/sec) with 10% absorption (95% $N_2$-5% Ar) in the incident ion chamber and 70% absorption (30% $N_2$ and 70% Ar) in the transmission and reference X-ray detectors. The monochromator was aligned to $Re_2O_7$ (10.5403 keV).

Samples were pressed into a cylindrical sample holder consisting of six wells, forming a self-supporting wafer which was then placed in a quartz tube (1 in. OD, 10 in. length) and sealed with Kapton windows using two Ultra-Torr fittings. All spectra were obtained at room temperature in air. Because of the large whiteline of the Re samples, the samples were prepared at two loadings. For the X-ray absorption near edge structure (XANES) spectra (FIG. 28), the lower sample loading was chosen since it gave an absorbance in the white line region of less than 2. The higher sample loading was used for the extended X-ray absorption fine structure (EXAFS) region, where it produced an absorbance of ~0.8. EXAFS and XANES data were processed using Athena software. The R-space EXAFS plots were obtained by a k$^2$-weighted Fourier transform of the data from 2.6 to 11.9 Å$^{-1}$ and produced the spectra shown in FIG. 25.

Example 25

Synthesis and Characterization of Molecular Precursors and Model Compounds for Graphite-Conjugated Re General Characterization Methods:

Elemental analyses and inductively coupled plasma optical emission spectrometry were per-formed by Robertson Microlit Laboratories. NMR spectra were obtained on Bruker Avance III 400, Bruker Avance 400, or Bruker Avance 600 instruments. NMR peaks were referenced to the residual proteo-solvent signal. Attenuated total reflectance infrared (ATR-IR) spectra were collected using a Thermo Scientific Nicolet 6700 FT-IR Spectrometer and were recorded using a Ge crystal at 4 cm$^{-1}$ resolution.

reaction was quenched over ice such that the total volume of liquid after quenching was 500 mL. The solution was neutralized with sodium carbonate and extracted into chloroform. The chloroform solution was dried over MgSO$_4$ and filtered. The solvent was removed from the filtrate in vacuo, and the resulting crude product was recrystallized in ethanol to furnish compound 44 as a yellow solid in 47% yield. The purity of the product was verified via $^1$H-NMR.

$^1$H-NMR (400 MHz, DMSO-d$_6$) δ (ppm): 8.99 (dd, 2H), 8.39 (dd, 2H), 7.67 (dd, 2H).

Synthesis of 1,10-Phenanthroline-5,6-dioxime (Compound 45)

1,10-Phenanthroline-5,6-dioxime was synthesized following a literature procedure (Kleineweischede, A.; Mattay, J. *European J. Org. Chem.* 2006, 947). Both compound 44 synthesized from the preparation above and purchased from commercial sources were used for this synthesis, without any significant difference in final product yield or purity. Both compound 44 (770 mg, 3.66 mmol, 1 eq) and sodium carbonate (582 mg, 5.49 mmol, 1.5 eq) were added to ethanol (25 mL) and heated to reflux. Hydroxylamine hydrochloride (890 mg, 12.81 mmol, 3.5 eq) dissolved in ethanol

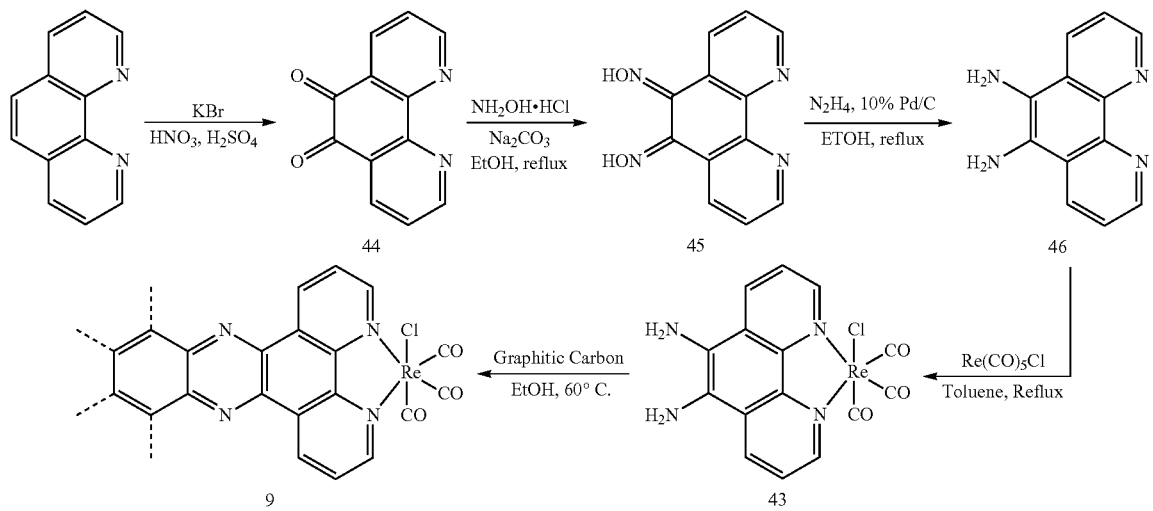

Scheme 3.

Synthetic scheme for fac-Re(5,6-diamino-1,10-phenanthroline)(CO)$_3$Cl.
The synthesis of 5,6-diamino-1,10-phenanthroline is based on the method described by Bodige and MacDonnell (Bodige, S.; MacDonnell, F.M. *Tetrahedron Lett.* 1997, 38, 8159). However, several modifications to the procedure were neces-sary to achieve satisfactory yields.

Synthesis of 1,10-Phenanthroline-5,6-dione (Compound 44)

1,10-Phenanthroline-5,6-dione was synthesized following a literature procedure (Calderazzo, F.; Marchetti, F.; Pampaloni, G.; Passarelli, V. *J. Chem. Soc., Dalt. Trans.* 1999, 4389). Briefly, concentrated sulfuric acid (82 mL) was cooled with liquid nitrogen, to which a mixture of 1,10-phenanthroline (3.65 g, 20.3 mmol, 1 eq) and potassium bromide (24.85 g, 209 mmol, 10 eq) were added. The mixture was allowed to warm to RT in air and was then submerged in a water bath. Concentrated nitric acid (45 mL) was then added dropwise to the solution after which the reaction mixture was refluxed at 90° C. After 3 h, the bromine evolved from the reaction was boiled off, and the (45 mL) was added dropwise to the hot solution, and the reaction mixture was refluxed for 5 h. The mixture was then cooled and decanted into a new flask to minimize collection of the black solid that had formed at the bottom of the reaction flask. The solvent was removed in vacuo, and the resulting solid was washed successively with 20 mL each of water and THF and dried in vacuo at 50° C. overnight. Yields ranged between 60-85%. The resulting product, a light-yellow solid, was used in subsequent synthetic steps without further purification.

Synthesis of 5,6-diamino-1,10-phenanthroline (Compound 46)

The following preparation was adapted from the method described by Bodige and MacDonnell (Bodige, S.; Mac- Donnell, F. M. *Tetrahedron Lett.* 1997, 38, 8159). The reaction and workup steps were performed air-free using standard Schlenk technique or by carrying out manipulations in a $N_2$-filled glovebox. A slurry of 1,10-phenanthroline-5,6-dioxime (384 mg, 1.60 mmol), Pd/C (228 mg), and ethanol (60 mL) was purged with $N_2$, then heated to reflux. A mixture of 15 mL ethanol and 2.16 mL hydrazine was added dropwise over 1.5 h, and the reaction mixture was subsequently refluxed overnight. The hot mixture was then filtered through a bed of celite, which was then washed 3 times with 7 mL each of boiling ethanol. The solvent was removed from the filtrate in vacuo, and the resulting solid was triturated with water and left to sit overnight at 4° C. The mixture was then filtered, washed with additional water, dichloromethane and hexane, and dried in vacuo to furnish the brown product in 70% yield.

$^1$H-NMR (400 MHz, DMSO-$d_6$) δ (ppm): 8.78 (dd, 2H), 8.48 (dd, 2H), 7.62 (dd, 2H), 5.22 (s, 4H).

Synthesis of fac-Re(5,6-diamino-1,10-phenanthroline)(CO)$_3$Cl (Compound 30)

The reaction and workup steps were performed air-free using standard Schlenk technique or by carrying out manipulations in a $N_2$-filled glovebox. Compound 46 (43 mg, 0.2045 mmol, 1 eq) and Re(CO)$_5$Cl (74 mg, 0.2045 mmol, 1 eq) were suspended in 30 mL of toluene. The mixture was refluxed for 18 h and then cooled to RT followed by further cooling in an 8° C. fridge for 30 min. The precipitate was isolated via filtration and washed with hexane to obtain analytically pure product in 88% yield.

$^1$H-NMR (400 MHz, DMSO-$d_6$) δ (ppm): 9.07 (dd, 2H), 8.90 (dd, 2H), 7.91 (dd, 2H), 5.82 (s, 4H).

$^{13}$C-NMR (150.9 MHz, DMSO-$d_6$) δ (ppm): 198.15, 190.39, 148.49, 140.17, 132.02, 124.81, 123.90, 123.57.

ATR-IR (cm$^{-1}$): 3460(w), 3412(w), 3363(w), 3298(w), 2020(s), 1930(s), 1895(s), 1664(m), 1617(m), 1589(m), 1489(m), 1436(m)

Anal. Calcd for $C_{15}H_{10}N_4O_3ReCl$: C, 34.92; H, 1.95; N, 10.86. Found: C, 35.05; H, 1.82; N, 10.25.

Synthesis of fac-Re(1,10-phenanthroline)(CO)$_3$Cl (Compound 10)

Re(CO)$_5$Cl (200 mg, 0.55 mmol, 1 eq) was dissolved in boiling toluene (30 mL), and 1,10-phenanthroline (100 mg, 0.55 mmol, 1 eq) was added to the mixture. Upon addition of 1,10-phenanthroline, the color of the solution immediately changed from colorless to yellow. The reaction mixture was refluxed for 1 h, cooled to RT and placed in a −30° C. freezer for 1 h. The reaction mixture was filtered to obtain the desired product in 49% yield.

$^1$H-NMR (400 MHz, CD$_3$CN) δ (ppm): 9.39 (dd, 2H), 8.77 (dd, 2H), 8.18 (s, 2H), 7.97 (dd, 2H).

Anal. Calcd for $C_{15}H_8N_2O_3ReCl$: C, 37.08; H, 1.66; N, 5.77. Found: C, 37.08; H, 1.59; N, 5.71.

Preparation of Rhenium Functionalized Glassy Carbon (Compound 9)

Under an inert atmosphere, polished glassy carbon electrodes were oxidized by polarizing at +3.5 V vs RHE in a 0.1 M $H_2SO_4$ solution for 10 s. Oxidized glassy carbon electrodes were then immersed in a mixture of compound 43 (5 mg) and ethanol (10 mL) and heated at 60° C. for 12 h. The electrodes were then removed from the reaction medium, rinsed with ethanol, and placed in 10 mL of 0.1 M HCl for 1 h. The electrodes were then removed, rinsed with copious amounts of water and ethanol, and dried in vacuo.

Preparation of Rhenium Functionalized Monarch Carbon Powder (Compound 9-Monarch)

Under an inert nitrogen atmosphere, CABOT Monarch 1300 Carbon Black (100 mg) was combined with 1 (10 mg) and ethanol (15 mL) and heated at 60° C. for 12 h. The mixture was filtered and rinsed with ethanol. The carbon powder was collected and stirred in 10 mL of aqueous 0.1 M HCl for 3 h. The aqueous mixture was then filtered and washed with 30 mL of water and 30 mL of ethanol. The isolated carbon powder was further washed with hot ethanol in a Soxhlet extractor until no color was observed in the extraction tube. The modified carbon powder was collected and dried in vacuo.

Anal. Found: C, 88.01; H, 0.93; N, 0.87; Re, 1.77.

Synthesis of Ferrocenyl 4-ethynylbenzene-1,2-diamine (Compound 39)

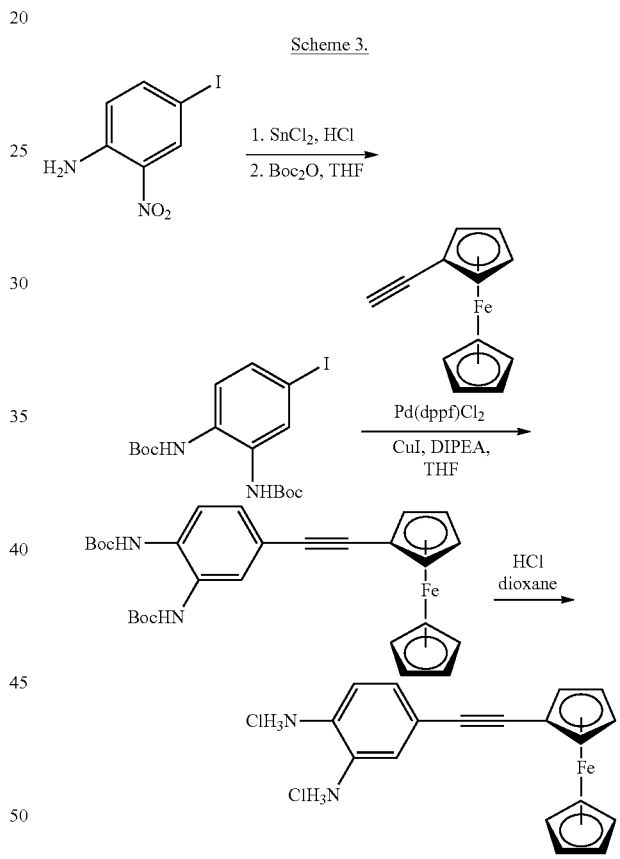

Synthetic scheme for ferrocenyl 4-ethynylbenzene-1,2-diamine (Compound 39).

The reduction and Boc protection steps are taken from Shao, F.; Elias, B.; Lu, W. and Barton, J. K. Inorganic Chemistry, 2007, 46, 10187.

Synthesis of ferrocenyl di-tert-butyl (4-ethynyl-1,2-phenylene)dicarbamate

Di-tert-butyl (4-iodo-1,2-phenylene)dicarbamate (370 mg, 0.85 mmol), [1,1'-Bis(diphenylphosphino)ferrocene] palladium(II) dichloride (Pd(dppf)Cl$_2$, 15 mg, 0.05 mmol) and copper(I) iodide (5 mg, 0.025 mmol) were dissolved in dry THF (10 mL) and N,N-Diisopropylethylamine (DIPEA, 1 mL) was added. Ethynylferrocene (260 mg, 1.275 mmol)

was dissolved in 10 mL of dry THF and added dropwise over 20 mins by syringe. The mixture was stirred for 3 days and then subjected directly to column chromatography (7-25% EtOAc/hexanes). The product was obtained as an orange powder (372 mg, 85%).

$^1$H NMR (500 MHz, CDCl$_3$, rotamers) $\delta_H$ 7-59-7.50 (m, 1H), 7.50-7.31 (m, 1H), 7.20-6.91 (m, 1H), 6.49-6.24 (m, 2H), 4.44 (apparent s, 2H), 4.22 (apparent s, 7H), 1.50-1.39 (m, 18H).

Ferrocenyl 4-ethynylbenzene-1,2-diamine dihydrochloride (Compound 39)

Ferrocenyl di-tert-butyl (4-ethynyl-1,2-phenylene)dicarbamate (372 mg, 0.72 mmol) was dissolved in a 4 M solution of hydrogen chloride in dioxane (3 mL) and stirred for 14 h. Toluene (3 mL) was added and the solvents were removed in vacuo. A brown powder (237 mg, 85%) was obtained.

$^1$H NMR (500 MHz, MeOD) $\delta_H$ 7.23 (s, 1H), 7.42 (d, J=5.0 Hz, 1H), 7.08 (d, J=5.0 Hz, 1H), 6.75 (s, 0.85 Hz), 4.54 (apparent s, 2H), 4.25 (apparent s, 2H), 4.10 (apparent s, 5H).

LCMS (8 min, AHALO column retention time=6.0 minutes, m/z=352.1 (M+2HCl)$^+$

Example 26

O$_2$ Adsorption

PO$_2$ Dependence.

PO$_2$ experiments were conducted using a Gamry REF 600 potentiostat and an Aalborg DMFC programmable mass flow controller. PO$_2$ was controlled by changing the relative flow rates of O$_2$ and Ar and maintaining the total flow rate at 50 sccm. Potentiostatic analysis was performed in order to measure a catalytic current density at a given potential for each PO$_2$. Data was collected on a rotating disk electrode at 2000 rpm. Potentials were corrected for the uncompensated ohmic loss (iRu) in situ by positive feedback. Ru was measured using the Ru test function in the Model 270/250 Research Electrochemistry Software 4.11. Electrolyte was 0.1 M NaOH for pH 13, adjusted to lower pH using aqueous HClO$_4$ solutions (1 M and 0.1 M).

pH Dependence.

pH dependence measurements were conducted in O$_2$-saturated 1 M

NaClO$_4$ pH adjusted with HClO$_4$ (0.1 M or 1 M) and NaOH (0.1 M or 1 M). An unbuffered solution was chosen as the system appeared to be convoluted by a dependence on [Na$^r$] and [K$^r$]. Galvanostatic analysis was performed in order to measure a potential with a given current for each pH. Data was collected on a rotating disk electrode at 2000 rpm. Potentials reached steady state within 1 minute, and end point potential was taken as steady state value.

Example 27

Cyclic Voltammetry of Ruthenium-Modified Graphite

The cyclic voltammograms reflected an absence of surface redox features for compound 11 (FIG. 39A, top trace) with and for compound 12 (FIG. 39A, bottom trace) without bond formation to graphite in aprotic media (acetonitrile electrolyte with 0.1 M TBAPF$_6$). These data supported that a metal redox reaction, including an outer-sphere electron transfer, was absent even when a metal complex was conjugation to a graphite surface. An electronic coupling between the metal center and the electrode may be occurring.

Example 28

X-Ray Absorption Spectroscopy for Graphite-Conjugated Ru

Conjugated Ru(II) compound 11 showed no change in oxidation state upon anodic polarization by XANES (FIG. 39B). In situ X-ray absorbance spectroscopy (Ru K-edge XANES) was used to probe changes in the Ru oxidation state with applied potential in acetonitrile electrolyte with 0.1 M TBAPF$_6$. In contrast to an aliphatically tethered Ru(II), compound 11 was not oxidized from Ru(II) to Ru(III) 450 mV past the Ru(III/II) potential measured by CV, suggesting electronic communication between the Ru center and the band structure of the graphite electrode.

X-ray absorption measurements of high surface area samples of compound 12 were conducted at the Ru K-edge (22.117 keV) on the bending magnet beam line of the Materials Research Collaborative Access Team (MRCAT) at the Advanced Photon Source, Argonne National Laboratory. The data were collected in transmission step scan mode. The ionization chambers were optimized for the maximum current with linear response (~1010 photons detected/sec) with 10% absorption (95% N$_2$-5% Ar) in the incident ion chamber and 70% absorption (30% N$_2$ and 70% Ar) in the transmission and reference X-ray detectors. The monochromator was aligned to Ru (22.117 keV).

Example 29

X-Ray Absorption Spectroscopy for Other Graphite Conjugates

Graphite-conjugated metal complexes were treated with various compounds to effect a change in the oxidation state and coordination of the metal complexes. XANES studies revealed that there was no change in the oxidation state of 15, 16 (FIG. 48), 17 (FIG. 40), and 20 (FIG. 45), after the various treatments, which included pinacolborane (HBPin), tert-butylisocyanide (tBuNC), sodium formate, chlorine gas (Cl$_2$), and silver tetrafluoroborate (AgBF$_4$). However, significant changes in the XANES edge were found for 19 (FIG. 43) upon exposure to AgBF$_4$ or tBuNC.

The effects of various treatments on the coordination of certain graphite-conjugated metal complexes were investigated using EXAFS. For example, HBPin has an effect on the coordination of the Ir complex 17 (FIG. 41), and formate has an effect on the coordination of 18 (FIG. 42). tBuNC has an effect on the coordination of 19 (FIG. 44). Upon Cl$_2$ addition, no change in coordination of 15 was observed (FIG. 47).

Example 30

Differential Pulse Voltammetry for Crown Ether Complexes

Crown ether-functionalized electrodes display a redox feature that is sensitive to solution metal ion concentrations. Using differential pulse voltammetry, the potential of this feature was found to shift reversibly with increasing metal ion concentration. This family of studies focused on M=$Pb^{2+}$.

Graphite foils (Alfa Aesar, 99.8% metals basis, 0.13 mm thick) were electrochemically oxidized at +2.50 V vs. RHE for 20 seconds in 0.1 M $H_2SO_4$. Following a rinse in Milli-Q water and ethanol, they were functionalized using compound 42 at 60 C in ethanol for 12 hours. The electrodes were rinsed 6× with ethanol and 6× with Milli-Q water and soaked in 0.1 M $HClO_4$ for one hour, thus yielding compound 24.

Standard three-electrode voltammetry was conducted with the above-mentioned electrode as the working electrode, Pt mesh as the counter-electrode in a fritted compartment, and $Hg/Hg_2SO_4$ as the reference electrode. A solution of 0.1 M $Et_4NCl$ in water was prepared and pH was adjusted using $HClO_4$. A stock solution of $Pb(ClO_4)_2$ was prepared and dosed in to the main electrolyte solution in order to vary the concentration of $Pb^{2+}$ ions. At each concentration, a differential pulse voltammogram (10 mV pulse for 50 ms; −1 mV step every 500 ms) was taken in order to ascertain the potential of the redox feature. Compound 24 displayed reversible pyrazine potential shifts when M is $Pb^{2+}$ in pH 4 $Et_4NCl$ (FIG. 50). Compound 24 also showed reversible pyrazine potential shifts when M is $Pb^{2+}$ in pH 4 $Et_4NOAc$ (FIG. 51).

The same experiment was conducted using NaCl or KCl as the metal salt instead of $Pb(ClO_4)_2$. Compound 24 also displayed limited response to Na+ ions (squares) and K+ ions (circles) in pH 4 $Et_4NCl$ based on potential shift measurements (FIG. 52). Compound 23 (prepared analogously to compound 24, but using precursor compound 41 instead of 42) also showed a three-fold smaller reversible pyrazine potential shift when M is $Pb^{2+}$ in pH 4 $Et_4NOAc$ (FIG. 53). When molecular phenazine compound 7 was added to solution and the working electrode replaced by a native, unmodified graphite foil, the redox feature also showed a 50 mV potential shift when M is $Pb^{2+}$ and with increasing concentrations of $Pb^{2+}$ in 0.1 M $Et_4NCl$, pH 2 (FIG. 54).

In a separate experiment, the concentration of $Et_4NCl$ electrolyte in water was varied from 0.1 M to 1 M, and pH was adjusted to 2.0 using HCl. No metal ions were added to solution. Compound 24 displayed potential shifts with increasing electrolyte strength in pH 2 $Et_4NCl$ (FIG. 55). The slope of a linear fit to the data was 80±4 mV $dec^{-1}$. A similar relationship was also observed with molecular phenazine compound 7 (FIGS. 56A and 56B). Oxidized 24 (FIG. 58A) was compared to soluble quinoxaline (FIG. 58B), which modeled the oxidized 24. The potential shifts may have been caused by an anion effect. Under some conditions, introducing 2 M $NaClO_4$ can eliminate the potential shift from oxidized 24 (circles) and from soluble quinoxaline (squares) (FIGS. 59A and 59B).

Differential pulse voltammetry (DPV) is a method based on square-wave voltammetry that minimizes the effects of charging current by measuring just before changing the potential. The current is sampled at times just before the pulse and at the end of the pulse. Typical values include: T=0.5-5 s (for the time between pulses); $t_p$=50 ms (for the length of the pulse). Since $t_p \ll T$, current traces $I_1$ and $I_2$ would be nearly identical if $\Delta E_p$=0. Therefore, $I_2-I_1$ represents the current due to application of the pulse. $\Delta E_p$ represents the difference in potential with the pulse. The detection limit is $10^{-7}$M.

INCORPORATION BY REFERENCE

All U.S. patents and U.S. and PCT published patent applications mentioned in the description above are incorporated by reference herein in their entirety.

EQUIVALENTS

Having now fully described the present invention in some detail by way of illustration and example for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

We claim:

1. A composition, comprising graphene, and one or more substituents represented by a Formula selected from the group consisting of

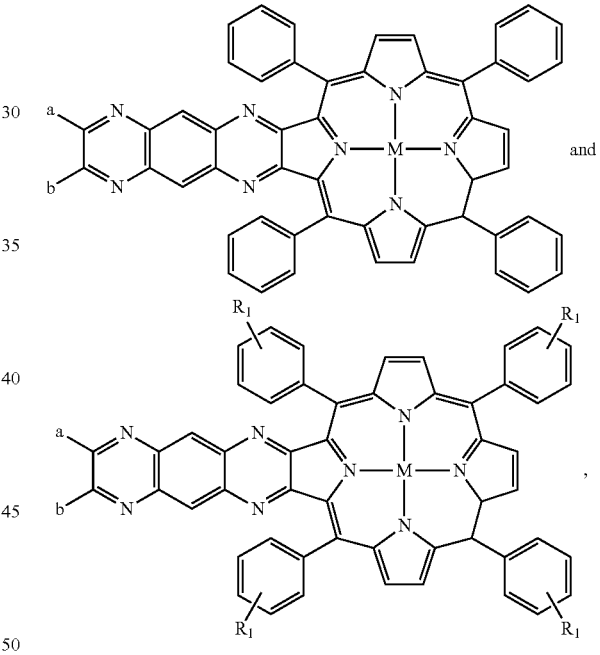

wherein, independently for each occurrence:
  a and b represent covalent bonds to the graphene;
  M is a metal atom or metal ion;
  $R_1$, independently at each occurrence, is selected from the group consisting of halo, alkyl, substituted or unsubstituted aryl, substituted or unsubstituted heteroaryl, hydroxy, sulfhydryl, aminosulfonyl, sulfinic acid, aminosulfinyl, formyl, carboxyl, amino, amido, aminosulfonyl, aminosulfinyl, cyano, nitro, azido, phosphinyl, phosphoryl, silyl, and silyloxy; and
  optionally the metal atom or the metal ion is associated with additional ligands.

2. The composition of claim 1, wherein the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

3. The composition of claim 2, wherein the metal atom or the metal ion is independently selected from the group consisting of iridium, palladium, platinum, rhenium, rhodium, and ruthenium.

4. The composition of claim 1, wherein the metal atom or the metal ion is associated with additional ligands.

5. The composition of claim 4, wherein the additional ligands are selected from the group consisting of halo, 2,2'-bipyridine, carbon monoxide (CO), 1,5-cyclooctadiene, cyclopentadienyl (Cp), dibenzothiophene, 2,5-dimethylthiophene, pentamethylcyclopentadiene (Cp*), thiophene, and 2,2',2"-tripyridine.

6. The composition of claim 1, wherein the metal atom or the metal ion is independently selected from the group consisting of iridium, palladium, platinum, rhenium, rhodium, and ruthenium.

7. The composition of claim 1, wherein the one or more substituents are represented by the following Formula:

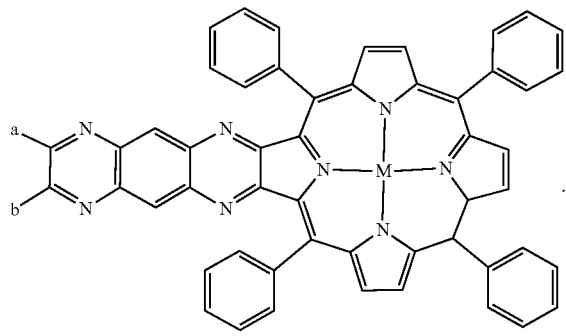

8. The composition of claim 7, wherein the metal atom or the metal ion is independently selected from the group consisting of iridium, palladium, platinum, rhenium, rhodium, and ruthenium.

9. The composition of claim 8, wherein the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

10. The composition of claim 7, wherein the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

11. The composition of claim 1, wherein the one or more substituents are represented by the following Formula:

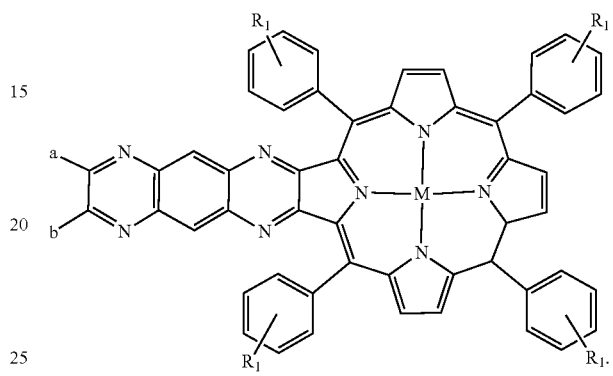

12. The composition of claim 11, wherein the metal atom or the metal ion is independently selected from the group consisting of iridium, palladium, platinum, rhenium, rhodium, and ruthenium.

13. The composition of claim 12, wherein the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

14. The composition of claim 11, wherein the graphene is present in a form selected from the group consisting of reduced graphene oxide, graphene nanoribbon, graphene quantum dots, glassy carbon, pyrolytic graphite, graphite powder, Vulcan carbon, monarch carbon, ketjen black, single-walled carbon nanotubes, and multi-walled carbon nanotubes.

\* \* \* \* \*